US012579865B2

(12) United States Patent
Bitto et al.

(10) Patent No.: US 12,579,865 B2
(45) Date of Patent: Mar. 17, 2026

(54) SYSTEM AND METHOD FOR REEL-BASED EVENTS WITH SEED-BASED FEATURE

(71) Applicant: Games Global Operations Limited, Douglas (IM)

(72) Inventors: Brian Bitto, Escondido, CA (US); Hylton Rottcher, Matthews, NC (US); Dylan Heyes, Las Vegas, NV (US)

(73) Assignee: Games Global Operations Limited, Douglas (IM)

( * ) Notice: Subject to any disclaimer, the term of this patent is extended or adjusted under 35 U.S.C. 154(b) by 363 days.

(21) Appl. No.: 18/055,709

(22) Filed: Nov. 15, 2022

(65) Prior Publication Data
US 2024/0161583 A1 May 16, 2024

(51) Int. Cl.
*G07F 17/32* (2006.01)
*G06F 7/58* (2006.01)

(52) U.S. Cl.
CPC .......... *G07F 17/3267* (2013.01); *G06F 7/582* (2013.01); *G07F 17/3213* (2013.01); *G07F 17/3244* (2013.01)

(58) Field of Classification Search
CPC ............. G07F 17/3267; G07F 17/3213; G07F 17/3244; G06F 7/582
See application file for complete search history.

(56) References Cited

U.S. PATENT DOCUMENTS

2003/0050111 A1* 3/2003 Saffari ................ G07F 17/3255
463/25
2004/0166922 A1* 8/2004 Michaelson ............ G07F 17/34
463/20
2005/0257216 A1* 11/2005 Cornell ................... G06F 8/656
717/177
2008/0146346 A1* 6/2008 Hardy ................... G07F 17/329
463/16
2014/0003652 A1* 1/2014 Fedorovskaya ......... G06F 16/20
382/103
2016/0358424 A1* 12/2016 Thomas .............. G07F 17/3272
2022/0062745 A1* 3/2022 Hennessy ............... G06F 7/582
2022/0165134 A1* 5/2022 McCarthy ........... G07F 17/3276
2024/0112542 A1* 4/2024 Mirjavadi ........... G07F 17/3213

OTHER PUBLICATIONS

M.E. O'Neil; "PCG, A Family of Better Random Number Generators", https://getnikola.com (2018).

* cited by examiner

*Primary Examiner* — Jeffrey K Wong
(74) *Attorney, Agent, or Firm* — MCDONNELL BOEHNEN HULBERT & BERGHOFF LLP

(57) ABSTRACT

Systems, methods, and storage media for reel-based events with seed-based feature are disclosed. Exemplary implementations may: determine occurrence of a particular outcome for a reel-based event; determine a specific seed from among a set of seeds corresponding to the particular outcome and a quantity of times to use a deterministic process based on the particular outcome and the specific seed; initialize the deterministic process with the specific seed to determine an index value corresponding to a first predetermined set of symbols and a first respective next seed for iteratively using the deterministic process; after initializing the deterministic process, iteratively use the deterministic process a number of times equal to the quantity of times minus one; and output, within a symbol display portion of a display, the first predetermined set of symbols followed by each respective predetermined set of symbols according to the ordered set of index values.

23 Claims, 13 Drawing Sheets

600

BONUS FREE SPIN — 604

605 — 5 AWARDS

606 — PAYOUT $6

608 — CREDIT $106

610 — PAYMENT $100

628 — SPIN

611 — WINNING OUTCOME =12X

700

BONUS FREE SPIN 704

5 AWARDS 705

PAYOUT $6 706

CREDIT $106 708

PAYMENT $100 710

SPIN 728

WINNING OUTCOME =20X 711

740

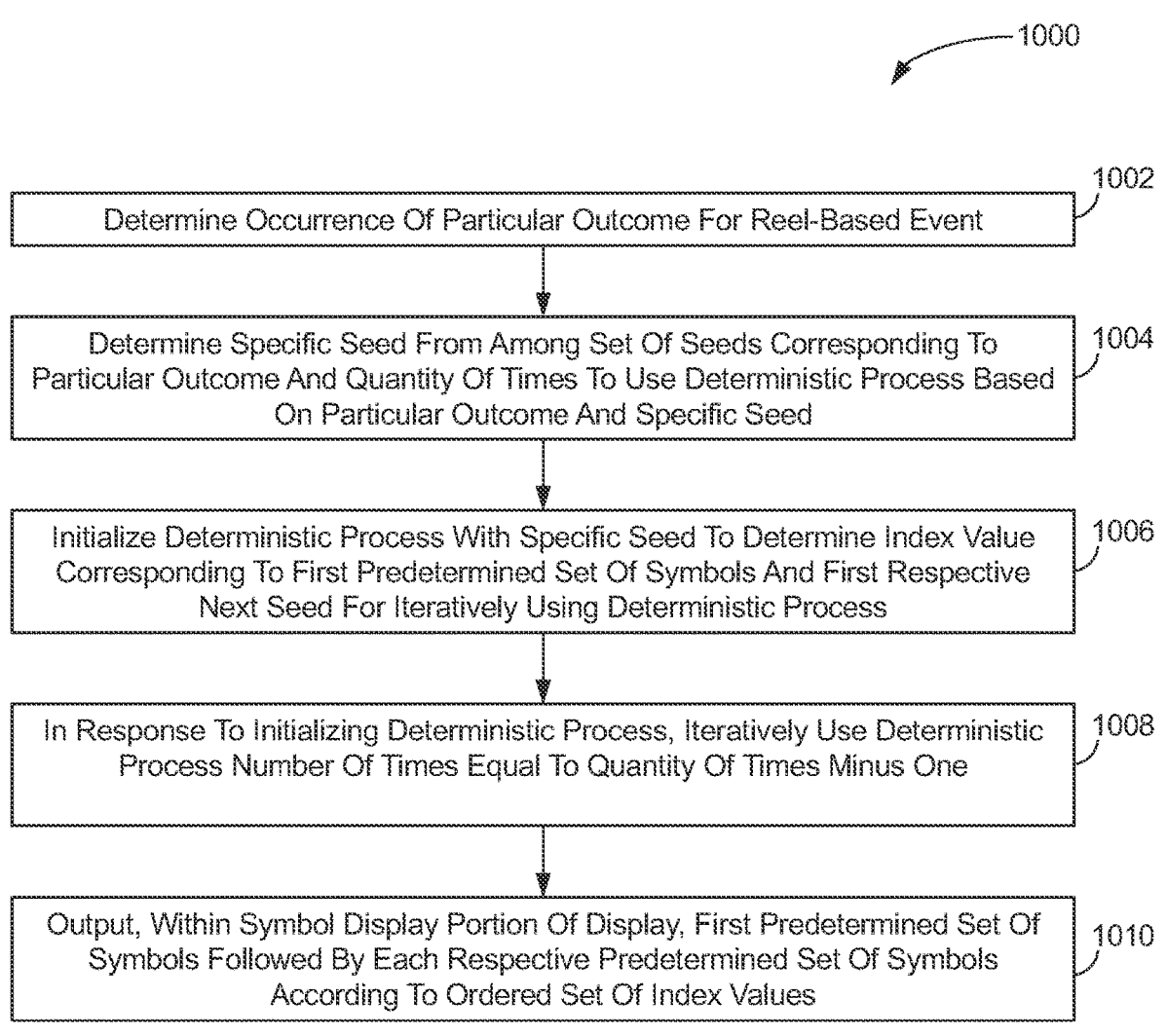

1000

Determine Occurrence Of Particular Outcome For Reel-Based Event — 1002

Determine Specific Seed From Among Set Of Seeds Corresponding To Particular Outcome And Quantity Of Times To Use Deterministic Process Based On Particular Outcome And Specific Seed — 1004

Initialize Deterministic Process With Specific Seed To Determine Index Value Corresponding To First Predetermined Set Of Symbols And First Respective Next Seed For Iteratively Using Deterministic Process — 1006

In Response To Initializing Deterministic Process, Iteratively Use Deterministic Process Number Of Times Equal To Quantity Of Times Minus One — 1008

Output, Within Symbol Display Portion Of Display, First Predetermined Set Of Symbols Followed By Each Respective Predetermined Set Of Symbols According To Ordered Set Of Index Values — 1010

FIG. 10A

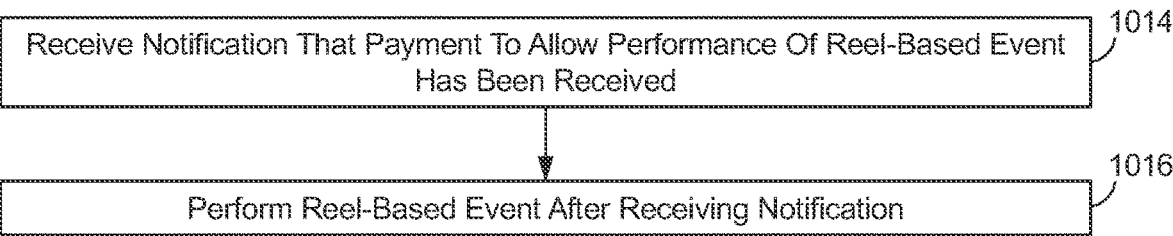

Determine, Based On Particular Award Being Selected From First Group Of Award Amounts, First Set Of Seeds From Among Multiple Sets Of Seeds 1012

FIG. 10B

Receive Notification That Payment To Allow Performance Of Reel-Based Event Has Been Received 1014

Perform Reel-Based Event After Receiving Notification 1016

FIG. 10C

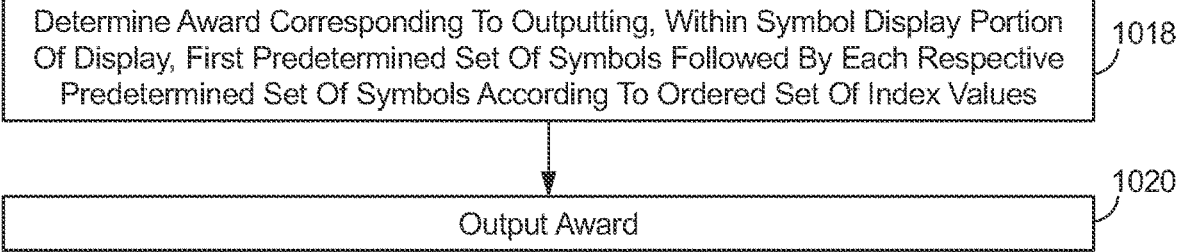

Determine Award Corresponding To Outputting, Within Symbol Display Portion Of Display, First Predetermined Set Of Symbols Followed By Each Respective Predetermined Set Of Symbols According To Ordered Set Of Index Values 1018

Output Award 1020

FIG. 10D

Output, Via User Interface, User Interface Element Based On Outputting Each Respective Predetermined Set Of Symbols According To Ordered Set Of Index Values 1022

FIG. 10E

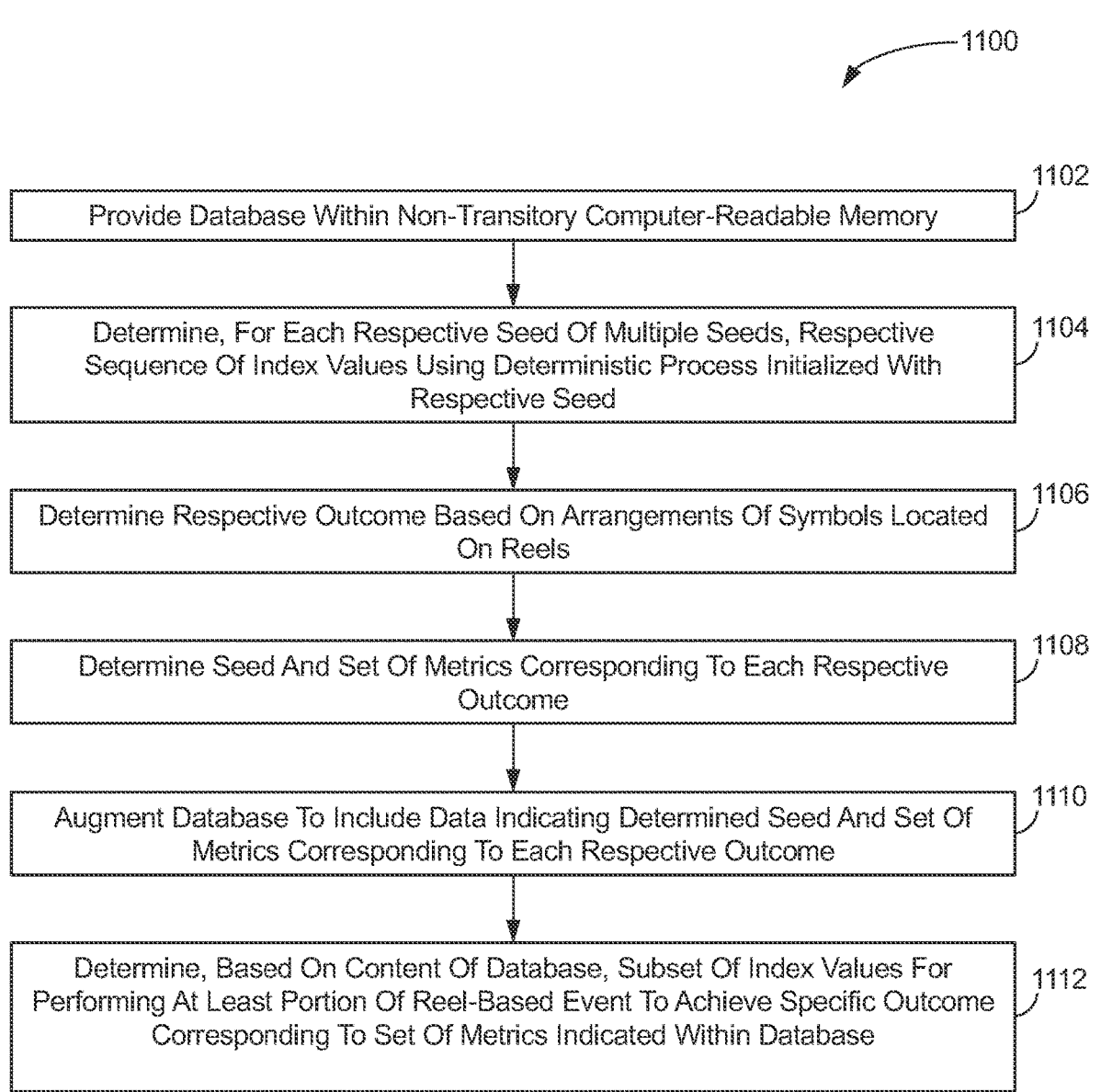

1100

| | 1102 |
|---|---|
| Provide Database Within Non-Transitory Computer-Readable Memory | |

| | 1104 |
|---|---|
| Determine, For Each Respective Seed Of Multiple Seeds, Respective Sequence Of Index Values Using Deterministic Process Initialized With Respective Seed | |

| | 1106 |
|---|---|
| Determine Respective Outcome Based On Arrangements Of Symbols Located On Reels | |

| | 1108 |
|---|---|
| Determine Seed And Set Of Metrics Corresponding To Each Respective Outcome | |

| | 1110 |
|---|---|
| Augment Database To Include Data Indicating Determined Seed And Set Of Metrics Corresponding To Each Respective Outcome | |

| | 1112 |
|---|---|
| Determine, Based On Content Of Database, Subset Of Index Values For Performing At Least Portion Of Reel-Based Event To Achieve Specific Outcome Corresponding To Set Of Metrics Indicated Within Database | |

FIG. 11A

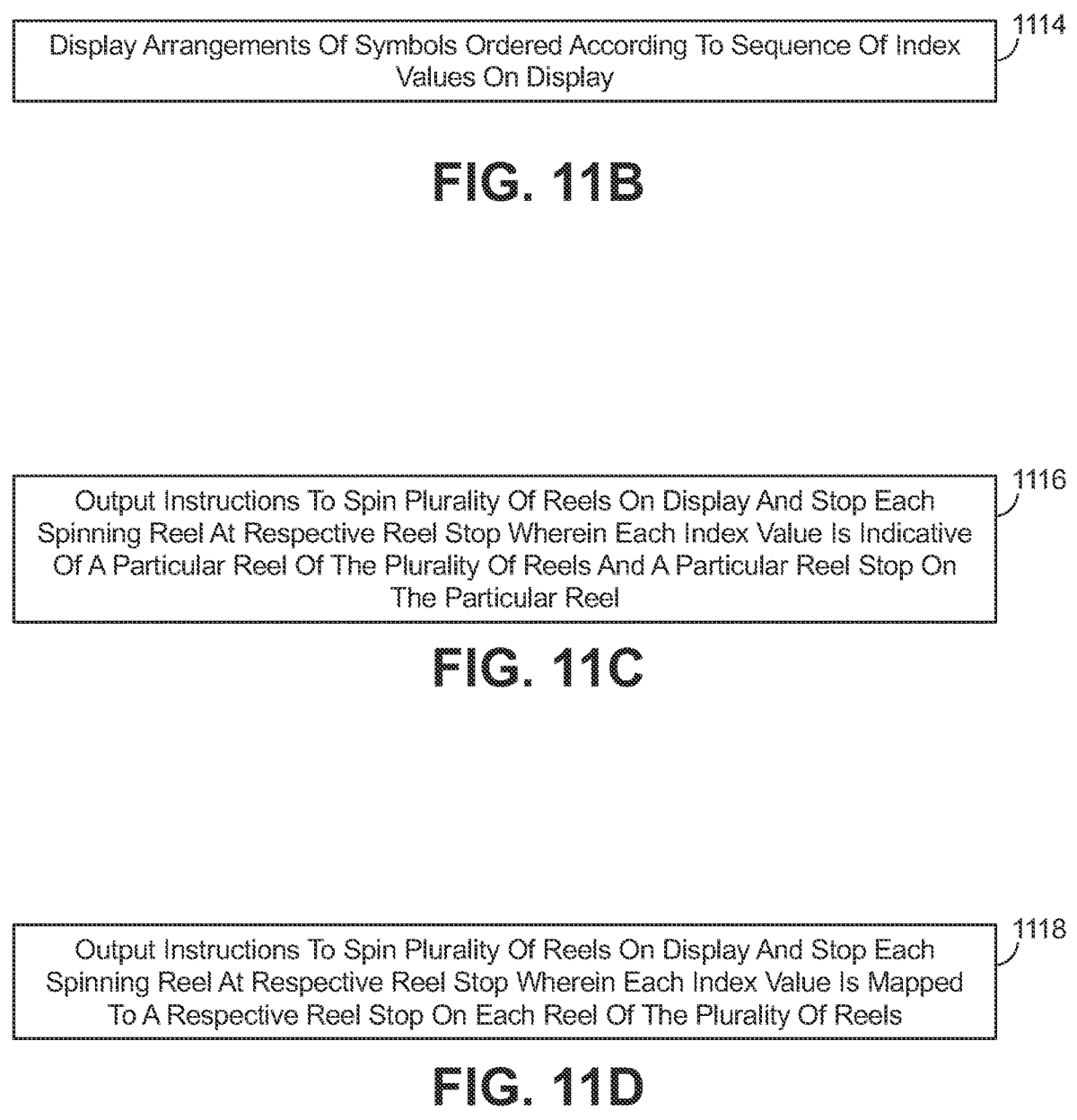

Display Arrangements Of Symbols Ordered According To Sequence Of Index Values On Display — 1114

FIG. 11B

Output Instructions To Spin Plurality Of Reels On Display And Stop Each Spinning Reel At Respective Reel Stop Wherein Each Index Value Is Indicative Of A Particular Reel Of The Plurality Of Reels And A Particular Reel Stop On The Particular Reel — 1116

FIG. 11C

Output Instructions To Spin Plurality Of Reels On Display And Stop Each Spinning Reel At Respective Reel Stop Wherein Each Index Value Is Mapped To A Respective Reel Stop On Each Reel Of The Plurality Of Reels — 1118

FIG. 11D

SYSTEM AND METHOD FOR REEL-BASED EVENTS WITH SEED-BASED FEATURE

FIELD

This disclosure relates to virtual reel-based events including reel-based events having seed-based features to deliver specific metrics.

BACKGROUND

Slot machines come in a variety of forms, including for example a mechanical slot machine. A mechanical slot machine can include one or more reels, each of which includes multiple symbols distributed around the circumference of the reel. When a slot machine with one or more reels is used, a user is allowed to spin the reels. Each reel then comes to rest, typically with either one of the symbols, or a space in between symbols, in alignment with a payline. A predefined winning symbol or a predefined combination of winning symbols that are aligned with the payline can result in the user receiving an award. In one example, the slot machine can include three reels, and the payline can be an imaginary, horizontal line disposed across a central portion of a window through which a portion of each of the three reels is visible.

As another example, a mechanical slot machine can present symbols in a matrix arrangement, with each symbol changing during a use of the mechanical slot machine. For example, the mechanical slot machine can have five columns and three rows of symbols, for a total of fifteen symbols. Such mechanical slot machines often have multiple pay lines, each being defined by a collection of positions within the matrix. For example, the mechanical slot machine can have three pay lines, each corresponding to one row of the matrix.

While slot machines were traditionally mechanical, modern slot machines often take the form of a computing system (e.g., a dedicated computing system located in a casino) that includes a graphical user interface (GUI), and that can emulate a mechanical slot machine. For virtual reel-based events (also known as electronic reel-based events), a random number generator (RNG) is generally used to determine the position that each reel will land on during a reel-based event. Despite such advances, there is a continuing need to improve how a computing system for reel-based events may deliver specific metrics to provide a bonus round experience, for example, as part of a free spin sequence, and while reducing data storage.

Overview

The present application discloses embodiments including and/or related to systems, methods, and apparatus that provide improvements in computer-implemented technology by increasing the number and variety of possible outcomes based on a random selection of symbols, such as symbols that can be found on a mechanical slot machine.

In a first aspect, a computing system is provided. The computing system includes a processor and a non-transitory computer-readable memory storing executable instructions. Execution of the executable instructions by the processor causes the computing system to perform functions. The functions include determining occurrence of a particular outcome for a reel-based event. The functions include determining a specific seed from among a set of seeds corresponding to the particular outcome and a quantity of times to use a deterministic process based on the particular outcome and the specific seed. The functions include initializing the deterministic process with the specific seed to determine an index value corresponding to a first predetermined set of symbols and a first respective next seed for iteratively using the deterministic process. The functions include, after initializing the deterministic process, iteratively using the deterministic process a number of times equal to the quantity of times minus one. Each iterative use of the deterministic process can be initialized with a respective next seed determined during an immediate prior use of the deterministic process. Iteratively using the deterministic process results in determining, for each iterative use, an ordered set of index values corresponding to a respective predetermined set of symbols. The functions include outputting, within a symbol display portion of a display, the first predetermined set of symbols followed by each respective predetermined set of symbols according to the ordered set of index values.

In a second aspect, a method is provided. The method can include determining occurrence of a particular outcome for a reel-based event. The method can include determining a specific seed from among a set of seeds corresponding to the particular outcome and a quantity of times to use a deterministic process based on the particular outcome and the specific seed. The method can include initializing the deterministic process with the specific seed to determine an index value corresponding to a first predetermined set of symbols and a first respective next seed for iteratively using the deterministic process. The method can include, after initializing the deterministic process, iteratively using the deterministic process a number of times equal to the quantity of times minus one. Each iterative use of the deterministic process can be initialized with a respective next seed determined during an immediate prior use of the deterministic process, Iteratively using the deterministic process results in determining, for each iterative use, an ordered set of index values corresponding to a respective predetermined set of symbols. The method can include outputting, within a symbol display portion of a display, the first predetermined set of symbols followed by each respective predetermined set of symbols according to the ordered set of index values.

In a third aspect, a computer-readable memory is provided. The computer-readable memory has stored therein instructions executable by a processor to cause a computing system to perform functions. The functions include determining occurrence of a particular outcome for a reel-based event. The functions include determining a specific seed from among a set of seeds corresponding to the particular outcome and a quantity of times to use a deterministic process based on the particular outcome and the specific seed. The functions include initializing the deterministic process with the specific seed to determine an index value corresponding to a first predetermined set of symbols and a first respective next seed for iteratively using the deterministic process. The functions include, after initializing the deterministic process, iteratively using the deterministic process a number of times equal to the quantity of times minus one. Each iterative use of the deterministic process can be initialized with a respective next seed determined during an immediate prior use of the deterministic process. Iteratively using the deterministic process results in determining, for each iterative use, an ordered set of index values corresponding to a respective predetermined set of symbols. The functions include outputting, within a symbol display portion of a display, the first predetermined set of symbols followed by each respective predetermined set of symbols according to the ordered set of index values.

In a fourth aspect, a computing system is provided. The computing system includes a processor and a non-transitory computer-readable memory storing executable instructions. Execution of the executable instructions by the processor causes the computing system to perform functions. The functions include providing a database within the non-transitory computer-readable memory. The database can include a set of index values. Each index value can correspond to a respective reel stop. The respective reel stop can correspond to one or more reels displayable on a display during performance of a reel-based event. The functions include determining, for each respective seed of multiple seeds, a respective sequence of index values using a deterministic process initialized with the respective seed. Each index value of the respective sequence of index values can be contained within the set of index values. The functions include determining a respective outcome based on arrangements of symbols located on the reels. The arrangements of symbols can be ordered according to each respective sequence of index values. The functions include determining a seed and a set of metrics corresponding to each respective outcome. The determined seed can be the respective seed used by the deterministic process to determine the respective sequence of index values used to determine the respective outcome. The functions augmenting the database to include data indicating the determined seed and the set of metrics corresponding to each respective outcome. The functions include determining, based on content of the database, a subset of the index values for performing at least a portion of a reel-based event to achieve a specific outcome corresponding to the set of metrics indicated within the database.

In a fifth aspect, a method is provided. The method includes providing a database within a non-transitory computer-readable memory. The database can include a set of index values. Each index value can correspond to a respective reel stop. The respective reel stop can correspond to one or more reels displayable on a display during performance of a reel-based event. The method includes determining, for each respective seed of multiple seeds, a respective sequence of index values using a deterministic process initialized with the respective seed. Each index value of the respective sequence of index values can be contained within the set of index values. The method includes determining a respective outcome based on arrangements of symbols located on the reels. The arrangements of symbols can be ordered according to each respective sequence of index values. The method includes determining a seed and a set of metrics corresponding to each respective outcome. The determined seed can be the respective seed used by the deterministic process to determine the respective sequence of index values used to determine the respective outcome. The method includes augmenting the database to include data indicating the determined seed and the set of metrics corresponding to each respective outcome. The method includes determining, based on content of the database, a subset of the index values for performing at least a portion of a reel-based event to achieve a specific outcome corresponding to the set of metrics indicated within the database.

In a sixth aspect, a computer-readable memory is provided. The computer-readable memory has stored therein instructions executable by a processor to cause a computing system to perform functions. The functions include providing a database within a computer-readable memory. The database can include a set of index values. Each index value can correspond to a respective reel stop. The respective reel stop can correspond to one or more reels displayable on a display during performance of a reel-based event. The functions include determining, for each respective seed of multiple seeds, a respective sequence of index values using a deterministic process initialized with the respective seed. Each index value of the respective sequence of index values can be contained within the set of index values. The functions include determining a respective outcome based on arrangements of symbols located on the reels. The arrangements of symbols can be ordered according to each respective sequence of index values. The functions include determining a seed and a set of metrics corresponding to each respective outcome. The determined seed can be the respective seed used by the deterministic process to determine the respective sequence of index values used to determine the respective outcome. The functions include augmenting the database to include data indicating the determined seed and the set of metrics corresponding to each respective outcome. The functions include determining, based on content of the database, a subset of the index values for performing at least a portion of a reel-based event to achieve a specific outcome corresponding to the set of metrics indicated within the database.

These aspects, as well as other embodiments, aspects, advantages, and alternatives will become apparent to those of ordinary skill in the art by reading the following detailed description, with reference where appropriate to the accompanying drawings. Further, this overview and other descriptions and figures provided herein are intended to illustrate embodiments using examples only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE FIGURES

The above, as well as additional, features will be better understood through the following illustrative and non-limiting detailed description of example embodiments, with reference to the appended drawings.

FIG. 10A is a flow chart showing functions of a method for reel-based events with a seed-based feature, in accordance with the example embodiments.

FIG. 10B, FIG. 10C, FIG. 10D, and/or FIG. 10E show additional functions corresponding to the functions shown in FIG. 10A.

FIG. 11A is a flow chart showing functions of a method for reel-based events with a seed-based feature, in accordance with the example embodiments.

FIG. 11B, FIG. 11C, and/or FIG. 11D show additional functions corresponding to the functions shown in FIG. 11A.

Figure 1A:
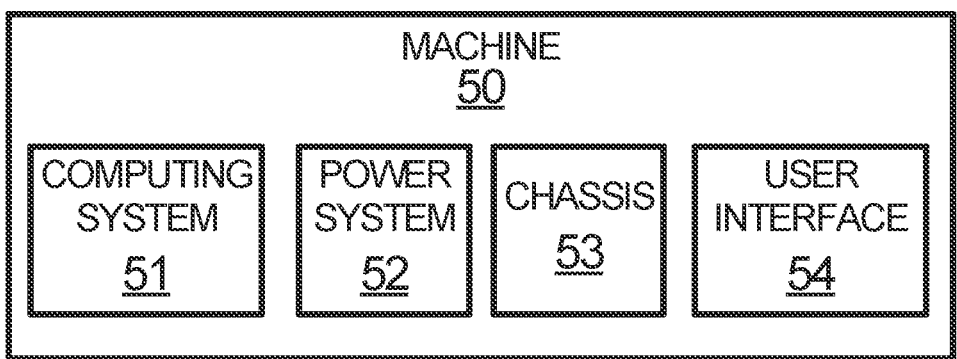
FIG. 1A is a block diagram of a machine, in accordance with the example embodiments.

All the figures are schematic, not necessarily to scale, and generally only show parts which are necessary to explain example embodiments, wherein other parts can be omitted or merely suggested.

DETAILED DESCRIPTION

I. Introduction

In this detailed description, several example embodiments are disclosed including, but not limited to, embodiments pertaining to performing aspects of an outcome event using a computing system (e.g., a server and/or a client computing system), a user device and/or a machine. The user device and/or the machine can be configured as and/or include a computing system. For purposes of this description, unless the context dictates otherwise, a user device or machine can include and/or be embodied as a computing system.

A computing system and/or a display screen of the computing system can display a variety of symbols during performance of an outcome event. A symbol displayed within a symbol-display-portion of the display screen during an outcome event can be replaced (upgraded) by another symbol. The replacement symbols can be used to determine an award for a winning outcome. A winning outcome can be based on symbols being displayed according to a pattern of symbols (e.g., a predefined pattern of symbols). The pattern can be defined as a payline of a line-type outcome event, or a payway of a ways-type outcome event. Unless the context of the specification dictates otherwise, an embodiment in which outcomes are based on paylines and/or a line-type outcome event, can instead be based on payways and/or a ways-type outcome event, and vice versa.

In a line-type outcome event, each payline is a pattern on reels or a matrix. The payline typically starts from a left-most reel and passes through adjacent reels until the payline reaches the right-most reel. The quantity of paylines active for a line-type outcome event can depend upon a payment and/or a selection made to perform the line-type outcome event.

In a ways-type outcome event, each payway includes a combination of matching symbols located on adjacent reels. The symbols can be in any position on one of the adjacent reel. As an example, for outcome events performed on a computing system having a display screen, the outcome events can be arranged with five reels and three rows such that there are 243 payways with three or more symbols possible. The quantity of payways active for a ways-type outcome event can depend upon a payment and/or selection made to perform the ways-type outcome event.

In accordance with the example embodiments, a pattern that results in an award can include a particular pattern that starts at either side of a symbol-display portion of a display (e.g., a left side or a right side). For example, in an embodiment in which the symbol-display portion includes a respective reel in five columns referred to as C1, C2, C3, C4, C5 as those columns are arranged from a left side of the symbol-display portion to a right side of the symbol portion, the particular pattern (e.g., a payline or payway) can include a pattern with a sufficient quantity and kind of symbols starting at column C1, or a pattern with a sufficient quantity and kind of symbols starting at column C5. For instance, if the sufficient quantity and kind of symbols equals three "K" symbols, then a pattern of "K" symbols in columns C1, C2, C3 or in columns C5, C4, C3 results in an award. Moreover, in some embodiments, a special symbol, such as a "Wild" symbol can take the place of the kind of symbol defined for the particular pattern. Other examples of the sufficient quantity and kind of symbols are possible.

Some of the described embodiments refer to multiple patterns (e.g., multiple particular patterns). In one respect, the multiple particular patterns can be multiple particular paylines. In another respect, the multiple particular patterns can be multiple particular payways. Moreover, a particular pattern can be a particular payline or a particular payway. Furthermore, a winning pattern can be a winning payline or a winning payway. Furthermore still, a horizontally extending pattern can be a horizontally extending payline or a horizontally extending payway. Similarly, a diagonally extending pattern can be a diagonally extending payline or a diagonally extending payway.

Moreover, displaying the symbols can include displaying an image of one or more reels or a matrix, together with animation effects to simulate a spin of the one or more reels, or a spin of the columns or rows of the matrix. A computer software program, which can reside in the computing system, can randomly select one or more symbols in response to a spin, and can display the selected one or more symbols on the display.

Additionally, an outcome event can be played over a computer-network, such as by a user using a client computing system that is connected to a server computing system over the computer-network. In this instance, the server computing system can cause the reels to spin and can send the resulting symbols to the client computing system for display.

Throughout this description, the articles "a" or "an" are used to introduce elements of the example embodiments. Any reference to "a" or "an" refers to "at least one" or "one or more," and any reference to "the" refers to "the at least one" or "the one or more," unless otherwise specified, or unless the context clearly dictates otherwise. The intent of using the conjunction "or" within a described list of at least two terms is to indicate any of the listed terms or any combination of the listed terms.

The use of ordinal numbers such as "first," "second," "third" and so on is to distinguish respective elements rather than to denote a particular order of those elements. For purpose of this description, the terms "multiple" and "a plurality of" refer to "two or more" or "more than one."

The description refers to an index or index values. The aspects that indicate more than one index can be referred to as indexes, index(es), or indices.

Further, unless context suggests otherwise, the features illustrated in each of the figures can be used in combination with one another. Thus, the figures should be generally viewed as component aspects of one or more overall embodiments, with the understanding that not all illustrated features are necessary for each embodiment.

The systems, methods, and apparatus described in this description can carry out aspects of an outcome event that includes displaying symbols. These aspects can be incorporated into outcome events, in particular, outcome events performed in response to a payment. In one aspect, the systems, methods, and apparatus provide features that can enhance traditional outcome events (e.g., slot machines or other reel-type outcome events) by providing a user with additional opportunities to win the outcome event, thereby increasing the user's interest, anticipation, and excitement in connection with the outcome event. This can in turn benefit a casino or another entity that provides an outcome event with this feature. Indeed, outcome events are typically configured to have odds that favor the casino (sometimes referred to as the "house"). Accordingly, based on the law of averages, casinos often increase their profits simply by getting more users to use its computing system to perform more outcome events. Due to the provided features, users can be drawn in (e.g., from competing casinos that lack outcome events with such features), and they can play the outcome event often. The features can include data communications between a server computing system and a client computing system within a server-client based configuration.

II. Example Architecture

FIG. 1A is a block diagram of a machine 50 in accordance with the example embodiments. The machine 50 includes a computing system 51, a power system 52, a chassis 53, and/or a user interface 54. The machine 50 can be configured to perform a method or at least some functions of a method according to the example embodiments. In at least some embodiments, the computing system 51 can include at least a portion of one or more from among: the power system 52, the chassis 53, or the user interface 54.

The computing system 51 can include a processor and a memory storing program instructions executable by the processor to perform a method or at least some functions of a method according to the example embodiments. As an example, the computing system 51 can be arranged as and/or include components of any computing system described in this description and/or shown in the drawings. In particular, the computing system 51 can be arranged as and/or include components of a computing system 100 shown in FIG. 1B, a computing system 100a shown in FIG. 2, a computing system 100b also shown in FIG. 2, a computing system 800 shown in FIG. 8, or a computing system 900 shown in FIG. 9.

The power system 52 includes means for powering some portion of the machine 50, such as the computing system 51 and/or the user interface 54. The power system 52 can include a power supply, such as a battery, a generator, a fuel cell, or a solar cell, or some other type of power supply instead or in addition. The power system 52 can include a power circuit for distributing electrical power throughout the machine 50 where needed. The power system 52 can include a connector and/or connection for connecting to another power system, such as a power system within a building and/or a power system of an electrical utility company.

The chassis 53 includes means for supporting and/or protecting other aspects of the machine 50. As an example, the chassis 53 can include a rack for supporting at least portions of the computing system 51, the power system 52, and/or the user interface 54. As another example, the chassis 53 can include a housing in which at least portions of the computing system 51, the power system 52, and/or the user interface 54 reside.

The user interface 54 can include one or more user interface input components configured to receive and/or produce content (e.g., a signal, data, and/or information)

based on some action of a user. That content can be provided to the computing system 51. The user interface 54 can include one or more user interface output components for outputting content. That content can be provided by the computing system 51. The user action can occur by use of the user interface 54.

In at least some embodiments, the user interface 54 includes a mechanical user interface input component, such as an arm, handle or lever located on a side of the chassis 53 similar to an arm, handle, or lever located on a mechanical slot machine. As an example, the mechanical user interface input component can be configured to input a spin request to the computing system 51.

In at least some embodiments, the user interface 54 includes an acceptor, such as a paper money acceptor, a coin acceptor, a token acceptor, a validator, and/or a card reader. In at least some embodiments, the user interface 54 includes an emitter, such as a paper money emitter, a coin emitter, or a token emitter to output paper money, coin(s) or token(s), respectively, when a player ends an event session and/or when a player wins an award.

In at least some embodiments, the computing system 51 includes at least a portion of the user interface 54. As an example, in embodiments in which the computing system 51 is arranged like the computing system 100, the computing system 100a, or the computing system 100b, the user interface 54 can be arranged like the user interface 104, the user interface 104a, or the user interface 104b, respectively.

Figure 1B:
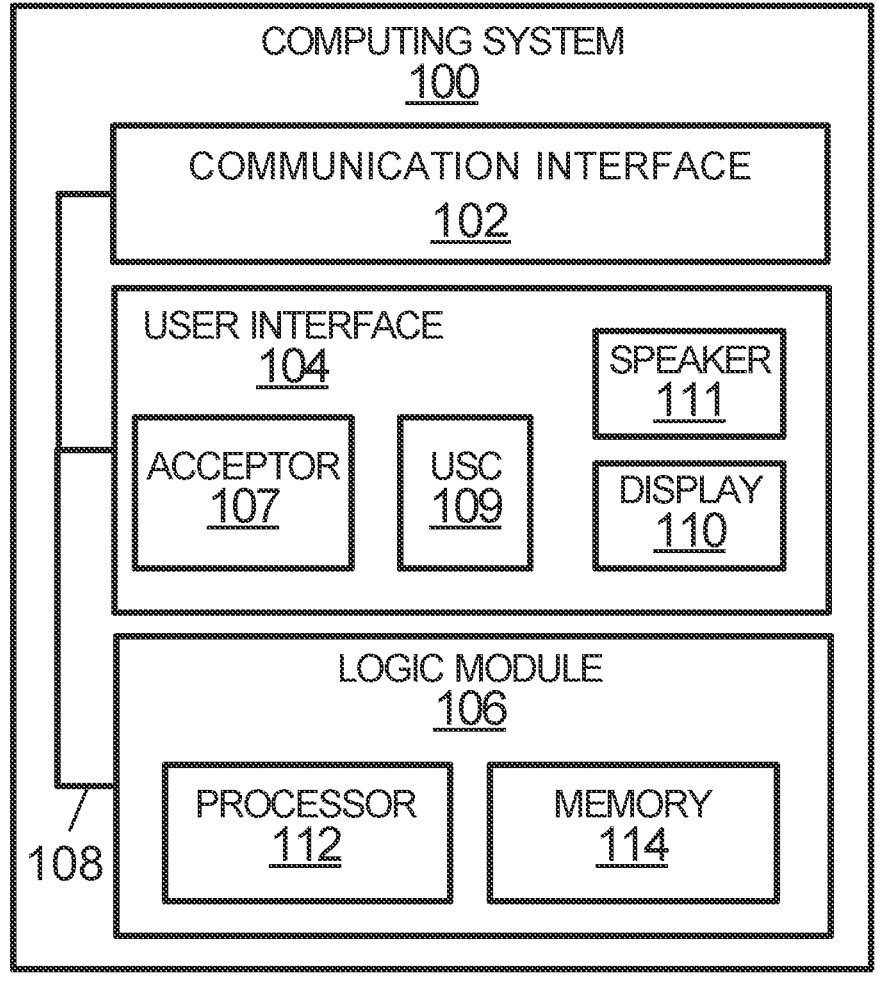
FIG. 1B is a block diagram of a computing system, in accordance with the example embodiments.

Next, FIG. 1B is a block diagram of a computing system 100 in accordance with the example embodiments. The computing system 100 can be arranged as and/or include a stand-alone computing system, a distributed computing system, a personal computer, a server computing system, a client computing system, a portable computing system, a mobile phone, a smartphone, a tablet device, or some other computing device. The computing system 100 can be referred to as a user device.

The computing system 100 can include a communication interface 102, a user interface 104, and a logic module 106, two or more which can be coupled together by a system bus, network, or other connection mechanism 108. The communication interface 102 can include a wired or wireless network communication interface. For purposes of this description, any data described as being provided, sent, or transmitted by the computing system 100 can be data sent by the communication interface 102 over a communication network. In addition, for purposes of this description, any data described as being received by the computing system 100 can be data sent to communication interface 102 over a communication network.

The user interface 104 includes components that can facilitate interaction with a user of the computing system 100. For example, the user interface 104 can include user interface output components, such as a display 110 and/or a speaker 111. As another example, the user interface can include user interface input components, such as an acceptor 107, a user-selectable control 109 (e.g., a keypad, a keyboard, or a mouse), or a touch-sensitive screen. The touch-sensitive screen can be part of the display 110, such that the display 110 is operable as both a user interface input component and a user interface output component. The user-selectable control 109 can include one or more user-selectable controls, one or more of which can be implemented on the touch sensitive screen (which can also be referred to as a touch pad).

The display 110 is configured to display (i.e., visually present and/or show) content. As an example, the content can correspond to an outcome event, such as a set of symbols selected for the outcome event, a matrix, a reel, a payline, a payway, an award, an instruction, or a user-selectable control (e.g., a button). As another example, the content can include text, a graphic, a GUI, an animation, a video, or some other content as well or instead. As yet another example, the content can include content shown in and/or described with respect to any one or more of FIG. 3A, FIG. 3B, FIG. 4, FIG. 5, FIG. 6, FIG. 7, FIG. 8, FIG. 9, FIG. 10A, FIG. 10B, FIG. 10C, FIG. 10D, FIG. 10E, FIG. 11A, FIG. 11B, FIG. 11C, and/or FIG. 11D. The display 110 can include a display screen (e.g., a display panel or a graphical display unit) including a quantity of pixels (e.g., 786,432 pixels in an array of pixels that is 1,024 pixels by 768 pixels). Other examples of an array of pixels are possible.

Additionally, the display 110 and/or the display screen can include and/or be arranged as a liquid crystal display (LCD), a light emitting diode (LED) display, an organic LED (OLED) display, a plasma display or some other type of display. Furthermore, the display 110 can embody the touch sensitive screen noted above such that the display 110 and/or display screen includes and/or is arranged as a touch screen display.

The logic module 106 can include and/or be arranged as a processor 112 and/or a memory 114. The processor 112 can include a general-purpose processor (e.g., a microprocessor) or a special-purpose processor (e.g., a graphics process, a digital signal processor or an application specific integrated circuit) and can be integrated in whole or in part with the communication interface 102 or the user interface 104. Any memory discussed in this description or shown in the drawings can be referred to as a computer-readable memory, data storage, computer-readable data storage, among other names.

The memory 114 can include volatile or non-volatile storage components and can be integrated in whole or in part with the processor 112. The memory 114 can take the form of a non-transitory computer-readable medium and can include software program instructions, that when executed by the processor 112, cause the computing system 100 to perform one or more of the functions described herein. Any software program instructions discussed in this description or shown in the drawings can be referred to as computer-readable program instructions, or more simply, program instructions, or a software application. A set of program instructions (e.g., a portion of a software application) can be referred to as a module or a logic module.

As an example, the program instructions can be executable by the processor 112 to perform a method, such as a method including one or more of the functions shown in FIG. 10A, FIG. 10B, FIG. 10C, FIG. 10D, FIG. 10E, FIG. 11A, FIG. 11B, FIG. 11C, and/or FIG. 11D.

As another example, the program instructions can be executable by the processor 112 to determine a payment has been received by the user interface 104 (e.g., by the acceptor 107) and thereafter allow an outcome to be output in response to an input entered via the user interface 104.

The memory 114 can also include operating system software on which the computing system 100 can operate. For example, the computing system 100 can operate on a Windows®-based operating system available from the Microsoft® Corporation of Redmond, Wash. Other examples of an operating system are possible.

The memory 114 can include a database. As an example, the memory 114 can include a credit account database containing data related to performing an outcome event by a computing system, as well as adjusting account balances (e.g., quantities of credits) associated with client computing systems. The processor 112 can write data into the database and read data within the database.

Figure 2:
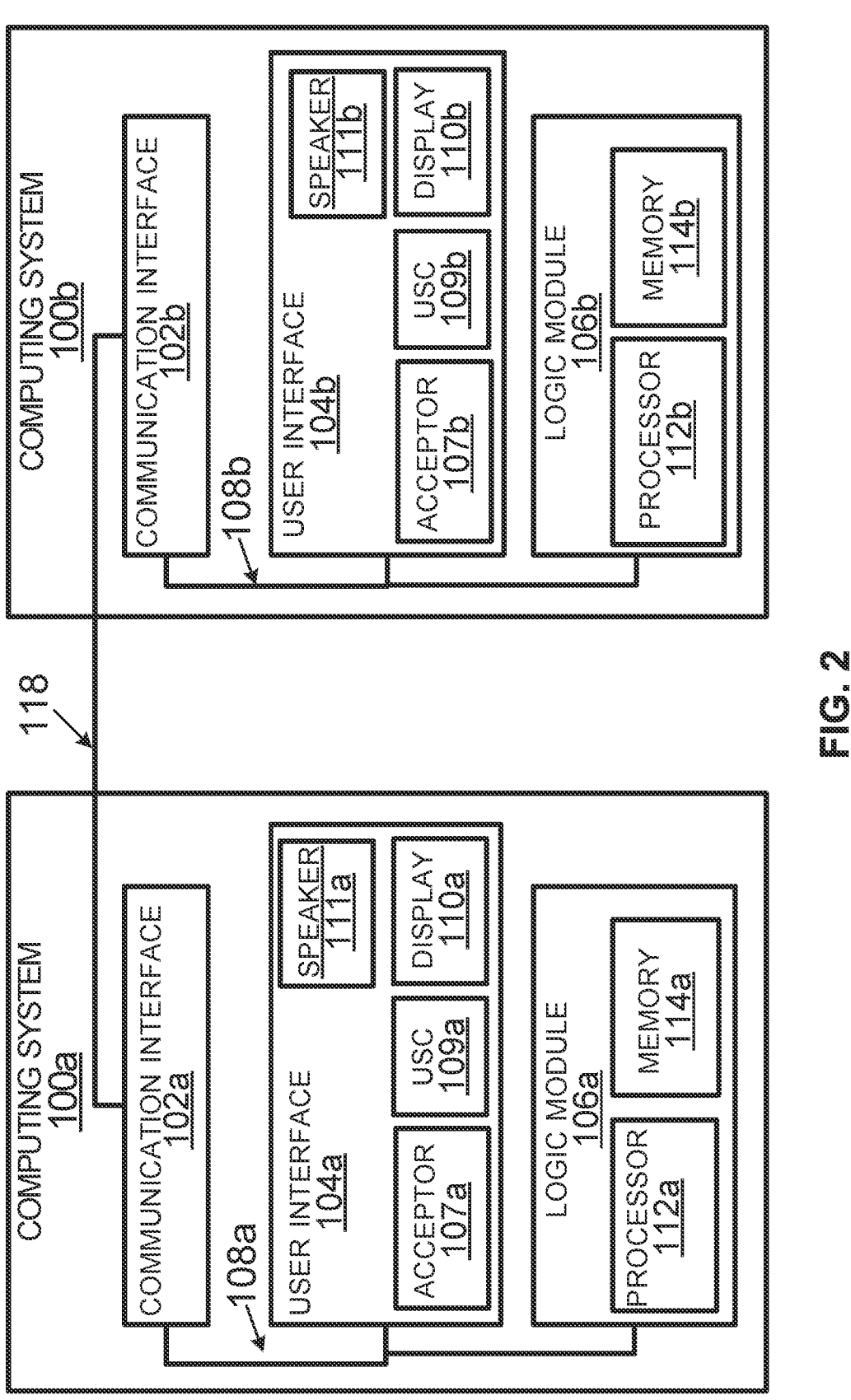
FIG. 2 is a block diagram of two computing systems connected to one another via a computer network, in accordance with the example embodiments.

FIG. 2 is a block diagram of a computing system 100a connected to a computing system 100b over a communication network 118. A configuration of elements including the computing system 100a and the computing system 100b can be referred to as a server-client based configuration.

The components of the computing system 100a and the computing system 100b are shown with corresponding "a" and "b" reference numerals (i.e., based on the computing system 100). For example, the computing system 100a includes a communication interface 102a, a user interface 104a (which includes an acceptor 107a, a user-selectable control 109a, a display 110a, and/or a speaker 111a), a logic module 106a (which includes a processor 112a and/or a memory 114a), and a communication bus 108a. Likewise, the computing system 100b includes a communication interface 102b, a user interface 104b (which includes an acceptor 107b, a user-selectable control 109b, a display 110b, and/or a speaker 111b), a logic module 106b (which includes a processor 112b and/or a memory 114b), and a communication bus 108b. In at least some embodiments, the acceptor 107a includes a validator, and the acceptor 107b includes a paper money acceptor, a coin acceptor, a validator, and/or a card reader.

The computing system 100a is configured to communicate with the computing system 100b over the communication network 118 (via the communication interface 102a and the communication interface 102b). Likewise, the computing system 100b is configured to communicate with the computing system 100a over the communication network 118. For purposes of this description, any data described as being sent or transmitted by the computing system 100a can include data sent by the communication interface 102a over the communication network 118. Similarly, any data described as being sent or transmitted by the computing system 100b can include data sent by the communication interface 102b over the communication network 118. Furthermore, for purposes of this description, any data described as being received by the computing system 100a can include data the computing system 100a receives from the communication network 118 using communication interface 102a. Similarly, any data described as being received by the computing system 100b can include data the computing system 100b receives from the communication network 118 using the communication interface 102b.

In at least some embodiments, the communication network 118 includes a local area network (LAN), such as a LAN located at least partially within a casino. In accordance with those embodiments, multiple instances of the computing system 100b dispersed throughout the casino can communicate with the computing system 100a. In some cases, the computing system 100a can be located within the casino. In some other cases, the computing system 100a can be located away from the casino.

In another example, the communication network 118 can include a wide-area network (WAN), such as an Internet network or a network of the World Wide Web. In such a configuration, the computing system 100b can communicate with the computing system 100a via a website portal (for a virtual casino) hosted on the computing system 100a. The data described herein as being transmitted by the computing system 100a to the computing system 100b or by the computing system 100b to the computing system 100a can be transmitted as datagrams according to the user datagram protocol (UDP), the transmission control protocol (TCP), or another protocol, and/or a file (e.g., a hypertext transfer protocol file) or some other type of file or communication.

The communication network 118 can include any of a variety of network topologies and network devices. The communication network 118 can include a wireless and/or wired network topology and network devices operable on one or both of those network topologies. As an example, the communication network 118 can include a public switched telephone network, a cable network, a cellular wireless network, a wide area network (WAN), a local area network, an IEEE® 802.11 standard for wireless local area networks (wireless LAN) (which is sometimes referred to as a WI-FI® standard) (e.g., 802.11a, 802.11b, 802.11g, 802.11n, or 802.11p), and/or a network operating according to a BLUETOOTH® standard (e.g., the BLUETOOTH® standard 5.3) developed by the Bluetooth Special Interest Group (SIG) of Kirkland, Washington.

As noted, the computing system 100 can include the acceptor 107. In at least some embodiments, the acceptor 107 includes an acceptor of a physical item associated with a monetary value, such as a paper money acceptor, a coin acceptor, or a card reader. The acceptor 107 can include a validator configured to identify the physical item, and determine whether the physical item is suitable as payment to the computing system 100. A coin acceptor can be configured to accept and identify a coin distributed by a geo-political body or a token generated for an organization other than a geo-political body, such as a casino. A card reader can be configured to read a bank card (e.g., a credit or debit card) or a customer card (e.g., a casino loyalty card).

In at least some embodiments, the computing system 100 can also physically dispense a corresponding award or payout (e.g., cash), or otherwise facilitate the payout (by adding funds to an electronic account associated with a customer card). Such an activity can be triggered by a cash out button either on the display 110 or elsewhere on the computing system 100. Additionally, or alternatively to determining the payout amount, the computing system 100 can perform other actions to award the user. For instance, the computing system 100 can display an indication of a tangible prize. Other types of awards can be used as well.

For purposes of this description, a function that can be performed by the computing system 100, the computing system 100a, or the computing system 100b can be performed, at least in part, by a processor of that computing system executing program instructions and/or a software application. Those program instructions and/or software application can be stored within the memory 114, 114a, or 114b, respectively.

The memory 114, 114a, and 114b can also store data. The memory 114, 114a, 114b can include a global symbol group for an outcome event that includes multiple symbols, such as a reel-based outcome event. As an example, the multiple symbols can include a wild symbol, an ace symbol, a king symbol, a queen symbol, a jack symbol, a ten symbol and/or a nine symbol. The ace, king, queen, jack, ten and nine symbols can represent symbols found on a standard deck of playing cards. The wild symbol can have special properties that allow it to form winning combinations with other symbols. In at least some embodiments, an "A" symbol represents the ace symbol, a "K" symbol represents the king symbol, a "Q" symbol represents the queen symbol, a "J" symbol represents the jack symbol, a "10" symbol represents the ten symbol, and a "9" symbol represents the nine symbol. Other examples of symbols within the global symbol group are possible.

In at least some embodiments, the symbol group generally has a "hierarchy", which can define different values for at least some of the symbols. For example, a winning pattern including three lower-value symbols (e.g., a "9" symbol) will have a lower value than a winning pattern with three higher-value symbols (e.g., a "10" symbol).

However, such a global symbol group can be customized with particular symbols as desired. As some possible examples, the symbols can include images of people, animals, dinosaurs, fanciful creatures, cartoon characters, inanimate objects, or other things in addition to or instead of wild, ace, king, queen, jack, ten or nine symbols. Furthermore, wild symbols can vary in design. The global symbol group can be represented as a table (or other data structure) stored in the memory 114.

A memory can include one or more memories. For example, a memory can include the memory 114. As another example, a memory can include the memory 114a and the memory 114b. In accordance with this latter example, a memory can be arranged as a distributed memory. One or more processors can be operatively coupled to a memory. For example, the processor 112 is operatively coupled to the memory 114. As another example, the processor 112a is operatively coupled to the memory 114a, and the processor 112b is operatively coupled to the memory 114b. In accordance with this latter example, a processor can be arranged as a distributed processor.

Figure 3A:
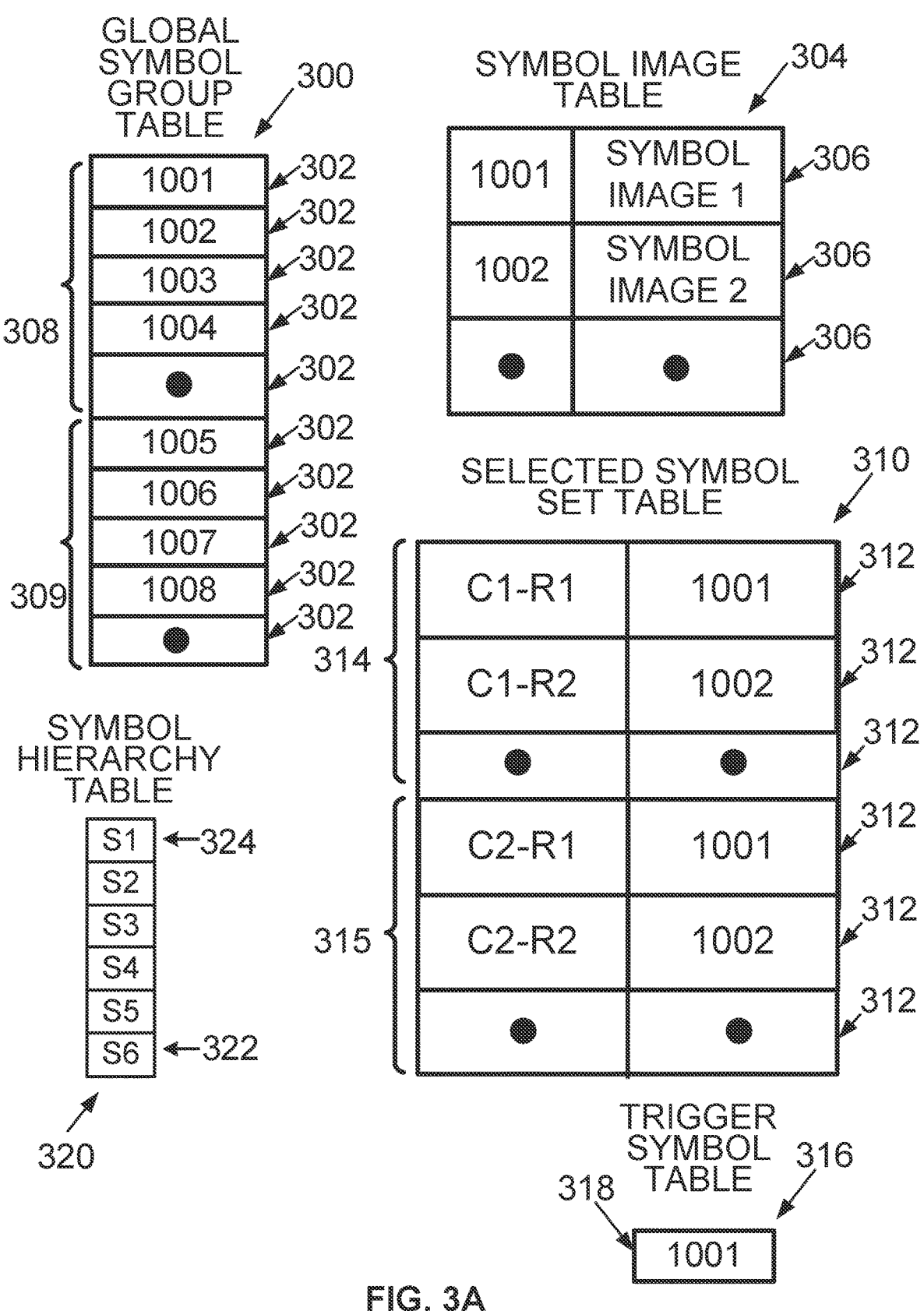
FIG. 3A and FIG. 3B show data that can be stored in a memory in accordance with the example embodiments.

Next, FIG. 3A shows data that can be stored in a memory (e.g., the memory 114, 114a, 114b) in accordance with the example embodiments. In particular, FIG. 3A shows a global symbol group table 300 in accordance with the example embodiments. The global symbol group table 300 includes multiple records 302 (e.g., the data in each row of the global symbol group table 300). Each record in the global symbol group table 300 can include a numeric or alpha-numeric identifier that represents a particular symbol. In one example, the global symbol group, and therefore the global symbol group table 300, can be divided into multiple subgroups (e.g., a sub-group 308, 309).

Figure 5:
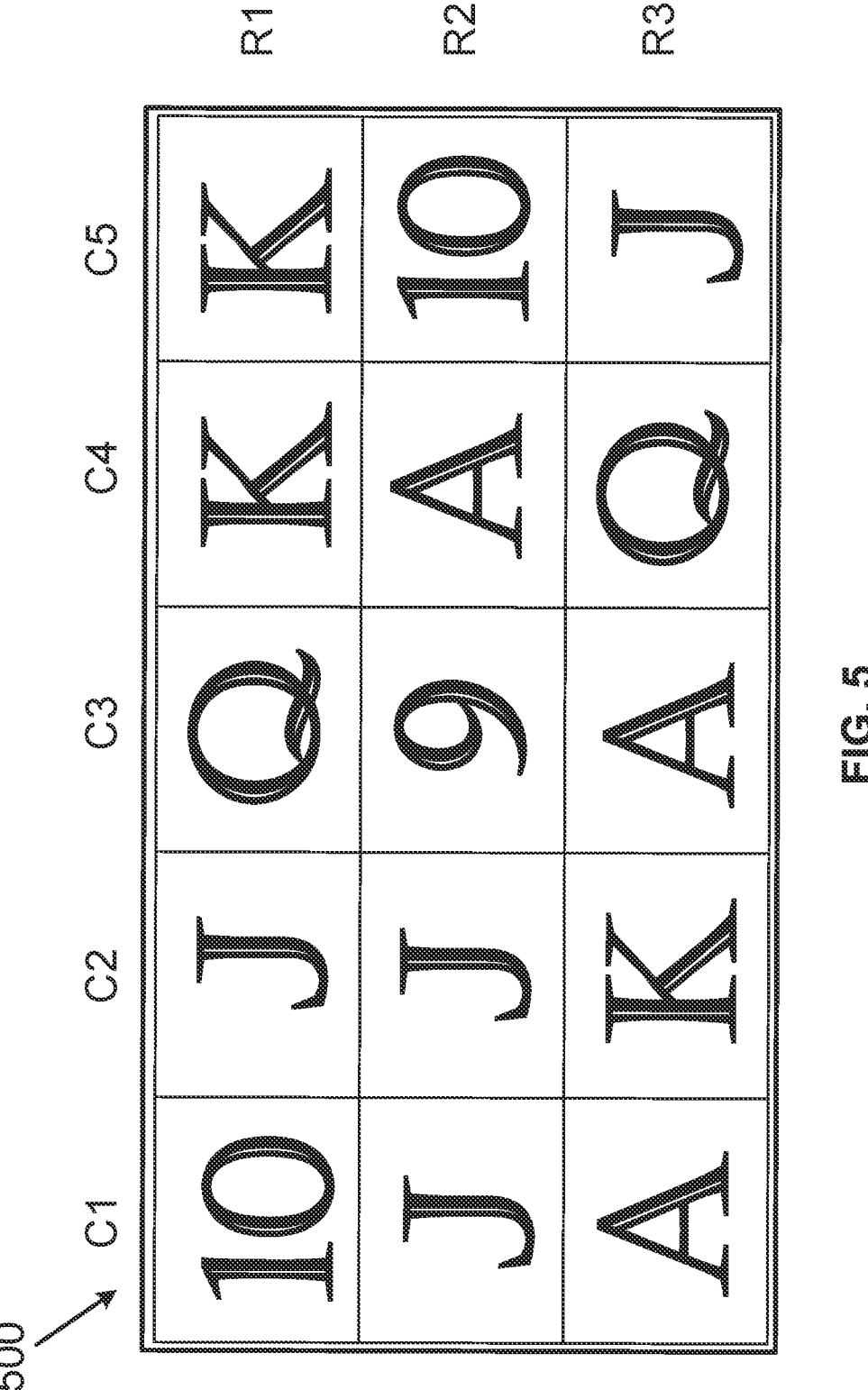
FIG. 5 depicts a selected symbol set in a display, in accordance with the example embodiments.

The global symbol group table 300 can be used in connection with a symbol image table 304. The symbol image table 304 includes multiple records 306 (shown as distinct rows of the symbol image table 304), each including an identifier that represents a particular symbol, and a corresponding displayable image. As such, the symbol image table 304 can be used to map an identifier in the global symbol group table 300 to a displayable image. Such an image can be arranged according to the Joint Photographic Experts Group (JPEG), Graphics Interchange Format (GIF), or Portable Network Graphics (PNG) encodings, for example. As an example, the image can include a representation of a symbol from a playing card in a typical deck of playing cards, such as a "9" symbol, a "10" symbol, a "J" symbol, a "Q" symbol, a "K" symbol, and an "A" symbols, examples of which are shown in FIG. 5. Other examples of symbols are also possible.

During the course of an event, various symbol sets can be selected for display. Each selected symbol set can be stored in a table such as a selected symbol set table 310. The selected symbol set table 310 includes multiple records 312 (shown as distinct rows in selected symbol set table 310), each record including a symbol position of the symbol, and an identifier that represents the symbol. As such, each symbol in the selected symbol set can correspond to a respective symbol position in a display arrangement (e.g., both a column number and a row number in a column-and-row arrangement). As an example, C1-R1, shown in the selected symbol set table 310, represents a symbol position at column 1 (e.g., a left-most column of multiple columns in a symbol-display-portion of display 110) and row 1 (e.g., a top row of multiple rows in a symbol-display-portion of the display 110). The column identifiers in the selected symbol set table 310 (e.g., C1 and C2) can refer to columns in a symbol matrix or reels of multiple reels that can be spun.

Portions of the multiple records 312 can be grouped into a respective subset of symbol records. As an example, a subset of symbol records can include all the symbol records for a particular column or reel in a matrix. For instance, a subset 314 of symbol records can include all the symbol records for column C1 and/or a corresponding reel, and a subset 315 of symbol records can include all of the symbol records for column C2 and/or a corresponding reel. A person having ordinary skill in the art will understand that the global symbol group table 300 can include more than two subsets of symbol records, and the subsets of symbol records can correspond to an aspect other than a particular column (e.g., a particular row).

In accordance with the example embodiments, the computing system 100 can select a symbol set for outputting on the user interface 104 by iterating through each record 312 in the selected symbol set table 310. As an example, for each symbol position in the selected symbol set table 310 (i.e., each symbol position in the left-most column of the selected symbol set table 310), the processor 112 can determine a symbol identifier from among the symbol identifiers in the global symbol group table 300. In at least some embodiments, the symbol identifiers are numbers and the processor 112 uses a random number generator to determine numbers in the global symbol group table 300 to associate with each symbol position in the selected symbol set table 310. Other examples of how the computing system 100 and/or the processor 112 randomly determine symbols for the selected symbol set table 310 are also possible.

In at least some embodiments, the computing system 100 determines each symbol of the selected symbol set table 310 by randomly selecting any symbol from within the selected symbol set table 310.

In at least some other embodiments, the computing system 100 determines each symbol of the selected symbol set table 310 by randomly selecting each symbol for each subset of symbol records (e.g., the subset 314, 315 of symbol records) from a corresponding sub-group within the global symbol group table 300. For example, the computing system 100 can determine the symbols for the subset 314 of symbol records by randomly selecting symbols from the sub-group 308 and determine the symbols for the subset 315 of symbol records by randomly selecting symbols from the sub-group 309.

In at least some embodiments, the computing system 100 can first determine the symbols within the selected symbol set table 310 from the global symbol group table 300 and then determine a symbol position for each of those symbols. Determining the symbol position for a symbol can include the computing system 100 randomly selecting a symbol position from among multiple remaining, unassigned symbol positions and assigning the selected symbol position to one of the predetermined symbols. As an example, selecting the symbol position for an embodiment in which the display arrangement is a column-and-row arrangement can include the computing system 100 randomly determining a column identifier and a row identifier (from a set of remaining, unassigned column and row identifier combinations) for each of the predetermined symbols until there is only one remaining, unassigned column and row identifier. A last predetermined symbol would then be assigned to correspond to the one remaining, unassigned column and row identifier. As another example, selecting the symbol position for an embodiment in which the display arrangement is specified using symbol position identifiers (e.g., whole number 1 through 15, inclusive) can include the computing system 100 randomly determining a symbol position identifier (from a set of remaining, unassigned symbol position identifiers) for each of the predetermined symbols until there is only one remaining, unassigned symbol position identifier. A last predetermined symbol would then be assigned to correspond to the one remaining, unassigned symbol position identifier.

In accordance with embodiment in which a column and row arrangement is used to simulate reels, the computing system 100 can display each subset of selected symbols in a corresponding column. As an example, the computing system 100 can superimpose each subset of selected symbols over a virtual reel in a corresponding column. Thus, a sub-group 308, 309 can represent an ordering of symbols on a particular reel.

As another example, the memory can contain a symbol hierarchy table 320. The symbol hierarchy table 320 can include an ordered list of symbols. The ordered list of symbols can include at least a portion of the symbols within global symbol group table 300. As shown in FIG. 3A, the symbol hierarchy table 320 includes a symbol S1, S2, S3, S4, S5, S6 arranged in an order from a first symbol 322 (i.e., symbol S6) to a final symbol 324 (i.e., symbol S1). A person having ordinary skill in the art will understand that the symbol hierarchy table 320 includes a different quantity of symbols. In accordance with at least some implementations, symbol S6 can be a "9" symbol, symbol S5 can be a "10" symbol, symbol S4 can be a "J" symbol, symbol S3 can be a "Q" symbol, symbol S2 can be a "K" symbol, and symbol S1 can be an "A" symbol.

FIG. 3A also shows a trigger symbol table 316. The trigger symbol table 316 can include an identifier 318 of one or more symbols a processor uses to determine whether an event has been triggered. As an example, the identifier 318 can include an identifier of a diamond symbol or some other symbol a processor uses to determine whether an event has been triggered by landing of the symbol represented by the identifier 318.

Figure 3B:
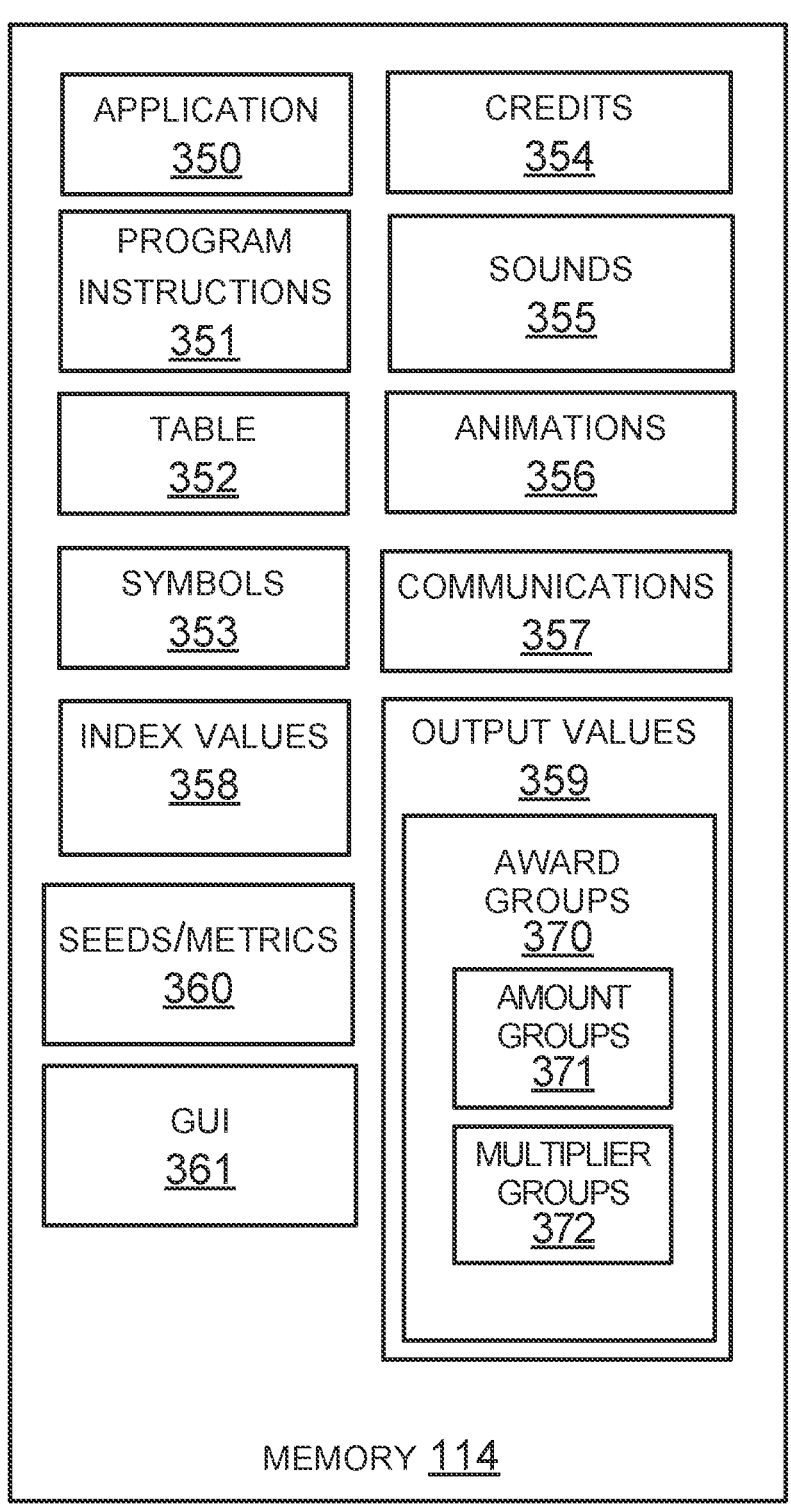

Next, FIG. 3B shows the memory 114 and data that can be stored in the memory in accordance with the example embodiments. The memory 114a can contain at least some of the data stored in the memory 114. Likewise, the memory 114b can contain at least some of the data stored in the memory 114. In at least some embodiments, at least a portion of the memory 114 is embodied as a data register within the processor 112.

As shown in FIG. 3B, the memory 114 can include one or more from among: an application 350, program instructions 351, a table 352, symbols 353, credits 354, sounds 355, animations 356, communications 357, index values 358, outcome values 359, seeds and metrics 360, and a GUI 361.

The application 350 can include any software application discussed in this description. The application 350 can also include an operating system, such as any operating system described in this description.

Figure 8:
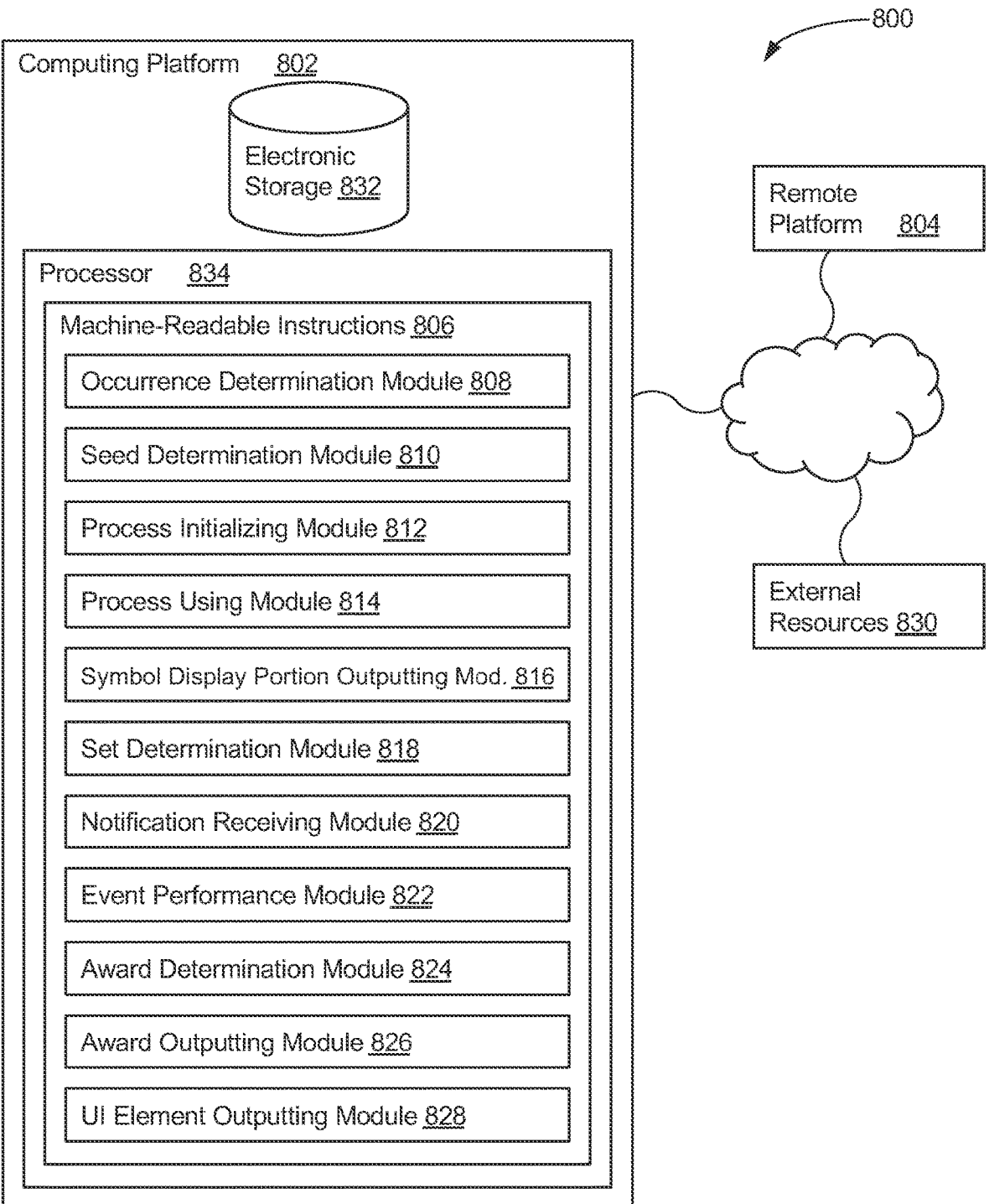
FIG. 8 is a block diagram of a computing system configured for reel-based events with a seed-based feature, in accordance with the example embodiments.
Figure 9:
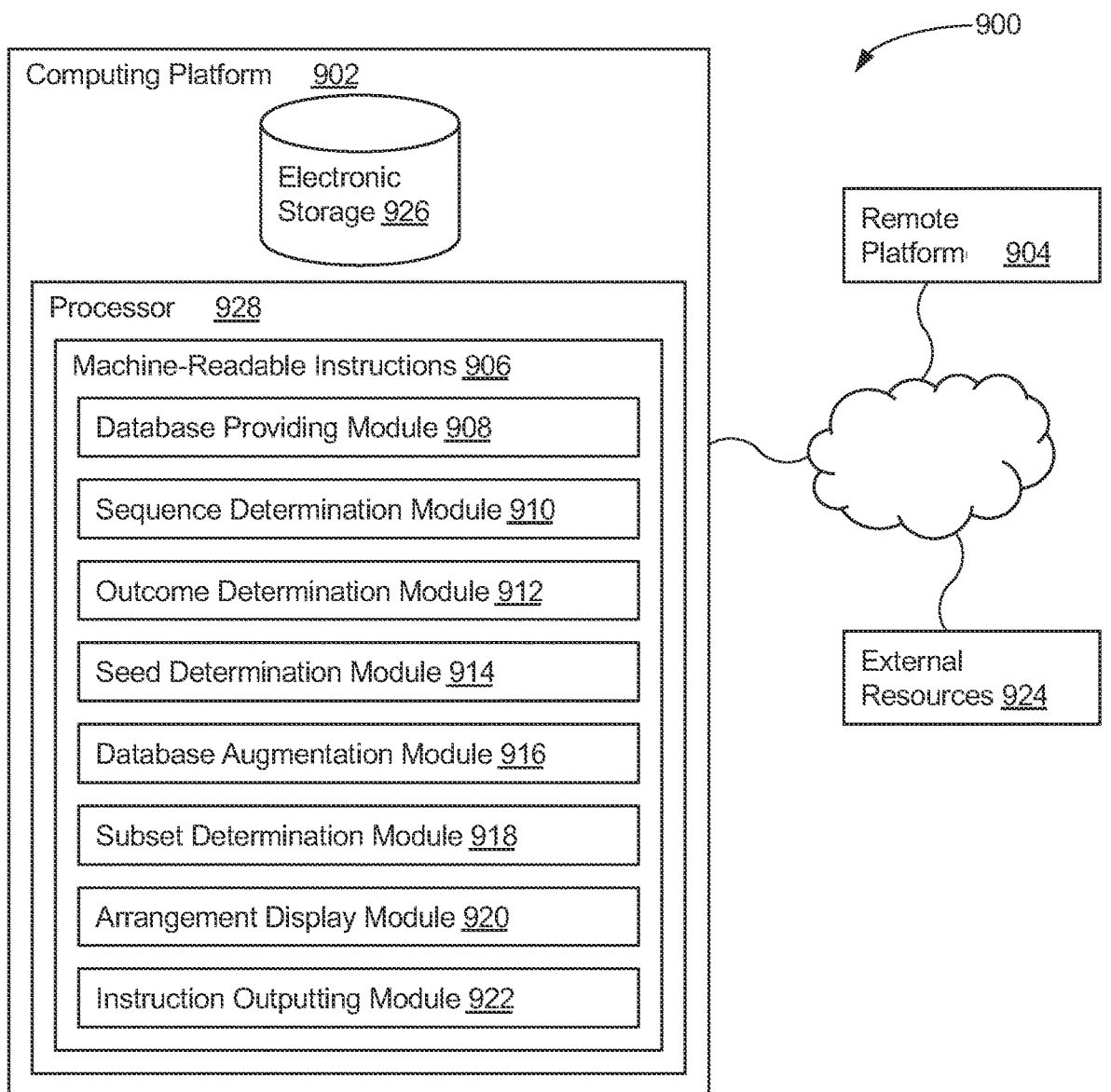
FIG. 9 is a block diagram of a computing system configured for reel-based events with a seed-based feature, in accordance with the example embodiments.

The program instructions 351 are computer-readable program instructions (e.g., machine-readable instructions) executable by one or more processors. The program instructions 351 can be executable to cause a computing system or a component of the computing system to perform any function described in this description. The program instructions can include the application 350. The program instructions 351 can include one or modules. As an example, the modules of the program instructions 351 can include one or more from among an occurrence determination module 808, a seed determination module 810, a process initializing module 812, a process using module 814, a symbol display portion outputting module 816, a set determination module 818, a notification receiving module 820, an event performance module 822, an award determination module 824, an award outputting module 826, or a user interface element outputting module 828. Each of those modules is shown in FIG. 8. As another example, the modules of the program instructions 351 can include one or more from among a database providing module 908, a sequence determination module 910, an outcome determination module 912, a seed determination module 914, a database augmentation module 916, a subset determination module 918, an arrangement display module 920, or an instruction outputting module 922. Each of those modules is shown in FIG. 9.

The table 352 can include one or more tables, such as one or more tables shown in FIG. 3A. In at least some embodiments, the memory 114 can contain any data described as being stored in a table in some manner other than a table. As an example, the memory 114 can store program instructions that include data described as being contained in a table. As another example, the table 352 can include a pay table. As an example, a pay table can include data indicating an arrangement of symbols that can land on a payway or payline and an award amount corresponding to each arrangement of symbols. As an example, an award output on a computing system could include an award amount within the pay table or an award amount in the pay table times a multiplier value. Table A shows data contained in a pay table based on symbols shown in FIG. 5.

TABLE A

| Symbols | | | | | Award Amount |
|---|---|---|---|---|---|
| A | A | A | A | A | 100 |
| A | A | A | A | | 75 |
| A | A | A | | | 50 |
| K | K | K | K | K | 60 |
| K | K | K | K | | 50 |
| K | K | K | | | 40 |
| Q | Q | Q | Q | Q | 50 |
| Q | Q | Q | Q | | 40 |
| Q | Q | Q | | | 30 |
| J | J | J | J | J | 40 |
| J | J | J | J | | 30 |
| J | J | J | | | 20 |
| 10 | 10 | 10 | 10 | 10 | 30 |
| 10 | 10 | 10 | 10 | | 20 |
| 10 | 10 | 10 | | | 10 |

The symbols 353 can include computer-readable data a processor can read to generate a symbol on a display screen, graphical display unit, graphical display interface, or GUI. As an example, the symbols 353 can include a respective computer-readable file (e.g., a bitmap file) for each symbol. As another example, the symbols 353 can include a computer-readable file a processor can read to generate any symbol discussed in this description and/or shown in the drawings, such as a "9" symbol, a "10" symbol, a "J" symbol, a "Q" symbol, a "K" symbol, or an "A" symbol. A table, such as the symbol image table 304, can include an index value (e.g., a numerical identifier or a file name) corresponding to a symbol in the symbols 353.

The credits 354 can include a number of credits available for a user of a computing system. The number of credits can be referred to as a credit value. If the credits 354 are stored in the memory 114b, the credits can include a number of credits available for a user of the computing system 100b. If the credits 354 are stored in the memory 114a, the credits can include a respective number of credits available for a user of a respective computing system arranged like the computing system 100b. A processor can update the credits available for each user based on payments entered at a computing system by that user, awards earned by use of the computing system by that user, and/or by use of an acceptor and/or validator. The credit value can be output on the display 110, 110a, 110b. The credit value can be based upon a quantity of coins, tokens, and/or bills entered using an acceptor.

The sounds 355 include audio files (e.g., an audio clip) that the processor 112 can output to a speaker. Outputting an audio file can include outputting a signal that produces a particular sound when the signal passes through a speaker. As an example, the particular sound can include a first particular sound to play when reels are spinning on the display 110b or a second particular sound to play when symbols are being upgraded between outcome events. As another example, the particular sound can include a particular sound played for first, second, third, or fourth operating states discussed below with respect to FIG. 13. As another example, the sounds 355 can include an audio file, such as an audio file with one of the following file name extensions: WAV, MP3, MP4, WMA, or some other file name extension.

Each sound in the sounds 355 can correspond to an index value such that the processor 112a can provide the processor 112b with an instruction including a particular index value so that the processor 112b outputs via the speaker 111b an audio file corresponding to the particular index value. Accordingly, the processor 112a does not have to transmit the audio file to the processor 112b each time the audio file is to be output via the speaker 111b.

The animations 356 can include computer-readable files containing animations on a display, such as the display 110, 110a, 110b. As an example, the animations 356 can include animation files, such as an animation file with one of the following file name extensions: GIF, PNG, JPEG, SVG, or some other file name extension. Each animation in the animation 356 can correspond to an index value such that the processor 112a can provide the processor 112b with an instruction including a particular index value so that the processor 112b outputs via the display 110b an animation file corresponding to the particular index value. Accordingly, the processor 112a does not have to transmit the animation file to the processor 112b each time the animation file is to be output via the display 110b.

In at least some embodiment, an animation of the animations 356 is an entire graphical display output on display 110, 110a, 110b. In at least some other embodiments, an animation of the animations 356 is a portion of a graphical display output on display 110, 110a, 110b. Moreover, in at least some of those latter embodiments, multiple animations of the animations 356 are respective portions of a graphical display output on display 110, 110a, 110b.

The communications 357 include one or more communications, such as one or more from among: a communication sent by the processor 112 coupled to the memory 114, a communication generated for transmitting by the processor 112 coupled to the memory 114, or a communication received by the computing system 100. As an example, for embodiment in which the communications 357 are stored in the memory 114a, the communications 357 can include a communication sent by the processor 112a to the computing system 100*b*, a communication generated for transmitting by the processor 112*a* coupled to the computing system 100*b*, or a communication received by the computing system 100*a*. As another example, for embodiment in which the communications 357 are stored in the memory 114*b*, the communications 357 can include a communication sent by the processor 112*b* to the computing system 100*a*, a communication generated for transmitting by the processor 112*b* coupled to the computing system 100*b*, or a communication received by the computing system 100*b*.

The index values 358 can include a variety of index values. As an example, the index values 358 can include index values corresponding to a stop position on a reel, such as the index values shown in Table C. The index values 358 can include index values corresponding to a stop position on a set of reels different than the reels represented in Table C. As another example, the index values can include sets of index values corresponding to a particular seed input into a deterministic algorithm. Table D shows an example of six sets of index values corresponding to six different seeds. As another example, the index values 358 can include a supplemental index, such as a supplemental index that corresponds to a graphical user interface. Table F shows an example of a supplemental index.

The outcome values 359 can include values that indicate a pre-selected prize amount. The pre-selected prize amount can be associated with a free bonus spin and may be expressed as a win multiplier, specifying a winning return as a function of an initial payment, for example, 6× a $1 wager or $6. As an example, for an implementation in which a portion of a GUI is output on the display 110, 110*a*, 110*b*, the value of the pre-selected prize amount can be displayed with a winning outcome indicator 411 (shown in FIG. 4). As another example, the pre-selected prize amount can indicate a quantity of free spins of a set of reels.

The outcome values 359 can include award groups 370 having one or more categories of award groups. As an example, the award groups 370 can include amount groups 371 and/or multiplier groups 372. An award group can specify each award in the award group individually (e.g., one credit, two credits, three credits, four credits, and five credits) or as a range of awards (e.g., one to five credits). Award groups in a particular category can be weighted relative to other award groups in the particular category. Examples of award groups of the multiplier groups 372 are discussed below.

The seeds and metrics 360 can include a seed or a group of seeds and metrics corresponding to that seed or group of seeds. The seeds of the seeds and metrics 360 can include multiple groups of seeds corresponding to different predetermined awards, such as the group of seeds shown in Table B above, which correspond to the predetermined award discussed above with respect to Table B.

The metrics of the seeds and metrics 360 can include data that indicates which predetermined award or award group corresponds to a seed or a group of seeds. As an example, the metrics can include a set of metrics including one or more from among a total award amount, a quantity of cascading symbols, a quantity of anticipation events, a quantity of re-triggered free spins, or a quantity of free spins. As another example the metrics of the seeds and metrics 360 can include a predefined threshold set of metrics one or more from among a predefined total award amount, a predefined quantity of cascading symbols, a predefined quantity of anticipation events, a predefined quantity of re-triggered free spins, or a predefined quantity of free spins. The database can include multiple determined seeds corresponding to the set of metrics. The set of metrics corresponding to the multiple determined seeds can include metrics that meet (e.g., equal) the predefined threshold set of metrics.

The GUI 361 can include one or more graphical user interfaces. A GUI within the GUI 361 can include a static GUI that includes content that does not change. Additionally, or alternatively, a GUI within the GUI 361 can include a dynamic GUI with one or more aspects that are configured to change while the GUI is output on the display 110, 110*a*, 110*b*. As an example, a changeable aspect of a GUI can include an aspect in which an animation of the animations 356 is displayed. In particular, for example, the aspect can include a symbol display portion in which an animation of a selected reel set is spun and stopped during a feature game described herein. As another example, a GUI within the GUI 361 can include a symbol display portion, such as a symbol-display-portion 402 discussed with respect to a GUI 400 shown in FIG. 4, or a partial display portion 600 shown in FIG. 6, or a partial display portion 700 shown in FIG. 7.

Figure 4:
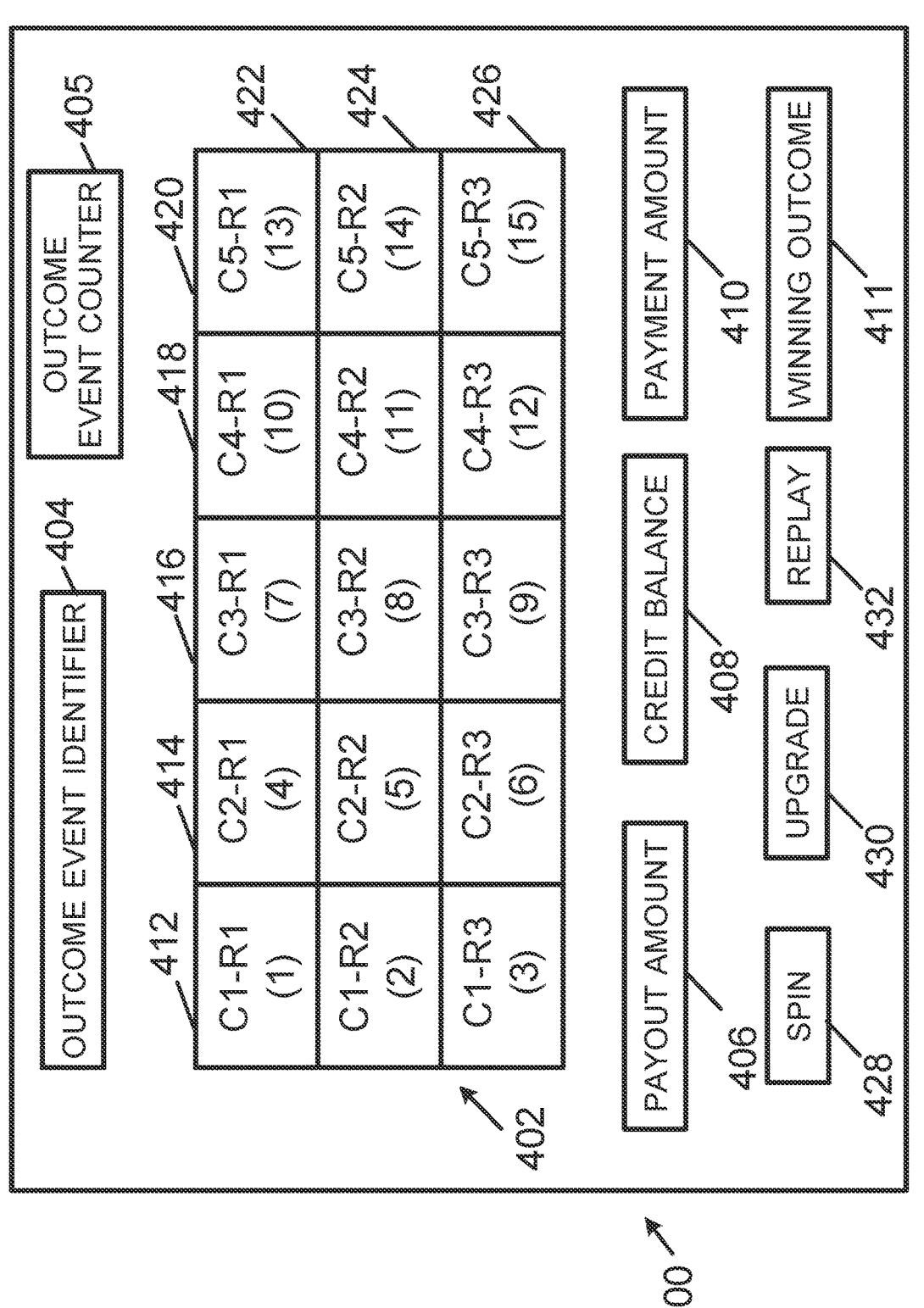
FIG. 4 shows a graphical user interface in accordance with the example embodiments.

Next, FIG. 4 depicts a GUI 400 that the computing system 100, the computing system 100*a*, or the computing system 100*b* can output on the display 110, 110*a*, and 110*b*, respectively. For purposes of this description, each element of the GUI 400 can be a displayable element of the GUI 400. The GUI 400 includes a symbol-display-portion 402, an outcome event identifier 404, an outcome event counter 405, a payout amount indicator 406, a credit balance indicator 408, a payment amount indicator 410, and a winning outcome indicator 411.

The symbol-display-portion 402 can include multiple symbol-display-segments and multiple symbol positions. As an example, the symbol-display-segments can include a vertical symbol-display-segment (SDS) 412, 414, 416, 418, 420. As another example, the symbol-display-segments can include a horizontal symbol-display-segments 422, 424, 426. Each symbol-display-segment can include multiple symbol positions. The vertical SDS 412 to the vertical SDS 420 are shown as having three symbol positions. The horizontal SDS 422, 424, 426 are shown as having five symbol positions. A person skilled in the art will understand that those symbol-display-segments can be configured with a different number of symbol positions.

In at least some embodiments, the vertical SDS 412, 414, 416, 418, 420 is configured as a spinnable reel. The GUI 400 can display the spinnable reels spinning by displaying an animation of the reels spinning and the displaying reels coming to a stop. For vertical SDS 412, 414, 416, 418, 420, the spinnable reels can spin in a vertical direction (e.g., top to bottom or bottom to top, with respect to the symbol-display-portion 402).

In at least some other embodiments, the horizontal SDS 422, 424, 426 is configured as a spinnable reel. The GUI 400 can display the spinnable reels spinning and stopped after spinning. For the horizontal SDS 422, 424, 426, the spinnable reels can spin in a horizontal direction (e.g., left to right or right to left, with respect to the symbol-display-portion 402).

The computing system 100 can cause a symbol-display-segment to spin, and to cause a spinning symbol-display-segment to stop spinning. The spinning and stopping of the spinning symbol-display-segment can be carried out for each outcome event. In accordance with the embodiments in which the symbol-display-portion 402 includes columns or reels that spin from top to bottom or bottom to top, spinning the reels can include starting the spinning from a left-most column or reel to a right-most column or reel. Stopping the reels can occur using a similar sequence. Other sequences of spinning and stopping the spinning can be used. Moreover, the spinning or stopping of spinning of two or more columns or reels can occur simultaneously.

The multiple symbol positions in the symbol-display-portion 402 are identified by column and row designators, in which C1=column 1, C2=column 2, C3=column 3, C4=column 4, C5=column 5, R1=row 1, R2=row 2, and R3=row 3. The multiple symbol positions in the symbol-display-portion 402 are also identified by distinct numerical identifiers shown within parenthesis. C1 can be a first SDS. C2 can be a second SDS. C3 can be a third SDS. C4 can be a fourth SDS. C5 can be a fifth SDS. As shown in FIG. 4, C2 is between C1 and C3, C3 is between C2 and C4, and C4 is between C3 and C5.

For a matrix arrangement with 15 symbol positions as shown in FIG. 4, the numerical identifiers can be whole numbers 1 through 15, inclusive. The processors or computing systems described herein can be configured to select a symbol position of the symbol-display-portion 402 using a random number generator that is configured to generate a number within the range 1 through N, inclusive, where N equals the number of symbol positions in the symbol-display-portion 402. For the matrix arrangement, each symbol-display-segment can be a distinct column of the multiple columns within the matrix. Alternatively, for the matrix arrangement, each symbol-display-segment can be a distinct row of the multiple rows within the matrix.

The processor of a computing system described herein can determine an operating state of the computing system and/or an outcome event that can occur during the determined operating state. In response to making those determination(s), the processor can cause the outcome event identifier 404 to display an identifier of the outcome event that can occur during the determined state. For example, the outcome event identifier can identify a base outcome event, a bonus outcome event or another type of outcome event. The bonus outcome event can be a "free spins" outcome event or some other outcome event.

The processor of a computing system described herein can determine a payment amount placed on an outcome event, an award or payout amount after or during occurrence of an outcome event resulting in a win, a credit balance after or while decreasing a number of credits based on a payment or after or while increasing a number of credits based on a determined award or payout amount, and/or a number of awarded remaining outcome events that can occur. The processor can cause the determined payment amount to be displayed by the payment amount indicator 410, the determined payout amount to be displayed by the payout amount indicator 406, the determined credit balance to be displayed by the credit balance indicator 408, and the number of awarded remaining outcome events to be displayed by the outcome event counter 405. The processor can cause the winning outcome (e.g., a pre-selected prize) to be displayed by the winning outcome indicator 411 (e.g., 12× the wager).

In at least some embodiments, a memory (e.g., the memory 114, 114a, 114b) can include a payout table. Moreover, in at least some of those embodiments, a processor (e.g., the processor 112, 112a, 112b) can read at least a portion of the payout table within the memory. In at least some embodiments, the processor can output at least a portion of the table on a user interface (e.g., the user interface 104, 104a, 104b). The payout table can indicate various sets or combinations of symbols that are defined as a winning outcome and an award or payout corresponding to each winning outcome. A symbol in those sets or combinations can include a regular symbol or a wild symbol. A regular symbol represents only a single symbol. In contrast, a wild symbol can represent one or more regular symbols depending on what regular symbol is needed for a particular payline or payway including the wild symbol to result in a winning outcome and how many paylines or payways are evaluated by the processor.

As an example, a winning outcome can include three instances of the same regular symbol (or a combination of the same regular symbol and one or more wild symbols in three symbol positions) along a given payline or payway. As another example, a winning outcome can include four instances of the same regular symbol (or a combination of the same regular symbol and one or more wild symbols in four symbol positions) along a given payline or payway As yet another example, a winning outcome can include five instances of the same regular symbol (or a combination of the same regular symbol and one or more wild symbols in five symbol positions) on a given payline or payway. As yet another example, an award corresponding to one or more of the aforementioned winning outcomes can include an award of one or more credits added to a credit meter balance contained in a memory for a user using the computing system 100b. Other examples of a winning combination and a corresponding award within the payout table are possible.

The GUI 400 can include one or more user-selectable controls (USCs). As shown in FIG. 4, the GUI 400 can include a USC 428, 430, 432. Selection of the USC 428, 430, 432 can cause the processor 112b and/or another component of the computing system 100b to perform one or more functions. As an example, selection of the USC 428 can cause the processor 112b to transmit a spin request and/or a communication including a spin request. As another example, selection of the USC 430 can cause the processor 112b to upgrade a symbol shown on the display and/or to transmit a communication including an upgrade request. As yet another example, selection of the USC 432 can cause the processor 112b to replay an outcome event via the user interface 104b.

In at least some embodiments, a USC on a GUI can be reconfigured depending on an operating state of the computing system 100, the computing system 100a, or the computing system 100b. As an example, a single USC on the GUI 400 can be configured as the USC 428 when the computing system 100b is operating in an operating state in which the computing system 100b is not performing an outcome event for the computing system 100b, and as the USC 430 when the computing system 100b is operating in an operating state in which the computing system 100b is performing an outcome event for the computing system 100b. In at least some of those embodiments, the single USC can be unelectable while the computing system 100b is performing an outcome event for the computing system 100b until the processor determines the outcome event includes a winning combination on a payline or payway.

Next, FIG. 5 shows a selected symbol set 500 in accordance with the example embodiments. The selected symbol set 500 can include symbols selected from the global symbol group table 300 for display during an outcome event. The symbols shown in FIG. 5 are arranged according to the symbol-display-portion 402. In particular, the selected symbol set 500 includes: (i) a "10" symbol at a symbol position C1-R1 and a symbol position C5-R2, (ii) a "J" symbol at a symbol position C2-R1, a symbol position C1-R2, a symbol position C2-R2, and a symbol position C5-R3, (iii) a "Q" symbol at a symbol position C3-R1, a symbol position C3-R2, and a symbol position C4-R3, (iv) a "K" symbol at a symbol position C4-R1, a symbol position C5-R1, and a symbol position C2-R3, and (v) an "A" symbol at a symbol position C4-R2, a symbol position C1-R3, and a symbol position C3-R3. Other arrangements of symbols, in terms of the number of columns, number of rows, or the layout of symbols, are possible.

III. Example Operation

Reel-based events include using a plurality of reels, each reel having a multitude of symbols thereon. For each event of a particular reel-based event, reel positions are randomly determined, and the reel positions then define a result of the reel-based event. For virtual reel-based events (also known as electronic reel-based events), a random number generator (RNG) is generally used to determine the position that each reel will land on during a reel-based event. If the resultant reel positions correspond to a particular pattern that is needed for a prize to be awarded (as defined in a pay table associated with the particular reel-based event), a user is awarded with the corresponding prize.

Reel-based events can include mechanics that are exceedingly complex, while use of an RNG for each spin of the reels can be memory or processing intensive. In addition, for high volatility reel-based events, a user can experience a sequence of reel-based events (or, reel-based event results) that result in an undesirable or disappointing reel-based event experience. This can be particularly evident in a reel-based event sequence involving more than one iteration of reel spins—for example, a free spins bonus round, where several spins can play out one after the other.

At least some of the implementations described herein address the aforementioned shortcomings and/or other shortcomings by providing control of, or limits to, the randomness of performing reel-based events, at least under some circumstances, in order to ensure that a computing device outputs an appropriate reel-based event experience. A bonus round experience (for example, as part of a free spin sequence) is provided that is crafted and shaped to deliver specific metrics. It will be possible to craft the intended user experience within bonus rounds (or, in some circumstances, within normal reel-based events), with minimal memory. The method and computing system provide a desired experience of performing reel-based events, while the database stores a minimal amount of data.

A developer or provider of reel-based events may wish to provide a bonus round experience (for example, as part of a free spin sequence) that is crafted and shaped to deliver specific metrics. This may ensure a desired reel-based event performance experience to a user. The characteristics of such a bonus round may be referred to as the "attributes" of the bonus round.

Due to the complexity of the mechanics of reel-based events, the creation of individual RNG-based requests that work together to provide a fully random result (which is a typical implementation in slot services) is not a practical approach for crafting and refining the free spins experience for a user. The extent of randomness may result in a user having a poor bonus round experience. Where a bonus round is only delivered to a user on average once every, say, 100 spins (as a result of the pre-determined randomness of a reel-based event), a poor bonus round experience may result in the user losing interest in the reel-based event itself. A different approach is needed that will provide a user with a bonus round that include the metrics they may typically want to see.

A possible approach is a so-called "prize-first" implementation. With a prize-first implementation, a significant number of suitable, or desired, session outcomes are pre-generated, with each session outcome meeting the desired metrics. These outcomes are then stored in memory and are indexed by the attributes that a provider or operator of reel-based events may want to select by when a user triggers such a pre-determined outcome. When a bonus round, or free spin session, is triggered, an outcome may be randomly chosen from the several stored session outcomes, and the outcome may then be output by the computing system, one spin result at a time.

This approach meets the desired requirements for crafting the user experience, but the memory and/or data storage requirements of such a service may be prohibitively high, as each pre-generated outcome sequence will contain many pieces of data over several evaluations and spins. This may include, for example, several reel positions, results and the like, over multiple free spin rounds.

To implement the proposed prize-first implementation may require a different approach that allows a reduction in the expected data/memory usage in the example above.

In at least some implementations of the present embodiments, a deterministic algorithm and a database are stored on a server (e.g., a computing system 100 shown in FIG. 1B, a computing system 100a shown in FIG. 2, a computing system 100b also shown in FIG. 2, a computing system 800 shown in FIG. 8, or a computing system 900 shown in FIG. 9). In at least some of those embodiments, indices and symbols corresponding to the indices are determined at the server, and the server provides a client with the symbols for generating pre-determined outcomes on a display.

In at least some other implementations, the deterministic algorithm is stored on the server, and at least portions of the database are stored on the server and the client. As an example, the database at the server and the client can stored indices and the database at the server can store symbols. The symbols can be associated with particular reels and reel stops on the reels. In at least some of these embodiments, the server determines the indices, transmits the determined indices to the client. The client uses the indices transmitted by the server to determine symbols corresponding to the indices. Transmitting indices instead of symbols can reduce an amount of traffic on a network between the server and client.

In at least some embodiments in which a server sends indices instead of symbols to a client, the server can encrypt the indices before sending the indices to the client.

It should be noted that a sequence of results may not be unique to a free spins (bonus) round but may be part of a reel-based event in other situations, for example in a reel-based event sequence where a computing system receives payment for, for example, a set of spins (for example 50 spins) to play out one after the other. The implementation of the proposed disclosure should thus not necessarily be limited to a bonus round experience.

The present approach is to use a deterministic process or algorithm (a deterministic algorithm is an algorithm that, given a particular input, will always produce the same output, with the underlying machine always passing through the same sequence of states) that generates an outcome of a bonus round, or free spin session, starting from a single "seed" value. As an example, a seed value used by the deterministic algorithm can have between 4 and 64 bits, inclusive. For instance, the seed value may be a 32-bit value. Other examples of the number of bits of a seed value are also possible.

This seed value is used to initialize a pseudorandom number generator (PRNG), which will produce the same sequence of numbers for the same initial seed. If this sequence of numbers is used to continuously select reel positions (or, the symbols that will land, whether directly or via reel stop positions), the same outcome will be produced every time the same seed is used.

The deterministic algorithm requires a single seed value as input, and produces the full outcome of a free spin session (bonus round), including all details of exactly which symbols are dropped, which are destroyed, all win amounts, etc.

Any appropriate deterministic algorithm may be used to implement the proposed approach. For example, an algorithm that provides multiple outputs from a single input value could be used. In a proposed embodiment, a random number generator is used, and a seed value is used is initial input. The resultant output of the algorithm is recorded and is then also used as the next input value to the same algorithm. In this manner, a single input (seed) value will lead to several outputs, for as many times that as the algorithm is recalled based on how many results are requested/needed. For example, when ten results are needed, a single seed value is used to provide a first output. This output is recorded and is used as the next input. This is then repeated until ten outputs have been recorded.

As an example, the deterministic algorithm can include and/or use a PRNG such as the Permuted Congruential Generator (PCG) Random, Minimal C implementation 0.9, PCG Random, C++ implementation 0.98, or PCG Random, Minimal C 0.94. As another example, the deterministic algorithm can be any other deterministic algorithm to implement features of the implementations. In at least some implementations, using the deterministic algorithm with a seed (e.g., a seed that is randomly selected to initialize the deterministic algorithm or a seed generated by the deterministic algorithm) can generate one or multiple index values for each seed. In at least some of those implementations, the random selection of the seed includes a random selection of a seed from a group of seeds corresponding to an outcome of an event, such as a reel-based event.

A process or program is used to iterate through all possible seed values (or, alternatively, through a sufficient number of seed values yielding a desired dataset), calling the algorithm for each seed value to produce a unique outcome. If used as above, with output values used as input values, the algorithm may be seeded and iterated as many times as required. The outcomes are then procedurally evaluated based on multiple metrics (for example, a total win amount, number of cascades of symbols, anticipation events provided to a user, re-triggers, number of rounds played out, etc.) that defines attributes associated with reel-based event tied to the particular seed value. If the full set of outcomes meets pre-selected requirements of a developer of reel-based events, the seed may be stored, along with the important attributes that its corresponding outcome produces. These attributes may then be used to select free spin sessions that a developer of reel-based events may wish to provide to a computing system.

A total win amount may be a primary attribute that a developer of reel-based events may use to classify possible outcomes. Many possible secondary attributes may be utilized. As set out above, "cascades of symbols" refers to a reel-based event where winning symbols in a spin result are removed from the display and replaced by other symbols—this may provide the user with another chance at winning for the same spin. "Anticipating events" may be where, for example, three symbols are required to offer a special feature or prize, and the user anticipates a potential win—appropriate animations may accompany such an event. "Re-triggers"

refer to a situation where a free spin session being re-initiated or continued where it may have ended, for example when an appropriate symbol or symbol combination lands during the bonus round. "Number of rounds played out" may be influenced by the default number of free spins provided to by a computing system (for example, 10 spins), and re-triggers (to provide, for example, 30 total spins). However, any reel-based event feature may be monitored in the analysis of the outcomes and may be used as a (secondary) measure to classify the outcomes.

Using the above mechanism, a database of seeds can be built up, indexed by one or more of the defined attributes. This data is then incorporated into the math service for the reel-based event. The math service can comprise logic implemented on a server. The math service can be used in response to a spin request. Moreover, the deterministic algorithm can be separate from the math service. The math service can be called (separate from the deterministic algorithm) to use an RNG.

During performance of a reel-based event, when a computing system determines occurrence of a particular outcome event (e.g., a free spin session has been triggered), a winning outcome (often expressed as a win multiplier, specifying a winning return as a function of an initial payment) is generated at random by the math service. This could be considered a prize that is pre-selected for the free spins session (i.e., a "prize first" implementation) awarded by the computing system. Then, the appropriate list of seeds that matches the selected win multiplier is retrieved/consulted, and a seed is randomly selected from such list. These random selections could be weighted as desired, and this randomness is separate from the RNG used to generate the outcome from the seed. In at least some embodiments, weights corresponding to awards can be changed dynamically.

As noted above, in at least some embodiments, awards can be grouped into multiple groups, such as the multiplier groups 372. As an example, multiplier awards of 1×, 2×, and 3× can be grouped into a first award group and multiplier awards of 4×, 5×, and 6× can be grouped into a second award group. Awards within an award group can be weighted to impact an ongoing RTP of reel-based events. For instance, if the on-going RTP is trending higher than desired, weights corresponding to the awards in the first group and the second group can be set so that the weights of the awards in the first and second groups decrease as the multiplier award increases. In contrast, if the on-going RTP is trending lower than desired, weights corresponding to the awards in the first group and the second group can be set so that the weights of the awards in the first and second groups increase as the multiplier award increases.

In at least some embodiments, an award group can be weighted to impact the ongoing RTP. For example, if the on-going RTP is trending higher than desired, a weight corresponding to the first group of awards can be made greater than a weight corresponding to the second group of awards. Such change in weights can make it more likely that an award is selected from the first group rather than the second group. In contrast, if the on-going RTP is trending lower than desired, a weight corresponding to the first group of awards can be made lower than a weight corresponding to the second group of awards. Such change in weights can make it more likely that an award is selected from the second group rather than the first group.

In at least some other embodiments, weights corresponding to seeds can be changed dynamically. The changes can be based on a past selection of seeds. As an example, the seeds corresponding to a particular pre-determined outcome are 5, 10, 17, 10817, and 44. The seeds corresponding to the particular pre-determined outcome can be referred to as a particular seed group (i.e., group of seeds). Initializing the deterministic algorithm with any one of those seeds and iteratively using the deterministic algorithm a quantity of times for a particular transaction lead to the pre-determined outcome. As another example, past selection of seeds to achieve the predetermined outcome could be as follows: 5, 5, 10817, 5, 44, 44, 5, 10. Table B below shows an example of the seeds for the pre-determined outcome, counts indicating how many time each seed was selected in the past, and weights that be associated with each seed to set a probability that each seed with be selected in the future the next time the pre-determined outcome is to be provided.

TABLE B

| Seed | Count | Weight |
|---|---|---|
| 5 | 4 | 1 |
| 10 | 1 | 2 |
| 17 | 0 | 5 |
| 10817 | 1 | 2 |
| 44 | 2 | 3 |

Once a seed is selected, the math service uses it to seed the algorithm (the RNG as per the above example), and the expected outcome is then generated. The outcome will match the outcome that was evaluated when choosing to include the used seed in the database, as a deterministic algorithm is used. A desired (and expected) set of reel positions will then be generated by the algorithm and may be provided one by one on a display of the computing system, as per normal reel-based events. The exact same sequence of reel positions, as was evaluated when including the seed into the list of seed values, will be reproduced.

In this manner, a developer of reel-based events may ensure that a computing system outputs a desired reel-based event experience.

A reel-based event may have the following 25 possible outcomes shown in Table C. As an example, the Reel 1, the Reel 2, the Reel 3, the Reel 4 and the Reel 5 in Table C corresponds to the SDS 412, 414, 416, 418, 420, respectively in FIG. 4.

TABLE C

| Index | Reel 1 | Reel 2 | Reel 3 | Reel 4 | Reel 5 |
|---|---|---|---|---|---|
| 0 | Bar | Bar | Bar | Bar | Bar |
| 1 | Seven | Seven | Seven | Seven | Seven |
| 2 | Blank | Blank | Blank | Blank | Blank |
| 3 | Cherry | Cherry | Cherry | Cherry | Cherry |
| 4 | Bell | Bell | Bell | Bell | Bell |
| 5 | Grape | Grape | Grape | Grape | Grape |
| 6 | Cherry | Cherry | Cherry | Cherry | Cherry |
| 7 | Bar | Bar | Bar | Bar | Bar |
| 8 | Bell | Bell | Bell | Bell | Bell |
| 9 | Blank | Blank | Blank | Blank | Blank |
| 10 | Cherry | Cherry | Cherry | Cherry | Cherry |
| 11 | Bar | Bar | Bar | Bar | Bar |
| 12 | Bell | Bell | Bell | Bell | Bell |
| 13 | Cherry | Cherry | Cherry | Cherry | Cherry |
| 14 | Blank | Blank | Blank | Blank | Blank |
| 15 | Bell | Bell | Bell | Bell | Bell |
| 16 | Grape | Grape | Grape | Grape | Grape |
| 17 | Bar | Bar | Bar | Bar | Bar |
| 18 | Cherry | Cherry | Cherry | Cherry | Cherry |
| 19 | Blank | Blank | Blank | Blank | Blank |
| 20 | Bell | Bell | Bell | Bell | Bell |
| 21 | Cherry | Cherry | Cherry | Cherry | Cherry |

TABLE C-continued

| Index | Reel 1 | Reel 2 | Reel 3 | Reel 4 | Reel 5 |
|---|---|---|---|---|---|
| 22 | Grape | Grape | Grape | Grape | Grape |
| 23 | Grape | Grape | Grape | Grape | Grape |
| 24 | Bell | Bell | Bell | Bell | Bell |

Previously, an RNG would randomly select any one of the 25 possible indexes during each free spin of a bonus round. However, in at least some of the present embodiments an algorithm is used to provide a set of indexes for displaying the symbols on a display of the computing system. Each approved set will provide a user with a reel-based event experience that matches the required reel-based event experience, based on attributes selected by a developer of reel-based events. A primary attribute may be expected to be a total win associated with the set of indexes.

Seed values may be tested with an appropriate algorithm, in order to provide the following possible results:

TABLE D

| Seed | Indexes | Payout | Row |
|---|---|---|---|
| 2675 | 9, 13, 7, 4, 21 | 0 | 1 |
| 45656 | 19, 4, 4, 15, 8 | 20 | 2 |
| 36527 | 1, 19, 8, 3, 17 | 55 | 3 |
| 2352 | 23, 18, 16, 6, 3 | 0 | 4 |
| 72345 | 5, 23, 24, 14, 22 | 0 | 5 |
| 23 | 15, 18, 17, 9, 24 | 12 | 6 |

TABLE E

| Outputs for 3 (row) × 5 (reels) based on Table C | | | | | |
|---|---|---|---|---|---|
| Spin (free) | Reel 1 | Reel 2 | Reel 3 | Reel 4 | Reel 5 |
| 1 | 9, 10, 11 | 13, 14, 15 | 7, 8, 9 | 4, 5, 6 | 21, 22, 23 |
| 2 | 19, 20, 21 | 4, 5, 6 | 4, 5, 6 | 15, 16, 17 | 8, 9, 10 |
| 3 | 1, 2, 3 | 19, 20, 21 | 8, 9, 10 | 3, 4, 5 | 17, 18, 19 |
| 4 | 23, 24, 1 | 18, 19, 20 | 16, 17, 18 | 6, 7, 8 | 3, 4, 5 |
| 5 | 5, 6, 7 | 23, 24, 1 | 24, 1, 2 | 14, 15, 16 | 22, 23, 24 |
| 6 | 15, 16, 17 | 18, 19, 20 | 17, 18, 19 | 9, 10, 11 | 24, 1, 2 |

In at least some embodiments, the deterministic algorithm determines indices indicative of reel positions for each reel of multiple reels. An example output of such algorithm is represented in Table D and Table E above.

In at least some embodiments, the deterministic algorithm determines not only indices indicative of reel positions for each reel of multiple reels, but one or more supplemental index or indices. The supplemental index or indices corresponds to something other than reel positions. Table F and the following text refer to supplemental indices ranging from 25 to 38.

The text following Table F shows supplemental index(es) corresponding to multipliers, audible files for outputting during a reel-based event, and visual files for outputting during a reel-based event.

Based on the data in Table F, supplemental index(es) are selected for each seed value (which can correspond to a respective spin of a set of free spins). In at least some alternative embodiments, the supplemental index(es) could be selected once for each transaction (e.g., when selecting the indices based on an initial seed (e.g., the seed 2675 in Table F).

TABLE F

| Seed | Indexes for reels | Payout | Supplemental Index(es) |
|---|---|---|---|
| 2675 | 9, 13, 7, 4, 21 | 0 | 25, 30, 33 |
| 45656 | 19, 4, 4, 15, 8 | 20 | 26, 31, 36 |
| 36527 | 1, 19, 8, 3, 17 | 55 | 25, 32, 35 |
| 2352 | 23, 18, 16, 6, 3 | 0 | 25, 30, 33 |
| 72345 | 5, 23, 24, 14, 22 | 0 | 25, 32, 34 |
| 23 | 15, 18, 17, 9, 24 | 12 | 28, 31, 37 |

Example Supplemental Indexes

25—1× multiplier
26—2× multiplier
27—3× multiplier
28—4× multiplier
29—5× multiplier
30—Play audible file 1
31—Play audible file 2
32—Play audible file 3
33—Output visual file 1 (e.g., 1st background color)
34—Output visual file 2 (e.g., 2nd background color)
35—Output visual file 3 (e.g., 3rd background color)
36—Output visual file 5 (e.g., 4th background color)
37—Output visual file 5 (e.g., 5th background color)
38—Output visual file 6 (e.g., 6th background color)

If the RNG determines that a user has won 12 times their wager, the database can be consulted to provide seed value 23 (In practice, however, it may be expected that there will be several seed values with the same possible pay-out, each seed value possibly having different attributes associated therewith).

In an embodiment, the database may group seed values according to the pay-out associated therewith. Then, a pay-out for a particular reel-based event session (such as a free spins session) may be randomly determined.

It should be noted that the configuration of the reels of a reel-based event may allow for more than a billion possible resultant reel positions. The total number of "acceptable" indexes may thus be expected to be significantly large and would certainly provide a developer of reel-based events with more than enough possible indexes that could be used to provide an appropriate reel-based event experience on a computing system. As only the initial seed value needs to be stored in order to ensure the appropriate reel-based event experience is provided by the computing system, significant data storage/memory is not needed to record the entire possible set of results.

As an example, the number of "acceptable" indices could include several million acceptable indices, such as 10 million to 20 million acceptable indices. Some embodiments can use less than 10 million acceptable indices and other embodiments can use more 20 million acceptable indices, such as 1 billion or more acceptable indices.

Using the techniques explained above, it will be possible to craft the intended user experience within bonus rounds (or, in some circumstances, within normal reel-based events), with minimal memory and development requirements needed by the math service. The computing system provides a desired experience of performing reel-based events, while the database stores a minimal amount of data.

A database may be built up that contains all possible playing experiences that the developer of reel-based events may wish to provide to a user. By pre-testing and approving seed values for a desired outcome, the same algorithm may be used to generate a desired set of outcomes for the computing system.

A single upfront set of calculations may be required to build up a usable database of indexes. However, once this recording is completed, the same number of calculations will be used as is currently the case where each spin result in a free spins session is randomly determined, one by one. However, the "prize first" implementation allows the developer of reel-based events to provide a random outcome on the computing system but based on a pre-determined and pre-approved set of free spin results. The number of suitable seed values is expected to be significant, resulting in a large enough set of approved indexes that will statistically provide a new experience on the computing system every time that such a free spin sequence is triggered during performance of reel-based events.

Figures 6, 7:
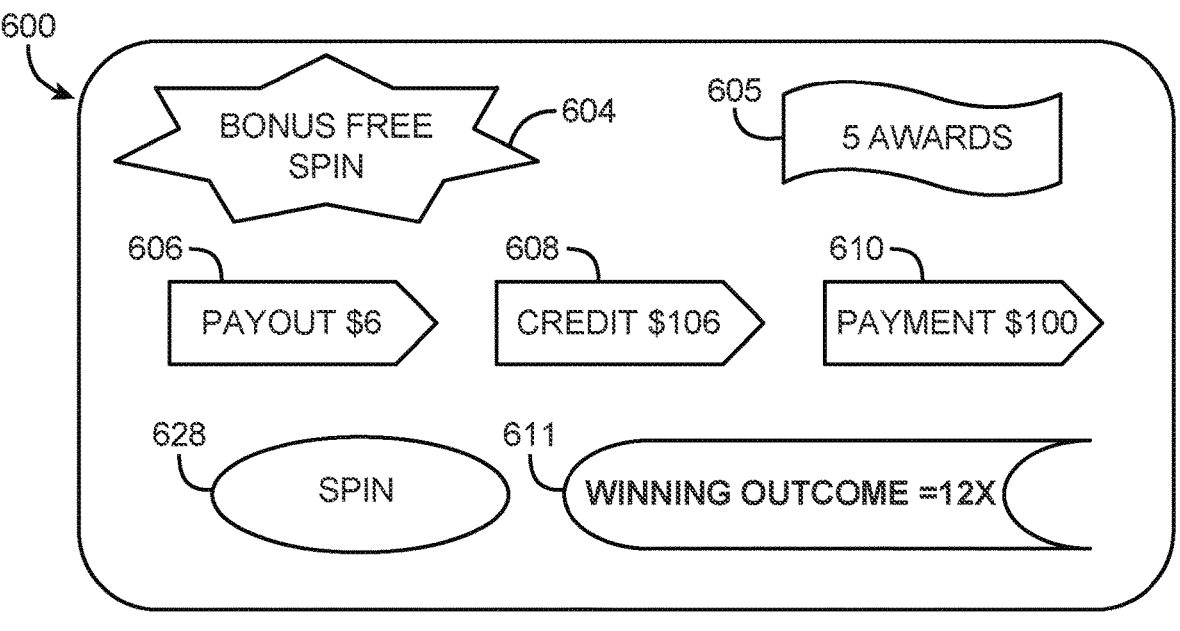
FIG. 6 illustrates a display portion of a GUI indicating a winning outcome value (e.g., a pre-selected prize for a free spin session), in accordance with the example embodiments.
FIG. 7 illustrates a display portion of a GUI indicating a winning outcome value (e.g., a pre-selected prize for a free spin session), in accordance with the example embodiments.

FIG. 6 illustrates a partial display portion 600 of a GUI (e.g., the GUI 400 shown in FIG. 4) indicating a winning outcome value (e.g., a pre-selected prize for a free spin session), in accordance with the example embodiments. The partial display portion 600 can indicate to the user that an outcome event resulted in a bonus free spin 604, the award counter 605 indicates 5 awards have been counted, a payout 606 of $6, a credit 608 of $106, and a payment 610 of $100. As the user activates the spin control 628 to initiate the next spin, the user is informed of the winning outcome value of 12× at winning outcome indicator 611.

FIG. 7 illustrates a partial display portion 700 of a GUI (e.g., the GUI 400 shown in FIG. 4) indicating a winning outcome value (e.g., a pre-selected prize for a free spin session), in accordance with the example embodiments. The partial display portion 700 can indicate to the user that an outcome event resulted in a bonus free spin 704, the award counter 705 indicates 5 awards have been counted, a payout 706 of $6, a credit 708 of $106, and a payment 710 of $100. As the user activates the spin control 728 to initiate the next spin, the user is informed of the winning outcome value of 20× at winning outcome indicator 711 along with a background 740 color change, for example, controlled by an output visual file corresponding to a supplemental index associated with the seed value determined by the deterministic algorithm as discussed above.

Notably, the functions of determining a specific seed from among a set of seeds corresponding to the particular outcome and a quantity of times to use a deterministic process based on the particular outcome and the specific seed, initializing the deterministic process with the specific seed to determine an index value corresponding to a first predetermined set of symbols and a first respective next seed for iteratively using the deterministic process, iteratively using the deterministic process a number of times equal to the quantity of times minus one, each iterative use of the deterministic process initialized with a respective next seed determined during an immediate prior use of the deterministic process, and iteratively using the deterministic process results in determining, for each iterative use, an ordered set of index values corresponding to a respective predetermined set of symbols, and outputting, within a symbol display portion of a display, the first predetermined set of symbols followed by each respective predetermined set of symbols according to the ordered set of index values, necessitate computer implementation. Without computer implementation, the iterative use of the deterministic process based on the particular outcome and the specific seed to determine an index value (stored in a database) corresponding to a first predetermined set of symbols to be output within a symbol display portion of a display, would be impractical if not impossible. In contrast, the computer implementation herein allows the use of a deterministic process based on the particular outcome and a specific seed, initializing the deterministic process with the specific seed to determine an index value corresponding to a first predetermined set of symbols and iteratively using the deterministic process a number of times while each iterative use of the deterministic process is initialized with a respective next seed determined during an immediate prior use of the deterministic process, and iteratively using the deterministic process results in determining, for each iterative use, an ordered set of index values corresponding to a respective predetermined set of symbols, and outputting, within a symbol display portion of a display, the first predetermined set of symbols followed by each respective predetermined set of symbols according to the ordered set of index values. Consequently, these features of the disclosure herein would not exist but for computer technology.

Particularly, the embodiments herein solve a technical problem of how to control or limit the randomness of performing reel-based events, at least under some circumstances, in order to ensure that a computing device outputs an appropriate reel-based event experience, for example, including a free spins bonus round.

In sum, the technical problem is solved by crafting the intended user experience within bonus rounds of reel-based events (or, in some circumstances, within normal reel-based events), while the database stores a minimal amount of data, by using a deterministic process or algorithm that generates an outcome of a bonus round, or free spin session, starting from a single "seed" value.

The functions of determining a specific seed from among a set of seeds corresponding to the particular outcome and a quantity of times to use a deterministic process based on the particular outcome and the specific seed, initializing the deterministic process with the specific seed to determine an index value corresponding to a first predetermined set of symbols and a first respective next seed for iteratively using the deterministic process, iteratively using the deterministic process a number of times equal to the quantity of times minus one, each iterative use of the deterministic process initialized with a respective next seed determined during an immediate prior use of the deterministic process, and iteratively using the deterministic process results in determining, for each iterative use, an ordered set of index values corresponding to a respective predetermined set of symbols, and outputting, within a symbol display portion of a display, the first predetermined set of symbols followed by each respective predetermined set of symbols according to the ordered set of index values, would be prohibitively complex and expensive to implement on a traditional machine with mechanical reels. In effect, the present approach can be seen as providing implementations which increase the number and variety of possible outcomes in a reel-based slot game.

Further, these features are an improvement to reel-based event technology. Since the symbols appearing on each reel are fixed and cannot be changed during mechanical reel-based outcome events, the functions of iteratively using the deterministic process results to determine, for each iterative use, an ordered set of index values corresponding to a respective predetermined set of symbols, and outputting, within a symbol display portion of a display, the first predetermined set of symbols followed by each respective predetermined set of symbols according to the ordered set of index values could not appear in such outcome events. Due to this technological limitation, users can become disinterested in these basic reel-based outcome events. Computer implementation, however, facilitates the integration of these features into reel-based outcome events, resulting in outcome event dynamics that would otherwise be unavailable. Consequently, the disclosure herein is a technological improvement to reel-based outcome events.

Furthermore, the embodiments can include performing the functions of determining a specific seed from among a set of seeds corresponding to the particular outcome and a quantity of times to use a deterministic process based on the particular outcome and the specific seed, initializing the deterministic process with the specific seed to determine an index value corresponding to a first predetermined set of symbols and a first respective next seed for iteratively using the deterministic process, iteratively using the deterministic process a number of times equal to the quantity of times minus one, each iterative use of the deterministic process initialized with a respective next seed determined during an immediate prior use of the deterministic process, and iteratively using the deterministic process results in determining, for each iterative use, an ordered set of index values corresponding to a respective predetermined set of symbols, and outputting, within a symbol display portion of a display, the first predetermined set of symbols followed by each respective predetermined set of symbols according to the ordered set of index values using a server computing system and client computing system using a communication network to carry communications including instructions and/or data to carry out the functions. As an example, the client computing system can include user-selectable controls that are selectable to trigger performance of an outcome event. Moreover, a processor at the client computing system can receive inputs from devices operatively coupled to the processor, such as an acceptor, and can control devices outside of the processor during performance of the outcome event, such as a display or speaker. Furthermore still, in some embodiments, a processor at the server computing system can determine an outcome for an outcome event and transmit data for displaying a representation of the outcome event on a display screen at the client computing system. In at least some embodiments, the data for displaying a representation of the outcome event can include an index value to some content already stored at the client computing system so that the server computing system does not need to transmit that content each time the client computing system is to display that content during performance of an outcome event. For example, the index value can include a value indicative of a particular animation of the animations 356 to display when the client computing system is operating in a particular operating state, such as the operating state for a free bonus spin shown in the outcome event identifier 404, or a winning outcome value (e.g., a pre-determined prize award) shown in the winning outcome indicator 411.

Next, FIG. 8 is a block diagram of a computing system 800 configured for reel-based events with a seed-based feature in accordance with the example embodiments. In some implementations, the computing system 800 can include a computing platform 802 (i.e., one or more computing platforms). The computing platform 802 can be configured to communicate with a remote platform 804 (i.e., one or more remote platforms) according to a client/server architecture, a peer-to-peer architecture, and/or other architectures. The remote platform 804 can be configured to communicate with other remote platforms via the computing platform 802 and/or according to a client/server architecture, a peer-to-peer architecture, and/or other architectures. Users can access the computing system 800 via the remote platform 804. According to some embodiments, one or more of the computing platform 802, the remote platform 804, and/or other components of the computing system 800 can be the same as or similar to one or more components of the computing system 100 of FIG. 1B, the computing system 100a and/or the computing system 100b of FIG. 2, and/or other computing resources disclosed herein. The computing platform 802 can include one or more elements of the computing system 100, 100a, 100b. As an example, the computing platform 802 can include the communication interface 102, 102a, 102b and/or the user interface 104, 104a, 104b.

The computing platform 802 can be configured by machine-readable instructions 806. The machine-readable instructions 806 can include one or more instruction modules. The instruction modules can include computer program modules. The instruction modules can include one or more of an occurrence determination module 808, a seed determination module 810, a process initializing module 812, a process using module 814, a symbol display portion outputting module 816, a set determination module 818, a notification receiving module 820, an event performance module 822, an award determination module 824, an award outputting module 826, user interface element outputting module 828, and/or other instruction modules.

The occurrence determination module 808 can be configured to determine occurrence of a particular outcome for a reel-based event. As an example, the reel-based event can include a base (e.g., first level) event in which a bonus (second level) event can be earned and/or triggered. The reel-based event can include selecting a set of symbols to display within a symbol-display-portion, such as the symbol-display-portion 402. As an example, selecting the set of symbols can include selecting symbols from the global symbol group table 300 and/or from the symbols 353.

As an example, the particular outcome can indicate one or more of the following was earned during performance of the reel-based event: a free spin session, a winning outcome value, or a win multiplier. The particular outcome can include a particular award amount selected from a first group of award amounts. One or more award amounts within the first group of award amounts can be weighted to affect a probability of the particular outcome being determined for the reel-based event. The particular outcome can include a particular award amount selected from multiple groups of award amounts each corresponding to a different range of award amounts.

The award can be further based on a payment to allow performance of the reel-based event, such as a payment indicated by the payment amount indicator 410. The award can be further based on the particular outcome for the reel-based event, such as an arrangement of symbols within the symbol-display-portion 402.

The seed determination module 810 can be configured to determine a specific seed from among a set of seeds (e.g., a seed group) corresponding to the particular outcome and a quantity of times to use a deterministic process based on the particular outcome and the specific seed. The set of seeds can include multiple seeds. Determining the specific seed from among the set of seeds can be based on a random selection from among the set of seeds. As an example, a processor can select one of the seeds of the seed group shown in Table B using a random selection process. One or more seeds of the multiple seeds can be weighted to affect a probability of the specific seed being selected via the random selection. A weight of at least one seed of the multiple seeds can include a weight less than or equal to one. Table B shows example weights associated with seeds of a seed group.

A weight of at least one seed of the multiple seeds can include a weight based on a quantity of times the at least one seed was selected during performance of previous reel-based events versus a quantity of times other seeds of the set of seeds were selected during performance of the previous reel-based events, and/or based on one or more other parameters, such as a last time the seed was selected. The set of seeds can include multiple seeds. The quantity of times can equal a number of time to use the deterministic process during the reel-based event to achieve a particular award amount. A different seed of the multiple seeds, when selected, can be arranged for achieving the particular award amount after use of the deterministic process a different quantity of times. The specific seed can include a binary value having between four and sixty-four bits inclusive. The set of seeds can be a first set of seeds.

In some implementations, a pseudorandom number generator can produce a respective identical sequence of index values each time the pseudorandom number generator is initialized with a respective initial seed. The seed determination module 810 can determine the respective initial seed.

The deterministic process can include the pseudorandom number generator and/or using the deterministic process includes using the pseudorandom number generator. The set of seeds can be determined prior to initiation of the reel-based event and stored in a database. As an example, if the predetermined award is eighty-seven credits, a processor can determine that the seed in row 1 of Table D is an initial seed corresponding to the predetermined award and that a quantity of times to use the deterministic process initialized with that seed to achieve the predetermined award is six times. Table D represents an example use of the deterministic process to determine the five other seeds shown in Table D. Other examples of seeds, predetermined awards, and quantities of times to use the deterministic process are also possible.

Initializing the deterministic process can include initializing a deterministic algorithm. Initializing the deterministic algorithm can include providing a specific initial seed to the deterministic algorithm. Use of the deterministic algorithm based on the specific initial seed can include determining a quantity of index values, such as the quantity of index values shown in row 1 of Table D. Other groups of multiple index values can be determined during each iterative use of the deterministic process. Row 2 to Row 6 of Table D show examples of other groups of multiple index values. In at least some embodiments, the quantity of index values within a group of multiple index values corresponds to quantity of reels represented within a symbol-display-portion, such as five index values corresponding five reels within the symbol-display-portion 402.

The index values determined using the deterministic process can be ordered based on a symbol-display-segment (e.g., a reel). As an example, the five indexes within row 1 of Table D can be ordered corresponding to the order of SDS 412, 414, 416, 418, 420 shown in FIG. 4. In accordance with some other implementations, the quantity of indexes determined using the deterministic process can be equal to the quantity of symbol positions within the symbol-display-portion. Those indexes can be ordered. As an example, the deterministic process can determine, for a given seed, fifteen index values corresponding to the arrangement of symbols positions (1) to (15) within the symbol-display-portion 402.

As discussed above, for example, the deterministic algorithm can include and/or use a PRNG such as the Permuted Congruential Generator (PCG) Random, Minimal C implementation 0.9, PCG Random, C++ implementation 0.98, or PCG Random, Minimal C 0.94. As another example, the deterministic algorithm can any deterministic algorithm to implement features of the described implementations.

The process initializing module 812 can be configured to initialize the deterministic process with the specific seed to determine an index value corresponding to a first predetermined set of symbols and a first respective next seed for iteratively using the deterministic process. The first predetermined set of symbols can include symbols from a group of reels. The first predetermined set of symbols can include, for each respective reel of the group of reels, a respective symbol corresponding to one or more reel stops adjacent to the reel stop position on the respective reel. The index value corresponding to a first predetermined set of symbols can include multiple index values.

The process using module 814 can be configured to, after initializing the deterministic process, iteratively use the deterministic process a number of times equal to the quantity of times minus one. Each iterative use of the deterministic process can be initialized with a respective next seed determined during an immediate prior use of the deterministic process, and wherein iteratively using the deterministic process results in determining, for each iterative use, an ordered set of index values corresponding to a respective predetermined set of symbols.

The symbol display portion outputting module 816 can be configured to output, within a symbol display portion of a display, the first predetermined set of symbols followed by In some implementations, the supplemental index value can correspond to a user interface element configured to be output via a user interface, such as the user interface 104, 104*a*, 104*b*.

The user interface element outputting module 828 can be configured to output, via the user interface, the user interface element based on outputting each respective predetermined set of symbols according to the ordered set of index values. The user interface element can include at least one of an audio element and a visual element output via the user interface. Examples of a user interface element are shown in a list of example supplemental indexes following Table F. In some implementations, the user interface element is stored in the sounds 355 or the animations 356.

The set determination module 818 can be configured to determine, based on the particular award being selected from the first group of award amounts, the first set of seeds from among multiple sets of seeds. Table G shows example data associated with the set determination module 818. The seed and metrics 360 could include data arranged based on aspects shown in Table G. As an example, Table G includes data regarding three sets of seeds identified as Seed Set A, B, and C. Each set of seeds corresponds to one or more metrics. As shown in Table G, the metrics can include an award amount and a quantity of free spins. In some implementations, each set of seeds of the multiple sets of seeds can correspond to a different group of award amounts. Table G shows an example in which a seed set (i.e., Seed Set A) is associated with a single award amount. Table G also shows an example in which a seed set (i.e., Seed Set B and Seed Set C) is associated with a range of multiple award amounts.

TABLE G

| Metrics for Seed Set A Award amount: 87 Free Spins: 5 | | | Metrics for Seed Set B Award amount: 95 to 120 Free Spins: 5 | | | Metrics for Seed Set C Award amount: 55 to 80 Free Spins: 5 | | |
|---|---|---|---|---|---|---|---|---|
| Seed | Count | Weight | Seed | Count | Weight | Seed | Count | Weight |
| 5 | 4 | 1 | 91 | 0 | 5 | 406 | 1 | 5 |
| 10 | 1 | 2 | 109 | 2 | 3 | 111 | 5 | 1 |
| 17 | 0 | 5 | 9632 | 4 | 1 | 4321 | 1 | 5 |
| 10817 | 1 | 2 | 777 | 2 | 3 | 55 | 3 | 3 |
| 44 | 2 | 3 | 218 | 1 | 4 | 3870 | 2 | 4 | each respective predetermined set of symbols according to the ordered set of index values. As an example, the symbol display portion outputting module 816 can be configured to output sets of symbols based on determined index values to the symbol-display-portion 402. Outputting the first predetermined set of symbols followed by each respective predetermined set of symbols according to the ordered set of index values can be performed as part of a bonus reel-based event that does not require a further payment to be performed.

In some implementations, each reel of the group of reels can include multiple reel stops. As an example, each reel of the group of reels shown in Table C can include twenty-five reels stops. Each reel stop of the multiple reel stops can correspond to a symbol displayable on the display. Each index value of the ordered set of index values can correspond to a respective reel of the group of reels and a reel stop position on the respective reel.

In some implementations, iteratively using the deterministic process can further result in determining a supplemental index value with respect to the ordered set of index values.

The notification receiving module 820 can be configured to receive notification that a payment to allow performance of the reel-based event has been received. In at least some implementations, the payment is indicated on the payment amount indicator 410. In at least some implementations, the notification is received in response a selection of the USC 428, a spin control (such as the spin control 628, 728), or some other user-selectable control. The notification can be received via a communication network, such as the communication network 118 and/or the connection mechanism 108.

The event performance module 822 can be configured to perform the reel-based event after receiving the notification. Performing the reel-based event can include determining a set of symbols to display in a symbol-display-portion, such as the symbol-display-portion 402 and displaying the determined set of symbols in the symbol-display-portion. Determining the set of symbols can include selecting the set of symbols from the global symbol group table 300. In some implementations, the symbols displayed for the reel-based event and the first predetermined set of symbols according to the ordered set of index values can be determined from the same group of symbols. In some other implementations, the symbols displayed for the reel-based event and the first predetermined set of symbols according to the ordered set of index values are determined from different group of symbols.

The award determination module 824 can be configured to determine an award corresponding to outputting, within the symbol display portion of the display, the first predetermined set of symbols followed by each respective predetermined set of symbols according to the ordered set of index values. As an example, execution of the award determination module 824 can include the processor 834 determining the award based on a pay table (such as a pay table in the table 352) and the arrangement of the symbols within the symbol-display-portion 402. As another example, execution of the award determination module 824 can include the processor 834 multiplying an award amount determined from the pay table by a multiplier value.

The award outputting module 826 can be configured to output the award. In some implementations, the first group of award amounts can include at least one award amount in addition to the particular award amount. In some implementations, the first set of seeds can correspond to the particular award amount. As an example, outputting the award can include modifying a payout amount indicator, such as the payout amount indicator 406 to indicate the particular award amount. As another example, outputting the award can include modifying a credit balance indicator, such as the credit balance indicator 408 by adding the particular award amount to a prior credit balance indicated on the credit balance indicator. As another example, outputting the award can include a paper money emitter, a coin emitter, or a token emitter emitting paper money, coin(s) or token(s), respectively, equivalent to the particular award amount.

In some implementations, the computing platform 802, the remote platform 804, and/or the external resources 830 can be operatively linked via one or more electronic communication links. For example, such electronic communication links can be established, at least in part, via a network such as the Internet and/or other networks. It will be appreciated that this is not intended to be limiting, and that the scope of this disclosure includes implementations in which the computing platform 802, the remote platform 804, and/or the external resources 830 can be operatively linked via some other communication media.

A given remote platform of the remote platform 804 can include one or more processors configured to execute computer program modules. The computer program modules can be configured to enable an expert or user associated with the give remote platform to interface with the computing system 800 and/or the external resources 830, and/or provide other functionality attributed herein to the remote platform 804. As an example, the given remote platform and/or a given computing platform of the computing platform 802 can include one or more of a slot machine, a server, a desktop computer, a laptop computer, a handheld computer, a tablet computing platform, a NetBook, a Smartphone, a gaming console, and/or other computing platforms.

The external resources 830 can include sources of information outside of the computing system 800, external entities participating with the computing system 800, and/or other resources. In some implementations, some or all of the functionality attributed herein to the external resources 830 can be provided by resources included in the computing system 800.

The computing platform 802 can include electronic storage 832, one or more processors 834, and/or other components. The computing platform 802 can include communication lines, or ports to enable the exchange of information with a network and/or other computing platforms. Illustration of the computing platform 802 in FIG. 8 is not intended to be limiting. The computing platform 802 can include a plurality of hardware, software, and/or firmware components operating together to provide the functionality attributed herein to the computing platform 802. For example, the computing platform 802 can be implemented by a cloud of computing platforms operating together as the computing platform 802.

The electronic storage 832 can comprise non-transitory storage media that electronically stores information. The electronic storage media of the electronic storage 832 can include one or both of system storage that is provided integrally (i.e., substantially non-removable) with the computing platform 802 and/or removable storage that is removably connectable to the computing platform 802 via, for example, a port (e.g., a USB port, a firewire port, etc.) or a drive (e.g., a disk drive, etc.). The electronic storage 832 can include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 832 can include one or more virtual storage resources (e.g., cloud storage, a virtual private network, and/or other virtual storage resources). The electronic storage 832 can store software algorithms, information determined by the processor 834, information received from the computing platform 802, information received from the remote platform 804, and/or other information that enables the computing platform 802 to function as described herein.

The processor 834 can be configured to provide information processing capabilities in the computing platform 802. As such, the processor 834 can include one or more of a digital processor, an analog processor, a digital circuit designed to process information, an analog circuit designed to process information, a state machine, and/or other mechanisms for electronically processing information. Although the processor 834 is shown in FIG. 8 as a single entity, this is for illustrative purposes only. In some implementations, the processor 834 can include a plurality of processing units. These processing units can be physically located within the same device, or the processor 834 can represent processing functionality of a plurality of devices operating in coordination. The processor 834 can be configured to execute one or more of the modules 808, 810, 812, 814, 816, 818, 820, 822, 824, 826, and/or 828, and/or other modules. The processor 834 can be configured to execute one or more of the modules 808, 810, 812, 814, 816, 818, 820, 822, 824, 826, and/or 828, and/or other modules by software; hardware; firmware; some combination of software, hardware, and/or firmware; and/or other mechanisms for configuring processing capabilities on the processor 834. As used herein, the term "module" can refer to any component or set of components that perform the functionality attributed to the module. This can include one or more physical processors during execution of processor readable instructions, the processor readable instructions, circuitry, hardware, storage media, or any other components.

It should be appreciated that although the modules 808, 810, 812, 814, 816, 818, 820, 822, 824, 826, and/or 828 are illustrated in FIG. 8 as being implemented within a single processing unit, in implementations in which processor 834 includes multiple processing units, one or more of the modules 808, 810, 812, 814, 816, 818, 820, 822, 824, 826, and/or 828 can be implemented remotely from the other modules. The description of the functionality provided by the different modules 808, 810, 812, 814, 816, 818, 820, 822, 824, 826, and/or 828 described below is for illustrative purposes, and is not intended to be limiting, as any of the modules 808, 810, 812, 814, 816, 818, 820, 822, 824, 826, and/or 828 can provide more or less functionality than is described. For example, one or more of the modules 808, 810, 812, 814, 816, 818, 820, 822, 824, 826, and/or 828 can be eliminated, and some or all of its functionality can be provided by other ones of the modules 808, 810, 812, 814, 816, 818, 820, 822, 824, 826, and/or 828. As another example, the processor 834 can be configured to execute one or more additional modules that can perform some or all of the functionality attributed below to one or more of the modules 808, 810, 812, 814, 816, 818, 820, 822, 824, 826, and/or 828.

Next, FIG. 9 is a block diagram of a computing system 900 configured for reel-based events with a seed-based feature in accordance with the example embodiments. In some implementations, the computing system 900 can include a computing platform 902 (i.e., one or more computing platforms). The computing platform 902 can be configured to communicate with a remote platform 904 (i.e., one or more remote platforms) according to a client/server architecture, a peer-to-peer architecture, and/or other architectures. The remote platform 904 can be configured to communicate with other remote platforms via computing platform 902 and/or according to a client/server architecture, a peer-to-peer architecture, and/or other architectures. Users can access the computing system 900 via the remote platform 904. According to some embodiments, one or more of the computing platform 902, the remote platform 904, and/or other components of the computing system 900 can be the same as or similar to one or more components of the computing system 100 of FIG. 1B, the computing system 100a and/or the computing system 100b of FIG. 2, and/or other computing resources disclosed herein. The computing platform 902 can include one or more elements of the computing system 100, 100a, 100b. As an example, the computing platform 902 can include the communication interface 102, 102a, 102b and/or the user interface 104, 104a, 104b.

The computing platform 902 can be configured by machine-readable instructions 906. The machine-readable instructions 906 can include one or more instruction modules. The instruction modules can include computer program modules. The instruction modules can include one or more of a database providing module 908, a sequence determination module 910, an outcome determination module 912, a seed determination module 914, a database augmentation module 916, a subset determination module 918, an arrangement display module 920, an instruction outputting module 922, and/or other instruction modules.

The database providing module 908 can be configured to provide a database within a non-transitory computer-readable memory. The database can include a set of index values. Augmenting the database can be conditioned on the set of metrics meeting or exceeding a predefined threshold set of metrics. As an example, the set of metrics can include one or more from among a total award amount, a quantity of cascading symbols, a quantity of anticipation events, a quantity of re-triggered free spins, or a quantity of free spins.

The database can include multiple determined seeds corresponding to the set of metrics.

Each index value can correspond to a respective reel stop. The respective reel stop can correspond to one or more reels displayable on a display during performance of a reel-based event. Each index value can further correspond to a particular reel of the one or more reels. The portion of the reel-based event can include a bonus reel-based event following a standard portion of the reel-based event. As an example, each index values for row 1 in Table D can be specified using an index number/reel number based on the reels in Table C (e.g., 9/1, 13/2, 7/3, 4/4, and 21/5).

The sequence determination module 910 can be configured to determine, for each respective seed of multiple seeds, a respective sequence of index values using a deterministic process initialized with the respective seed. The deterministic process can include the pseudorandom number generator and/or using the deterministic process includes using the pseudorandom number generator. Using the deterministic process initialized with the respective seed can include determining via the deterministic process a next seed for supplying to the deterministic process during an iterative use of the deterministic process to determine the respective sequence of index values. The iterative use of the deterministic process can include determining a supplemental index value with respect to the respective sequence of index values. The supplemental index value can correspond to a user interface element configured to be output via a user interface. In at least some other implementations, the sequence determination module 910 can be configured to determine, for each respective seed of multiple seeds, a respective index value using a deterministic process and a sequence of index values through iterative use of the deterministic process.

The user interface element can include at least one of an audio element and a visual element output via the user interface. Each index value of the respective sequence of index values can be contained within the set of index values.

In some implementations, the multiple seeds includes a quantity of seeds required to determine, for each defined set of metrics, a threshold number of seeds for initializing the deterministic process to achieve a particular outcome corresponding to each defined set of metrics. In some implementations, the multiple seeds includes all possible seeds within a range of seeds defined for the deterministic process.

The outcome determination module 912 can be configured to determine a respective outcome based on arrangements of symbols located on the reels. Determining the respective outcome can be further based on award data and one or more patterns of symbols contained within the arrangements of symbols. The arrangements of symbols for each outcome can be ordered according to a respective sequence of index values. The patterns of symbols can include a payway or a payline.

The seed determination module 914 can be configured to determine a seed and a set of metrics corresponding to each respective outcome. The determined seed can be the respective seed used by the deterministic process to determine the respective sequence of index values used to determine the respective outcome. As an example, the set of metrics can include one or more from among a total award amount, a quantity of cascading symbols, a quantity of anticipation events, a quantity of re-triggered free spins, or a quantity of free spins. The database can include multiple determined seeds corresponding to the set of metrics. Other examples of a metric in the set of metrics are also possible. As another example, the seed determination module 914 can include one or more respective registers and/or counters to count each of one or more of the quantities mentioned above.

The database augmentation module 916 can be configured to augment the database to include data indicating the determined seed and the set of metrics corresponding to each respective outcome. Augmenting the database can be conditioned on the set of metrics meeting or exceeding a predefined threshold set of metrics. As an example, the predefined threshold set of metrics can include a predefined total award amount, a predefined quantity of cascading symbols, a predefined quantity of anticipation events, a predefined quantity of re-triggered free spins, or a predefined quantity of free spins.

The subset determination module 918 can be configured to determine, based on content of the database, a subset of the index values for performing at least a portion of a reel-based event to achieve a specific outcome corresponding to the set of metrics indicated within the database. The content of the database can include data that indicates the subset of the set of index values corresponds to the set of metrics corresponding to the specific outcome. Determining the subset of index values can include using the deterministic process based on a determined seed and the set of metrics corresponding to the specific outcome.

Determining the subset of index values can include randomly selecting a determined seed from among the multiple determined seeds and initiating the deterministic process based on the randomly selected determined seed. As an example, for a pre-determined outcome discussed with respect to Table B, a processor can select one of the seeds 5, 10, 17, 10817, and 44 via a random selection process. As another example, the random selection process can take into account a weight associated with one or more of the seeds.

As another example in which the determined seed is the seed 2675 shown in Table D and the metrics include a metric indicating six free spins and/or an award of eighty-seven credits, use of the subset determination module 918 can result in determining the subsets of index values shown in Table D. As yet another example, the subset of index values can include a quantity of index values corresponding to the quantity of vertical symbol-display-segments within a symbol-display-portion in which an arrangement of symbols is to be displayed for each spin of the reels.

The arrangement display module 920 can be configured to display the arrangements of symbols ordered according to the sequence of index values on a display. Displaying the arrangements of symbols can include a processor outputting, within the symbol-display-portion 402, an animation of reels spinning and then stopping so that the symbols are displayed according to the sequence of index values. As an example, the arrangement of symbols can be an arrangement of symbols according to one of the spins represented in Table E and symbols and index values represented in Table C.

Instruction outputting module 922 can be configured to output instructions to spin a plurality of reels on the display and stop each spinning reel at a respective reel stop. Displaying the arrangements of symbols ordered according to the sequence of index values on a display can occur over multiple spins of the reels.

In some implementations, each respective sequence of index values can include an identical quantity of index values. In some implementations, the one or more patterns can include a payline pattern defined for a line-type reel-based event or a payways pattern defined for a ways-type reel-based event. In some implementations, each seed can include a binary value having between four and sixty-four bits inclusive. In some implementations, a pseudorandom number generator can output one or more index values each time the pseudorandom number generator is supplied with a seed. In some implementations, supplying the pseudorandom number generator with a predetermined number of seeds starting with an initial seed can include outputting a particular ordered sequence of index values. In some implementations, the pseudorandom number generator generates a seed for use in a subsequent use of the pseudorandom number generator.

In some implementations, the pseudorandom number generator can output the particular ordered sequence of index values each time the pseudorandom number generator is supplied with the predetermined number of seeds starting with the initial seed. In some implementations, each reel of the plurality of reels can include multiple reel stops. In some implementations, each respective arrangement of symbols can include multiple adjacent symbols on a reel of the plurality of reels. In some implementations, each index value can be indicative of a particular reel of the plurality of reels and a particular reel stop on the particular reel. In some implementations, each reel of the plurality of reels can include multiple reel stops. In some implementations, each respective arrangement of symbols can include one or more rows of symbols.

In some implementations, each row of symbols can include one symbol from each reel of the plurality of reels. Table E shows an example in which each spin of the reels includes symbols for three rows of each of five reels. In some implementations, each index value can be mapped to a respective reel stop on each reel of the plurality of reels. Table C shows an example of symbols on each of twenty-five different reel stops for each of five different reels.

In some implementations, the computing platform 902, the remote platform 904, and/or the external resources 924 can be operatively linked via one or more electronic communication links. For example, such electronic communication links can be established, at least in part, via a network such as the Internet and/or other networks. It will be appreciated that this is not intended to be limiting, and that the scope of this disclosure includes implementations in which the computing platform 902, the remote platform 904, and/or the external resources 924 can be operatively linked via some other communication media.

A given remote platform of the remote platform 904 can include one or more processors configured to execute computer program modules. The computer program modules can be configured to enable an expert or user associated with the given remote platform to interface with the computing system 900 and/or the external resources 924, and/or provide other functionality attributed herein to the remote platform 904. As an example, a given remote platform and/or a given computing platform of the computing platform 902 can include one or more of a slot machine, a server, a desktop computer, a laptop computer, a handheld computer, a tablet computing platform, a NetBook, a Smartphone, a gaming console, and/or other computing platforms.

The external resources 924 can include sources of information outside of the computing system 900, external entities participating with the computing system 900, and/or other resources. In some implementations, some or all of the functionality attributed herein to the external resources 924 can be provided by resources included in the computing system 900.

The computing platform 902 can include electronic storage 926, a processor 928 (i.e., one or more processors), and/or other components. The computing platform 902 can include communication lines, or ports to enable the exchange of information with a network and/or other computing platforms. Illustration of the computing platform 902 in FIG. 9 is not intended to be limiting. The computing platform 902 can include a plurality of hardware, software, and/or firmware components operating together to provide the functionality attributed herein to the computing platform 902. For example, the computing platform 902 can be implemented by a cloud of computing platforms operating together as the computing platform 902.

The electronic storage 926 can comprise non-transitory storage media that electronically stores information. The electronic storage media of the electronic storage 926 can include one or both of system storage that is provided integrally (i.e., substantially non-removable) with the computing platform 902 and/or removable storage that is removably connectable to the computing platform 902 via, for example, a port (e.g., a USB port, a firewire port, etc.) or a drive (e.g., a disk drive, etc.). The electronic storage 926 can include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 926 can include one or more virtual storage resources (e.g., cloud storage, a virtual private network, and/or other virtual storage resources). The electronic storage 926 can store software algorithms, information determined by the processor 928, information received from the computing platform 902, information received from the remote platform 904, and/or other information that enables the computing platform 902 to function as described herein.

The processor 928 can be configured to provide information processing capabilities in the computing platform 902. As such, the processor 928 can include one or more of a digital processor, an analog processor, a digital circuit designed to process information, an analog circuit designed to process information, a state machine, and/or other mechanisms for electronically processing information. Although the processor 928 is shown in FIG. 9 as a single entity, this is for illustrative purposes only. In some implementations, the processor 928 can include a plurality of processing units. These processing units can be physically located within the same device, or the processor 928 can represent processing functionality of a plurality of devices operating in coordination. The processor 928 can be configured to execute the modules 908, 910, 912, 914, 916, 918, 920, and/or 922, and/or other modules. The processor 928 can be configured to execute the modules 908, 910, 912, 914, 916, 918, 920, and/or 922, and/or other modules by software; hardware; firmware; some combination of software, hardware, and/or firmware; and/or other mechanisms for configuring processing capabilities on the processor 928. As used herein, the term "module" can refer to any component or set of components that perform the functionality attributed to the module. This can include one or more physical processors during execution of processor readable instructions, the processor readable instructions, circuitry, hardware, storage media, or any other components.

It should be appreciated that although the modules 908, 910, 912, 914, 916, 918, 920, and/or 922 are illustrated in FIG. 9 as being implemented within a single processing unit, in implementations in which the processor 928 includes multiple processing units, one or more of the modules 908, 910, 912, 914, 916, 918, 920, and/or 922 can be implemented remotely from the other modules. The description of the functionality provided by the different modules 908, 910, 912, 914, 916, 918, 920, and/or 922 described below is for illustrative purposes, and is not intended to be limiting, as any of the modules 908, 910, 912, 914, 916, 918, 920, and/or 922 can provide more or less functionality than is described. For example, one or more of the modules 908, 910, 912, 914, 916, 918, 920, and/or 922 can be eliminated, and some or all of its functionality can be provided by other ones of the modules 908, 910, 912, 914, 916, 918, 920, and/or 922. As another example, the processor 928 can be configured to execute one or more additional modules that can perform some or all of the functionality attributed below to one of the modules 908, 910, 912, 914, 916, 918, 920, and/or 922.

Next, FIG. 10A is a flow chart showing a set 1000 of functions of that can be carried out using a computing system (e.g., the computing system 100 of FIG. 1A, the computing system 100*a* and/or the computing system 100*b* shown in FIG. 2, the computing system 800 of FIG. 8, the computing platform 802, the remote platform 804, and/or other computing resources). A method of the example embodiments can include one or more functions of the set 1000 and/or a portion of one or more functions of the set 1000. Additionally, the order in which the functions of set 1000 are illustrated in FIG. 10A and described below is not intended to be limiting.

Accordingly, a method based on one or more functions of the set 1000 can include a computer-implemented method that includes the computing system 800 and/or the computing platform 802 executing a software application of the computing system 800, the computing platform 802, the remote platform 804, and/or other computing resources with and/or in communication with a display screen.

In at least some implementations, the software application includes the machine-readable instructions 806 or a portion thereof, such as the occurrence determination module 808, the seed determination module 810, the process initializing module 812, the process using module 814, the symbol display portion outputting module 816, the set determination module 818, the notification receiving module 820, the event performance module 822, the award determination module 824, award outputting module 826, and/or other instruction modules. In at least some implementations, execution of the software application includes graphically displaying, on symbol display segments of the display screen, animations that simulate spinning a plurality of reels. A memory (e.g., the memory 114*a* of the computing system 100*a*, the electronic storage 832 of the computing platform 802, and/or other memories) can store, a global symbol group including a plurality of symbols. Subsets of the global symbol group and/or the plurality of symbols are displayable in a respective vertical symbol display segment of the display screen.

Block 1002 includes determining occurrence of a particular outcome for a reel-based event. The functions of block 1002 can be performed by a processor (e.g., one or more hardware processors) configured by machine-readable instructions including a module that is the same as or similar to the occurrence determination module 808, in accordance with the example embodiments. The functions of block 1002 can include one or more of the functions described with respect to the occurrence determination module 808. As an example, the processor can determine that the particular outcome indicates one or more of the following was earned during performance of the reel-based event: a free spin session, a winning outcome value, or a win multiplier.

Next, block 1004 includes determining a specific seed from among a set of seeds corresponding to the particular outcome and a quantity of times to use a deterministic process based on the particular outcome and the specific seed. The functions of block 1004 can be performed by a processor (e.g., one or more hardware processors) configured by machine-readable instructions including a module that is the same as or similar to the seed determination module 810, in accordance with the example embodiments. The functions of block 1004 can include one or more of the functions described with respect to the seed determination module 810. As an example, the processor can determine the specific seed from among the set of seeds based on a random selection from among the set of seeds, and the quantity of times can equal a number of times to use the deterministic process during the reel-based event to achieve a particular award amount, as discussed with respect to the seed determination module 810.

Next, block 1006 includes initializing the deterministic process with the specific seed to determine an index value corresponding to a first predetermined set of symbols and a first respective next seed for iteratively using the deterministic process. The functions of block 1006 can be performed by a processor (e.g., one or more hardware processors) configured by machine-readable instructions including a module that is the same as or similar to the process initializing module 812, in accordance with the example embodiments. The functions of block 1006 can include one or more of the functions described with respect to the process initializing module 812. As an example, the processor can determine an index value corresponding to the first predetermined set of symbols that include, for each respective reel of a group of reels, a respective symbol corresponding to one or more reel stops adjacent to the reel stop position on the respective reel, as discussed with respect to the process initializing module 812.

Next, block 1008 includes, after initializing the deterministic process, iteratively using the deterministic process a number of times equal to the quantity of times minus one. Each iterative use of the deterministic process can be initialized with a respective next seed determined during an immediate prior use of the deterministic process. Iteratively using the deterministic process results in determining, for each iterative use, an ordered set of index values corresponding to a respective predetermined set of symbols. The functions of block 1008 can be performed by a processor (e.g., one or more hardware processors) configured by machine-readable instructions including a module that is the same as or similar to the process using module 814, in accordance with the example embodiments. The functions of block 1008 can include one or more of the functions described with respect to the process using module 814. As an example, the processor can initialize each iterative use of the deterministic process with a respective next seed determined during an immediate prior use of the deterministic process, and wherein iteratively using the deterministic process results in determining, for each iterative use, an ordered set of index values corresponding to a respective predetermined set of symbols, as discussed with respect to the process using module 814.

Next, block 1010 includes outputting, within a symbol display portion of a display, the first predetermined set of symbols followed by each respective predetermined set of symbols according to the ordered set of index values. The functions of block 1010 can be performed by one a processor (e.g., one or more hardware processors) configured by machine-readable instructions including a module that is the same as or similar to the symbol display portion outputting module 816, in accordance with the example embodiments. The functions of block 1010 can include one or more of the functions described with respect to the symbol display portion outputting module 816. As an example, the processor can output the first predetermined set of symbols followed by each respective predetermined set of symbols according to the ordered set of index values as part of a bonus reel-based event that does not require a further payment to be performed, as discussed with respect to the symbol display portion outputting module 816.

Next, FIG. 10B shows block 1012. In accordance with the example embodiments, a method including the one or more functions of the set 1000 can include performing a function corresponding to block 1012.

Block 1012 includes determining, based on the particular award being selected from the first group of award amounts, the first set of seeds from among multiple sets of seeds. The functions of block 1012 can be performed by a processor (e.g., one or more hardware processors) configured by machine-readable instructions including a module that is the same as or similar to the set determination module 818, in accordance with the example embodiments. The functions of block 1012 can include one or more of the functions described with respect to the set determination module 818. As an example, the processor can determine each set of seeds of the multiple sets of seeds that correspond to a different group of award amounts, as discussed with respect to the set determination module 818.

Next, FIG. 10C shows block 1014, 1016. In accordance with the example embodiments, a method including the one or more functions of the set 1000 can include performing a function corresponding to block 1014, 1016.

Block 1014 includes receiving notification that a payment to allow performance of the reel-based event has been received. The functions of block 1014 can be performed by a processor (e.g., one or more hardware processors) configured by machine-readable instructions including a module that is the same as or similar to the notification receiving module 820, in accordance with the example embodiments. The functions of block 1014 can include one or more of the functions described with respect to the notification receiving module 820.

Block 1016 includes performing the reel-based event after receiving the notification. The functions of block 1016 can be performed by a processor (e.g., one or more hardware processors) configured by machine-readable instructions including a module that is the same as or similar to the event performance module 822, in accordance with the example embodiments. The functions of block 1016 can include one or more of the functions described with respect to the event performance module 822.

Next, FIG. 10D shows block 1018, 1020. In accordance with the example embodiments, a method including the one or more functions of the set 1000 can include performing a function corresponding to block 1018, 1020.

Block 1018 includes determining an award corresponding to outputting, within the symbol display portion of the display, the first predetermined set of symbols followed by each respective predetermined set of symbols according to the ordered set of index values. The functions of block 1018 can be performed by a processor (e.g., one or more hardware processors) configured by machine-readable instructions including a module that is the same as or similar to the award determination module 824, in accordance with the example embodiments. The functions of block 1018 can include one or more of the functions described with respect to the award determination module 824.

Block 1020 includes outputting the award. The functions of block 1020 can be performed by a processor (e.g., one or more hardware processors) configured by machine-readable instructions including a module that is the same as or similar to the award outputting module 826, in accordance with the example embodiments. The functions of block 1020 can include one or more of the functions described with respect to the award outputting module 826.

Next, FIG. 10E shows block 1022. In accordance with the example embodiments, a method including the one or more functions of the set 1000 can include performing a function corresponding to block 1022. Block 1022 includes outputting, via the user interface, the user interface element based on outputting each respective predetermined set of symbols according to the ordered set of index values. The functions of block 1022 can be performed by a processor (e.g., one or more hardware processors) configured by machine-readable instructions including a module that is the same as or similar to the user interface element outputting module 828, in accordance with the example embodiments. The functions of block 1022 can include one or more of the functions described with respect to the user interface element outputting module 828.

Next, FIG. 11A is a flow chart showing a set 1100 of functions of that can be carried out using a computing system (e.g., the computing system 100 of FIG. 1A, the computing system 100*a* and/or the computing system 100*b* shown in FIG. 2, the computing system 900 of FIG. 9, the computing platform 902, the remote platform 904, and/or other computing resources). A method of the example embodiments can include one or more functions of the set 1100 and/or a portion of one or more functions of the set 1100. Additionally, the order in which the functions of set 1100 are illustrated in FIG. 11A and described below is not intended to be limiting.

Accordingly, a method based on one or more functions of the set 1100 can include a computer-implemented method that includes the computing system 900 and/or the computing platform 902 executing a software application of the computing system 900, the computing platform 902, the remote platform 904, and/or other computing resources with and/or in communication with a display screen.

In at least some implementations, the software application includes the machine-readable instructions 906 or a portion thereof, such as the database providing module 908, the sequence determination module 910, the outcome determination module 912, the seed determination module 914, the database augmentation module 916, the subset determination module 918, the arrangement display module 920, the instruction outputting module 922, and/or other instruction modules. In at least some implementations, execution of the software application includes graphically displaying, on symbol display segments of the display screen, animations that simulate spinning a plurality of reels. A memory (e.g., the memory 114*a* of the computing system 100*a*, the electronic storage 926 of the computing platform 902, and/or other memories) can store, a global symbol group including a plurality of symbols. Subsets of the global symbol group and/or the plurality of symbols are displayable in a respective vertical symbol display segment of the display screen.

Block 1102 includes providing a database within a non-transitory computer-readable memory. The database can include a set of index values. Each index value can correspond to a respective reel stop. The respective reel stop can correspond to one or more reels displayable on a display during performance of a reel-based event. The functions of block 1102 can be performed by a processor (e.g., one or more hardware processors) configured by machine-readable instructions including a module that is the same as or similar to the database providing module 908, in accordance with the example embodiments. The functions of block 1102 can include one or more of the functions described with respect to the database providing module 908. As an example, the processor can augment the database conditioned on the set of metrics meeting or exceeding a predefined threshold set of metrics, as discussed with respect to the database providing module 908.

Next, block 1104 includes determining, for each respective seed of multiple seeds, a respective sequence of index values using a deterministic process initialized with the respective seed. Each index value of the respective sequence of index values can be contained within the set of index values. The functions of block 1104 can be performed by a processor (e.g., one or more hardware processors) configured by machine-readable instructions including a module that is the same as or similar to the sequence determination module 910, in accordance with the example embodiments. The functions of block 1104 can include one or more of the functions described with respect to the sequence determination module 910. As an example, the processor can determine, via the deterministic process, a next seed for supplying to the deterministic process during an iterative use of the deterministic process to determine the respective sequence of index values, as discussed with respect to the sequence determination module 910.

Next, block 1106 includes determining a respective outcome based on arrangements of symbols located on the reels. The arrangements of symbols can be ordered according to each respective sequence of index values. The functions of block 1106 can be performed by a processor (e.g., one or more hardware processors) configured by machine-readable instructions including a module that is the same as or similar to the outcome determination module 912, in accordance with the example embodiments. The functions of block 1106 can include one or more of the functions described with respect to the outcome determination module 912. As an example, the processor can determine the respective outcome further based on award data and one or more patterns of symbols contained within the arrangements of symbols, as discussed with respect to the outcome determination module 912.

Next, block 1108 includes determining a seed and a set of metrics corresponding to each respective outcome. The determined seed can be the respective seed used by the deterministic process to determine the respective sequence of index values used to determine the respective outcome. The functions of block 1108 can be performed by a processor (e.g., one or more hardware processors) configured by machine-readable instructions including a module that is the same as or similar to the seed determination module 914, in accordance with the example embodiments. The functions of block 1108 can include one or more of the functions described with respect to the seed determination module 914.

Next, block 1110 includes augmenting the database to include data indicating the determined seed and the set of metrics corresponding to each respective outcome. The functions of block 1110 can be performed by a processor (e.g., one or more hardware processors) configured by machine-readable instructions including a module that is the same as or similar to the database augmentation module 916, in accordance with the example embodiments. The functions of block 1110 can include one or more of the functions described with respect to the database augmentation module 916.

Next, block 1112 includes determining, based on content of the database, a subset of the index values for performing at least a portion of a reel-based event to achieve a specific outcome corresponding to the set of metrics indicated within the database. The functions of block 1112 can be performed by a processor (e.g., one or more hardware processors) configured by machine-readable instructions including a module that is the same as or similar to the subset determination module 918, in accordance with the example embodiments. The functions of block 1112 can include one or more of the functions described with respect to the subset determination module 918. As an example, the processor can determine the subset of index values using the deterministic process based on a determined seed and the set of metrics corresponding to the specific outcome, as discussed with respect to the subset determination module 918. As another example, the processor can determine the subset of index values can include randomly selecting a determined seed from among the multiple determined seeds and initiating the deterministic process based on the randomly selected determined seed, as discussed with respect to the subset determination module 918.

Next, FIG. 11B shows block 1114. In accordance with the example embodiments, a method including the one or more functions of the set 1100 can include performing a function corresponding to block 1114.

Block 1114 includes displaying the arrangements of symbols ordered according to the sequence of index values on a display. The functions of block 1114 can be performed by a processor (e.g., one or more hardware processors) configured by machine-readable instructions including a module that is the same as or similar to the arrangement display module 920, in accordance with the example embodiments. The functions of block 1114 can include one or more of the functions described with respect to the arrangement display module 920.

Next, FIG. 11C shows block 1116. In accordance with the example embodiments, a method including the one or more functions of the set 1100 can include performing a function corresponding to block 1116.

Block 1116 includes outputting instructions to spin a plurality of reels on the display and stop each spinning reel at a respective reel stop wherein each index value is indicative of a particular reel of the plurality of reels and a particular reel stop on the particular reel. In accordance with the example implementations, each reel of the plurality of reels can include multiple reel stops, each respective arrangement of symbols can includes multiple adjacent symbols on a reel of the plurality of reels, and each index value is indicative of a particular reel of the plurality of reels and a particular reel stop on the particular reel.

The functions of block 1116 can be performed by a processor (e.g., one or more hardware processors) configured by machine-readable instructions including a module that is the same as or similar to the instruction outputting module 922, in accordance with the example embodiments. The functions of block 1116 can include one or more of the functions described with respect to the instruction outputting module 922. As an example, the processor can display the arrangements of symbols ordered according to the sequence of index values on a display over multiple spins of the reels, as discussed with respect to the instruction outputting module 922.

Next, FIG. 11D shows block 1118. In accordance with the example embodiments, a method including the one or more functions of the set 1100 can include performing a function corresponding to block 1118.

Block 1118 includes outputting instructions to spin a plurality of reels on the display and stop each spinning reel at a respective reel stop wherein each index value is mapped to a respective reel stop on each reel of the plurality of reels. In accordance with the example implementations, each reel of the plurality of reels can include multiple reel stops, each respective arrangement of symbols can include one or more rows of symbols, and each row of symbols can include one symbol from each reel of the plurality of reels.

The functions of block 1118 can be performed by a processor (e.g., one or more hardware processors) configured by machine-readable instructions including a module that is the same as or similar to the instruction outputting module 922, in accordance with the example embodiments. The functions of block 1118 can include one or more of the functions described with respect to the instruction outputting module 922.

IV. Conclusions

While one or more disclosed functions have been described as being performed by certain computing systems (e.g., the computing system 100, 100*a*, 100*b*, 800, 900, the computing system 100*a*, or the computing system 100*b*), one or more of the functions can be performed by any entity, including but not limited to those described herein. As such, while this disclosure includes examples in which the computing system 100*a* performs select functions and sends data to the computing system 100*b*, such that the computing system 100*b* can perform complementing functions and receive the data, variations to those functions can be made while adhering to the general server-client dichotomy and the scope of the disclosed machines, computing systems, and methods.

For example, rather than the computing system 100*a* sending select data (e.g., a symbol set, a notification, a value, etc.) to the computing system 100*b*, such that the computing system 100*b* can generate and display appropriate images, arrangements of symbols, graphical user interfaces, etc., the computing system 100*a* can generate the images and send them to the computing system 100*b* for display. Indeed, it will be appreciated by one of ordinary skill in the art that the "break point" between the server computing system's functions and the client computing system's functions can be varied.

Furthermore, the functions described throughout this can be performed in an order different than an order of functions (if any) described herein or shown in the drawings. Additionally, embodiments in the form of a method can include one or more of the functions described herein or shown in the drawings.

Furthermore still, while examples have been described in terms of select embodiments, alterations and permutations of these embodiments will be apparent to those of ordinary skill in the art. Other changes, substitutions, and alterations are also possible without departing from the disclosed machines, computing systems, and methods in their broader aspects as set forth in the claims below.

Finally, one or more embodiments described above can relate to one or more of the following enumerated example embodiments (EEE).

EEE A1 is a computing system comprising a processor and a non-transitory computer-readable memory storing executable instructions, wherein execution of the instructions by the processor causes the computing system to perform the following functions: determining occurrence of a particular outcome for a reel-based event; determining a specific seed from among a set of seeds corresponding to the particular outcome and a quantity of times to use a deterministic process based on the particular outcome and the specific seed; initializing the deterministic process with the specific seed to determine an index value corresponding to a first predetermined set of symbols and a first respective next seed for iteratively using the deterministic process; after initializing the deterministic process, iteratively use the deterministic process a number of times equal to the quantity of times minus one, wherein each iterative use of the deterministic process is initialized with a respective next seed determined during an immediate prior use of the deterministic process, and wherein iteratively using the deterministic process results in determining, for each iterative use, an ordered set of index values corresponding to a respective predetermined set of symbols; and outputting, within a symbol display portion of a display, the first predetermined set of symbols followed by each respective predetermined set of symbols according to the ordered set of index values.

EEE A2 is the computing system of EEE A1, wherein the particular outcome indicates one or more of the following was earned during performance of the reel-based event a free spin session, a winning outcome value, or a win multiplier.

EEE A3 is the computing system of any one of EEE A1 to A2, wherein the set of seeds includes multiple seeds; wherein determining the specific seed from among the set of seeds is based on a random selection from among the set of seeds; and wherein one or more seeds of the multiple seeds is weighted to affect a probability of the specific seed being selected via the random selection.

EEE A4 is the computing system of EEE A3, wherein a weight of at least one seed of the multiple seeds includes a weight less than or equal to one.

EEE A5 is the computing system of any one of EEE A3 to A4, wherein a weight of at least one seed of the multiple seeds includes a weight greater than one.

EEE A6 is the computing system of any one of EEE A3 to A5, wherein a weight of at least one seed of the multiple seeds includes a weight based on a quantity of times the at least one seed was selected during performance of previous reel-based events versus a quantity of times other seeds of the set of seeds were selected during performance of the previous reel-based events.

EEE A7 is the computing system of any one of EEE A1 to A6, wherein the set of seeds includes multiple seeds; wherein the quantity of times equals a number of time to use the deterministic process during the reel-based event to achieve a particular award amount; and wherein a different seed of the multiple seeds, when selected, is arranged for achieving the particular award amount after use of the deterministic process a different quantity of times.

EEE A8 is the computing system of any one of EEE A1 to A7, wherein the specific seed includes a binary value having between four and sixty-four bits inclusive.

EEE A9 is the computing system of any one of EEE A1 to A7, wherein the specific seed includes a binary value having thirty-two bits.

EEE A10 is the computing system of any one of EEE A1 to A9, wherein the particular outcome includes a particular award amount selected from a first group of award amounts; wherein the first group of award amounts includes at least one award amount in addition to the particular award amount; wherein one or more award amounts within the first group of award amounts is weighted to affect a probability of the particular outcome being determined for the reel-based event; wherein the set of seeds is a first set of seeds;

wherein the first set of seeds corresponds to the particular award amount; wherein the functions further include determining, based on the particular award being selected from the first group of award amounts, the first set of seeds from among multiple sets of seeds; and wherein each set of seeds of the multiple sets of seeds corresponds to a different group of award amounts.

EEE A11 is the computing system of any one of EEE A1 to A10, wherein the particular outcome includes a particular award amount selected from multiple groups of award amounts each corresponding to a different range of award amounts.

EEE A12 is the computing system of any one of EEE A1 to A11, wherein a pseudorandom number generator produces a respective identical sequence of index values each time the pseudorandom number generator is initialized with a respective initial seed; and wherein the deterministic process includes the pseudorandom number generator and/ or using the deterministic process includes using the pseudorandom number generator.

EEE A13 is the computing system of EEE A12, wherein the pseudorandom number generator (PRNG) includes a Permuted Congruential Generator (PCG) Random PRNG, a Minimal C implementation PRNG, a PCG Random, C++ implementation PRNG, or a PCG Random, Minimal C PRNG.

EEE A14 is the computing system of any one of EEE A1 to A13, wherein the functions further include receiving notification that a payment to allow performance of the reel-based event has been received; perform the reel-based event after receiving the notification; wherein outputting the first predetermined set of symbols followed by each respective predetermined set of symbols according to the ordered set of index values is performed as part of a bonus reel-based event that does not require a further payment to be performed.

EEE A15 is the computing system of any one of EEE A1 to A14, wherein the functions further include determining an award corresponding to outputting, within the symbol display portion of the display, the first predetermined set of symbols followed by each respective predetermined set of symbols according to the ordered set of index values; and output the award.

EEE A16 is the computing system of EEE A15, wherein the award is further based on one or more from among a payment to allow performance of the reel-based event; or wherein the award is further based on one or more from among the particular outcome for the reel-based event.

EEE A17 is the computing system of any one of EEE A1 to A16, wherein the first predetermined set of symbols includes symbols from a group of reels; wherein each reel of the group of reels includes multiple reel stops; wherein each reel stop of the multiple reel stops corresponds to a symbol displayable on the display; and wherein each index value of the ordered set of index values corresponds to a respective reel of the group of reels and a reel stop position on the respective reel.

EEE A18 is the computing system of EEE A17, wherein the first predetermined set of symbols includes, for each respective reel of the group of reels, a respective symbol corresponding to one or more reel stops adjacent to the reel stop position on the respective reel.

EEE A19 is the computing system of any one of EEE A1 to A18, wherein the set of seeds is determined prior to initiation of the reel-based event and stored in a database.

EEE A20 is the computing system of any one of EEE A1 to A19, wherein iteratively using the deterministic process further results in determining a supplemental index value with respect to the ordered set of index values; wherein the supplemental index value corresponds to a user interface element configured to be output via a user interface; and wherein the functions further include outputting, via the user interface, the user interface element based on outputting each respective predetermined set of symbols according to the ordered set of index values.

EEE A21 is the computing system of EEE A20, wherein the user interface element comprises at least one of an audio element and a visual element output via the user interface.

EEE A22 is the computing system of any one of EEE A1 to A21, wherein the index value corresponding to a first predetermined set of symbols includes multiple index values; and wherein multiple index values are determined during each iterative use of the deterministic process.

EEE A23 is the computing system of any one of EEE A1 to A22, wherein initializing the deterministic process includes initializing a deterministic algorithm.

EEE A24 is the computing system of any one of EEE A1 to A23, further comprising: the display and a communication link operatively coupling the processor and the display.

EEE A25 is the computing system of any one of EEE A1 to A24, wherein the processor and the non-transitory computer-readable memory storing executable instructions include a hardware processor configured by machine-readable instructions to perform the functions.

EEE B1 is a method comprising: determining occurrence of a particular outcome for a reel-based event; determining a specific seed from among a set of seeds corresponding to the particular outcome and a quantity of times to use a deterministic process based on the particular outcome and the specific seed; initializing the deterministic process with the specific seed to determine an index value corresponding to a first predetermined set of symbols and a first respective next seed for iteratively using the deterministic process; after initializing the deterministic process, iteratively using the deterministic process a number of times equal to the quantity of times minus one, wherein each iterative use of the deterministic process is initialized with a respective next seed determined during an immediate prior use of the deterministic process, and wherein iteratively using the deterministic process results in determining, for each iterative use, an ordered set of index values corresponding to a respective predetermined set of symbols; and outputting, within a symbol display portion of a display, the first predetermined set of symbols followed by each respective predetermined set of symbols according to the ordered set of index values.

EEE B2 is the method of EEE B1, wherein the particular outcome indicates one or more of the following was earned during performance of the reel-based event a free spin session, a winning outcome value, or a win multiplier.

EEE B3 is the method of any one of EEE B1 to B2, wherein the set of seeds includes multiple seeds; wherein determining the specific seed from among the set of seeds is based on a random selection from among the set of seeds; and wherein one or more seeds of the multiple seeds is weighted to affect a probability of the specific seed being selected via the random selection.

EEE B4 is the method of any one of EEE B3, wherein a weight of at least one seed of the multiple seeds includes a weight less than or equal to one.

EEE B5 is the method of any one of EEE B3 to B4, wherein a weight of at least one seed of the multiple seeds includes a weight greater than one.

EEE B6 is the method of any one of EEE B3 to B5, wherein a weight of at least one seed of the multiple seeds includes a weight based on a quantity of times the at least one seed was selected during performance of previous reel-based events versus a quantity of times other seeds of the set of seeds were selected during performance of the previous reel-based events.

EEE B7 is the method of any one of EEE B1 to B6, wherein the set of seeds includes multiple seeds; wherein the quantity of times equals a number of time to use the deterministic process during the reel-based event to achieve a particular award amount; and wherein a different seed of the multiple seeds, when selected, is arranged for achieving the particular award amount after use of the deterministic process a different quantity of times.

EEE B8 is the method of any one of EEE B1 to B7, wherein the specific seed includes a binary value having between four and sixty-four bits inclusive.

EEE B9 is the method of any one of EEE B1 to B7, wherein the specific seed includes a binary value having thirty-two bits.

EEE B10 is the method of any one of EEE B1 to B9, wherein the particular outcome includes a particular award amount selected from a first group of award amounts; wherein the first group of award amounts includes at least one award amount in addition to the particular award amount; wherein one or more award amounts within the first group of award amounts is weighted to affect a probability of the particular outcome being determined for the reel-based event; wherein the set of seeds is a first set of seeds; wherein the first set of seeds corresponds to the particular award amount; wherein the method further comprises determining, based on the particular award being selected from the first group of award amounts, the first set of seeds from among multiple sets of seeds; and wherein each set of seeds of the multiple sets of seeds corresponds to a different group of award amounts.

EEE B11 is the method of any one of EEE B1 to B10, wherein the particular outcome includes a particular award amount selected from multiple groups of award amounts each corresponding to a different range of award amounts.

EEE B12 is the method of any one of EEE B1 to B11, wherein a pseudorandom number generator produces a respective identical sequence of index values each time the pseudorandom number generator is initialized with a respective initial seed; and wherein the deterministic process includes the pseudorandom number generator and/or using the deterministic process includes using the pseudorandom number generator.

EEE B13 is the method of EEE B12, wherein the pseudorandom number generator (PRNG) includes a Permuted Congruential Generator (PCG) Random PRNG, a Minimal C implementation PRNG, a PCG Random, C++ implementation PRNG, or a PCG Random, Minimal C PRNG.

EEE B14 is the method of any one of EEE B1 to B13, further comprising: receiving notification that a payment to allow performance of the reel-based event has been received; and performing the reel-based event after receiving the notification; wherein outputting the first predetermined set of symbols followed by each respective predetermined set of symbols according to the ordered set of index values is performed as part of a bonus reel-based event that does not require a further payment to be performed.

EEE B15 is the method of any one of EEE B1 to B14, further comprising: determining an award corresponding to outputting, within the symbol display portion of the display, the first predetermined set of symbols followed by each respective predetermined set of symbols according to the ordered set of index values; and outputting the award.

EEE B16 is the method of any one of EEE B1 to B15, wherein the award is further based on one or more from among a payment to allow performance of the reel-based event; or wherein the award is further based on one or more from among the particular outcome for the reel-based event.

EEE B17 is the method of any one of EEE B1 to B16, wherein the first predetermined set of symbols includes symbols from a group of reels; wherein each reel of the group of reels includes multiple reel stops; wherein each reel stop of the multiple reel stops corresponds to a symbol displayable on the display; and wherein each index value of the ordered set of index values corresponds to a respective reel of the group of reels and a reel stop position on the respective reel.

EEE B18 is the method of any one of EEE B1 to B17, wherein the first predetermined set of symbols includes, for each respective reel of the group of reels, a respective symbol corresponding to one or more reel stops adjacent to the reel stop position on the respective reel.

EEE B19 is the method of any one of EEE B1 to B18, wherein the set of seeds is determined prior to initiation of the reel-based event and stored in a database.

EEE B20 is the method of any one of EEE B1 to B19, wherein iteratively using the deterministic process further results in determining a supplemental index value with respect to the ordered set of index values; wherein the supplemental index value corresponds to a user interface element configured to be output via a user interface; and wherein the method further includes outputting, via the user interface, the user interface element based on outputting each respective predetermined set of symbols according to the ordered set of index values.

EEE B21 is the method of any one of EEE B1 to B20, wherein the user interface element comprises at least one of an audio element and a visual element output via the user interface.

EEE B22 is the method of any one of EEE B1 to B21, wherein the index value corresponding to a first predetermined set of symbols includes multiple index values; and wherein multiple index values are determined during each iterative use of the deterministic process.

EEE B23 is the method of any one of EEE B1 to B22, wherein initializing the deterministic process includes initializing a deterministic algorithm.

EEE C1 is a computer-readable memory having stored therein instructions executable by a processor to cause a computing system to perform functions comprising: determining occurrence of a particular outcome for a reel-based event; determining a specific seed from among a set of seeds corresponding to the particular outcome and a quantity of times to use a deterministic process based on the particular outcome and the specific seed; initializing the deterministic process with the specific seed to determine an index value corresponding to a first predetermined set of symbols and a first respective next seed for iteratively using the deterministic process; after initializing the deterministic process, iteratively using the deterministic process a number of times equal to the quantity of times minus one, wherein each iterative use of the deterministic process is initialized with a respective next seed determined during an immediate prior use of the deterministic process, and wherein iteratively using the deterministic process results in determining, for each iterative use, an ordered set of index values corresponding to a respective predetermined set of symbols; and outputting, within a symbol display portion of a display, the first predetermined set of symbols followed by each respective predetermined set of symbols according to the ordered set of index values.

EEE C2 is the computer-readable memory of EEE C1, wherein the particular outcome indicates one or more of the following was earned during performance of the reel-based event a free spin session, a winning outcome value, or a win multiplier.

EEE C3 is the computer-readable memory of any one of EEE C1 to C2, wherein the set of seeds includes multiple seeds; wherein determining the specific seed from among the set of seeds is based on a random selection from among the set of seeds; and wherein one or more seeds of the multiple seeds is weighted to affect a probability of the specific seed being selected via the random selection.

EEE C4 is the computer-readable memory of EEE C3, wherein a weight of at least one seed of the multiple seeds includes a weight less than or equal to one.

EEE C5 is the computer-readable memory of any one of EEE C3 to C4, wherein a weight of at least one seed of the multiple seeds includes a weight greater than one EEE C6 is the computer-readable memory of any one of EEE C3 to C5, wherein a weight of at least one seed of the multiple seeds includes a weight based on a quantity of times the at least one seed was selected during performance of previous reel-based events versus a quantity of times other seeds of the set of seeds were selected during performance of the previous reel-based events.

EEE C7 is the computer-readable memory of any one of EEE C1 to C6, wherein the set of seeds includes multiple seeds; wherein the quantity of times equals a number of time to use the deterministic process during the reel-based event to achieve a particular award amount; and wherein a different seed of the multiple seeds, when selected, is arranged for achieving the particular award amount after use of the deterministic process a different quantity of times.

EEE C8 is the computer-readable memory of any one of EEE C1 to C7, wherein the specific seed includes a binary value having between four and sixty-four bits inclusive.

EEE C9 is the computer-readable memory of any one of EEE C1 to C7, wherein the specific seed includes a binary value having thirty-two bits.

EEE C10 is the computer-readable memory of any one of EEE C1 to C9, wherein the particular outcome includes a particular award amount selected from a first group of award amounts; wherein the first group of award amounts includes at least one award amount in addition to the particular award amount; wherein one or more award amounts within the first group of award amounts is weighted to affect a probability of the particular outcome being determined for the reel-based event; wherein the set of seeds is a first set of seeds; wherein the first set of seeds corresponds to the particular award amount; wherein the method determining, based on the particular award being selected from the first group of award amounts, the first set of seeds from among multiple sets of seeds; and wherein each set of seeds of the multiple sets of seeds corresponds to a different group of award amounts.

EEE C11 is the computer-readable memory of any one of EEE C1 to C10, wherein the particular outcome includes a particular award amount selected from multiple groups of award amounts each corresponding to a different range of award amounts.

EEE C12 is the computer-readable memory of any one of EEE C1 to C11, wherein a pseudorandom number generator produces a respective identical sequence of index values each time the pseudorandom number generator is initialized with a respective initial seed; and wherein the deterministic process includes the pseudorandom number generator and/or using the deterministic process includes using the pseudorandom number generator.

EEE C13 is the computer-readable memory of EEE C12, wherein the pseudorandom number generator (PRNG) includes a Permuted Congruential Generator (PCG) Random PRNG, a Minimal C implementation PRNG, a PCG Random, C++ implementation PRNG, or a PCG Random, Minimal C PRNG.

EEE C14 is the computer-readable memory of any one of EEE C1 to C13, wherein the functions further comprise: receiving notification that a payment to allow performance of the reel-based event has been received; and performing the reel-based event after receiving the notification; wherein outputting the first predetermined set of symbols followed by each respective predetermined set of symbols according to the ordered set of index values is performed as part of a bonus reel-based event that does not require a further payment to be performed.

EEE C15 is the computer-readable memory of any one of EEE C1 to C14, wherein the functions further comprise: determining an award corresponding to outputting, within the symbol display portion of the display, the first predetermined set of symbols followed by each respective predetermined set of symbols according to the ordered set of index values; and outputting the award.

EEE C16 is the computer-readable memory of any one of EEE C1 to C15, wherein the award is further based on one or more from among a payment to allow performance of the reel-based event; or wherein the award is further based on one or more from among the particular outcome for the reel-based event.

EEE C17 is the computer-readable memory of any one of EEE C1 to C16, wherein the first predetermined set of symbols includes symbols from a group of reels; wherein each reel of the group of reels includes multiple reel stops; wherein each reel stop of the multiple reel stops corresponds to a symbol displayable on the display; and wherein each index value of the ordered set of index values corresponds to a respective reel of the group of reels and a reel stop position on the respective reel.

EEE C18 is the computer-readable memory of any one of EEE C1 to C17, wherein the first predetermined set of symbols includes, for each respective reel of the group of reels, a respective symbol corresponding to one or more reel stops adjacent to the reel stop position on the respective reel.

EEE C19 is the computer-readable memory of any one of EEE C1 to C18, wherein the set of seeds is determined prior to initiation of the reel-based event and stored in a database.

EEE C20 is the computer-readable memory of any one of EEE C1 to C19, wherein iteratively using the deterministic process further results in determining a supplemental index value with respect to the ordered set of index values; wherein the supplemental index value corresponds to a user interface element configured to be output via a user interface; and wherein the functions further comprising outputting, via the user interface, the user interface element based on outputting each respective predetermined set of symbols according to the ordered set of index values.

EEE C21 is the computer-readable memory of any one of EEE C1 to C20, wherein the user interface element comprises at least one of an audio element and a visual element output via the user interface.

EEE C22 is the computer-readable memory of any one of EEE C1 to C21, wherein the index value corresponding to a first predetermined set of symbols includes multiple index values; and wherein multiple index values are determined during each iterative use of the deterministic process.

EEE C23 is the computer-readable memory of any one of EEE C1 to C22, wherein initializing the deterministic process includes initializing a deterministic algorithm.

EEE C24 is the computer-readable memory of any one of EEE C1 to C23, wherein the computer-readable memory includes a non-transitory computer-readable memory.

EEE C25 is the computer-readable memory of EEE C24, wherein the non-transitory computer-readable memory includes distributed non-transitory computer-readable memories.

EEE C26 is the computer-readable memory of any one of EEE C1 to C25, wherein the processor comprises multiple processors.

EEE C27 is the computer-readable memory of any one of EEE C1 to C25, wherein the processor comprises a single processor.

EEE D1 is a computing system comprising a processor and a non-transitory computer-readable memory storing executable instructions, wherein execution of the instructions by the processor causes the computing system to perform the following functions: providing a database within the non-transitory computer-readable memory, wherein the database includes a set of index values, wherein each index value corresponds to a respective reel stop, and wherein the respective reel stop corresponds to one or more reels displayable on a display during performance of a reel-based event; determining, for each respective seed of multiple seeds, a respective sequence of index values using a deterministic process initialized with the respective seed, wherein each index value of the respective sequence of index values is contained within the set of index values; determining a respective outcome based on arrangements of symbols located on the reels, wherein the arrangements of symbols are ordered according to each respective sequence of index values; determining a seed and a set of metrics corresponding to each respective outcome, wherein the determined seed is the respective seed used by the deterministic process to determine the respective sequence of index values used to determine the respective outcome; augmenting the database to include data indicating the determined seed and the set of metrics corresponding to each respective outcome; and determining, based on content of the database, a subset of the index values for performing at least a portion of a reel-based event to achieve a specific outcome corresponding to the set of metrics indicated within the database.

EEE D2 is the computing system of EEE D1, wherein the functions further include displaying the arrangements of symbols ordered according to the sequence of index values on a display.

EEE D3 is the computing system of EEE D2, wherein displaying the arrangements of symbols ordered according to the sequence of index values on the display occurs over multiple spins of the reels.

EEE D4 is the computing system of any one of EEE D1 to D3, wherein augmenting the database is conditioned on the set of metrics meeting or exceeding a predefined threshold set of metrics.

EEE D5 is the computing system of any one of EEE D1 to D4, wherein the set of metrics includes one or more from among a total award amount, a quantity of cascading symbols, a quantity of anticipation events, a quantity of re-triggered free spins, or a quantity of free spins.

EEE D6 is the computing system of any one of EEE D1 to D5, wherein each respective sequence of index values includes an identical quantity of index values.

EEE D7 is the computing system of any one of EEE D1 to D6, wherein the content of the database includes data that indicates the subset of the set of index values corresponds to the set of metrics corresponding to the specific outcome.

EEE D8 is the computing system of any one of EEE D1 to D7, wherein determining the subset of index values includes using the deterministic process based on a determined seed and the set of metrics corresponding to the specific outcome.

EEE D9 is the computing system of any one of EEE D1 to D8, wherein determining the respective outcome is further based on award data and one or more patterns of symbols contained within the arrangements of symbols; and wherein the one or more patterns includes a payline pattern defined for a line-type reel-based event or a payways pattern defined for a ways-type reel-based event.

EEE D10 is the computing system of any one of EEE D1 to D9, wherein each seed includes a binary value having between four and sixty-four bits inclusive.

EEE D11 is the computing system of any one of EEE D1 to D9, wherein the specific seed includes a binary value having thirty-two bits.

EEE D12 is the computing system of any one of EEE D1 to D11, wherein a pseudorandom number generator outputs one or more index values each time the pseudorandom number generator is supplied with a seed; and wherein the deterministic process includes the pseudorandom number generator and/or using the deterministic process includes using the pseudorandom number generator.

EEE D13 is the computing system of EEE D12, wherein the pseudorandom number generator (PRNG) includes a Permuted Congruential Generator (PCG) Random PRNG, a Minimal C implementation PRNG, a PCG Random, C++ implementation PRNG, or a PCG Random, Minimal C PRNG.

EEE D14 is the computing system of any one of EEE D12 to D13, wherein supplying the pseudorandom number generator with a predetermined number of seeds starting with an initial seed includes outputting a particular ordered sequence of index values; and wherein the pseudorandom number generator outputs the particular ordered sequence of index values each time the pseudorandom number generator is supplied with the predetermined number of seeds starting with the initial seed.

EEE D15 is the computing system of any one of EEE D1 to D14, wherein the database includes multiple determined seeds corresponding to the set of metrics; and wherein determining the subset of index values includes randomly selecting a determined seed from among the multiple determined seeds and initiating the deterministic process based on the randomly selected determined seed.

EEE D16 is the computing system of any one of EEE D1 to D15, wherein the functions further include: outputting instructions to spin a plurality of reels on the display and stop each spinning reel at a respective reel stop; wherein each reel of the plurality of reels includes multiple reel stops; wherein each respective arrangement of symbols includes multiple adjacent symbols on a reel of the plurality of reels; and wherein each index value is indicative of a particular reel of the plurality of reels and a particular reel stop on the particular reel.

EEE D17 is the computing system of any one of EEE D1 to D16, wherein the functions further include: outputting instructions to spin a plurality of reels on the display and stop each spinning reel at a respective reel stop; wherein each reel of the plurality of reels includes multiple reel stops; wherein each respective arrangement of symbols includes one or more rows of symbols; wherein each row of symbols includes one symbol from each reel of the plurality of reels; and wherein each index value is mapped to a respective reel stop on each reel of the plurality of reels.

EEE D18 is the computing system of any one of EEE D1 to D17, wherein each index value further corresponds to a particular reel of the one or more reels.

EEE D19 is the computing system of any one of EEE D1 to D18, wherein using the deterministic process initialized with the respective seed includes determining via the deterministic process a next seed for supplying to the deterministic process during an iterative use of the deterministic process to determine the respective sequence of index values.

EEE D20 is the computing system of EEE D19, wherein the iterative use of the deterministic process includes determining a supplemental index value with respect to the respective sequence of index values; and wherein the supplemental index value corresponds to a user interface element configured to be output via a user interface.

EEE D21 is the computing system of EEE D20, wherein the user interface element comprises at least one of an audio element and a visual element output via the user interface.

EEE D22 is the computing system of any one of EEE D1 to D21, wherein the portion of the reel-based event comprises a bonus reel-based event following a standard portion of the reel-based event.

EEE D23 is the computing system of any one of EEE D1 to D22, wherein the multiple seeds includes a quantity of seeds required to determine, for each defined set of metrics, a threshold number of seeds for initializing the deterministic process to achieve a particular outcome corresponding to each defined set of metrics.

EEE D24 is the computing system of any one of EEE D1 to D22, wherein the multiple seeds includes all possible seeds within a range of seeds defined for the deterministic process.

EEE D25 is the computing system of any one of EEE D1 to D24, wherein the processor and the non-transitory computer-readable memory storing executable instructions include a hardware processor configured by machine-readable instructions to perform the functions.

EEE E1 is a method comprising: providing a database within a non-transitory computer-readable memory, wherein the database includes a set of index values, wherein each index value corresponds to a respective reel stop, and wherein the respective reel stop corresponds to one or more reels displayable on a display during performance of a reel-based event; determining, for each respective seed of multiple seeds, a respective sequence of index values using a deterministic process initialized with the respective seed, wherein each index value of the respective sequence of index values is contained within the set of index values; determining a respective outcome based on arrangements of symbols located on the reels, wherein the arrangements of symbols are ordered according to each respective sequence of index values; determining a seed and a set of metrics corresponding to each respective outcome, wherein the determined seed is the respective seed used by the deterministic process to determine the respective sequence of index values used to determine the respective outcome; augmenting the database to include data indicating the determined seed and the set of metrics corresponding to each respective outcome; and determining, based on content of the database, a subset of the index values for performing at least a portion of a reel-based event to achieve a specific outcome corresponding to the set of metrics indicated within the database.

EEE E2 is the method of EEE E1, further comprising displaying the arrangements of symbols ordered according to the sequence of index values on a display.

EEE E3 is the method of any one of EEE E1 to E2, wherein displaying the arrangements of symbols ordered according to the sequence of index values on a display occurs over multiple spins of the reels.

EEE E4 is the method of any one of EEE E1 to E3, wherein augmenting the database is conditioned on the set of metrics meeting or exceeding a predefined threshold set of metrics.

EEE E5 is the method of any one of EEE E1 to E4, wherein the set of metrics includes one or more from among a total award amount, a quantity of cascading symbols, a quantity of anticipation events, a quantity of re-triggered free spins, or a quantity of free spins.

EEE E6 is the method of any one of EEE E1 to E5, wherein each respective sequence of index values includes an identical quantity of index values.

EEE E7 is the method of any one of EEE E1 to E6, wherein the content of the database includes data that indicates the subset of the set of index values corresponds to the set of metrics corresponding to the specific outcome.

EEE E8 is the method of any one of EEE E1 to E7, wherein determining the subset of index values includes using the deterministic process based on a determined seed and the set of metrics corresponding to the specific outcome.

EEE E9 is the method of any one of EEE E1 to E8, wherein determining the respective outcome is further based on award data and one or more patterns of symbols contained within the arrangements of symbols; and wherein the one or more patterns includes a payline pattern defined for a line-type reel-based event or a payways pattern defined for a ways-type reel-based event.

EEE E10 is the method of any one of EEE E1 to E9, wherein each seed includes a binary value having between four and sixty-four bits inclusive.

EEE E11 is the method of any one of EEE E1 to E9, wherein each seed includes a binary value having thirty-two bits.

EEE E12 is the method of any one of EEE E1 to E11, wherein a pseudorandom number generator outputs one or more index values each time the pseudorandom number generator is supplied with a seed; and wherein the deterministic process includes the pseudorandom number generator and/or using the deterministic process includes using the pseudorandom number generator.

EEE E13 is the method of EEE E12, wherein the pseudorandom number generator (PRNG) includes a Permuted Congruential Generator (PCG) Random PRNG, a Minimal C implementation PRNG, a PCG Random, C++ implementation PRNG, or a PCG Random, Minimal C PRNG.

EEE E14 is the method of any one of EEE E12 to E13, wherein supplying the pseudorandom number generator with a predetermined number of seeds starting with an initial seed includes outputting a particular ordered sequence of index values; and wherein the pseudorandom number generator outputs the particular ordered sequence of index values each time the pseudorandom number generator is supplied with the predetermined number of seeds starting with the initial seed.

EEE E15 is the method of any one of EEE E1 to E14, wherein the database includes multiple determined seeds corresponding to the set of metrics; and wherein determining the subset of index values includes randomly selecting a determined seed from among the multiple determined seeds and initiating the deterministic process based on the randomly selected determined seed.

EEE E16 is the method of any one of EEE E1 to E15, further comprising: outputting instructions to spin a plurality of reels on the display and stop each spinning reel at a respective reel stop; wherein each reel of the plurality of reels includes multiple reel stops; wherein each respective arrangement of symbols includes multiple adjacent symbols on a reel of the plurality of reels; and wherein each index value is indicative of a particular reel of the plurality of reels and a particular reel stop on the particular reel.

EEE E17 is the method of any one of EEE E1 to E16, further comprising: outputting instructions to spin a plurality of reels on the display and stop each spinning reel at a respective reel stop; wherein each reel of the plurality of reels includes multiple reel stops; wherein each respective arrangement of symbols includes one or more rows of symbols; wherein each row of symbols includes one symbol from each reel of the plurality of reels; and wherein each index value is mapped to a respective reel stop on each reel of the plurality of reels.

EEE E18 is the method of any one of EEE E1 to E17, wherein each index value further corresponds to a particular reel of the one or more reels.

EEE E19 is the method of any one of EEE E1 to E18, wherein using the deterministic process initialized with the respective seed includes determining via the deterministic process a next seed for supplying to the deterministic process during an iterative use of the deterministic process to determine the respective sequence of index values.

EEE E20 is the method of EEE E19, wherein the iterative use of the deterministic process includes determining a supplemental index value with respect to the respective sequence of index values; and wherein the supplemental index value corresponds to a user interface element configured to be output via a user interface.

EEE E21 is the method of EEE E20, wherein the user interface element comprises at least one of an audio element and a visual element output via the user interface.

EEE E22 is the method of any one of EEE E1 to E21, wherein the portion of the reel-based event comprises a bonus reel-based event following a standard portion of the reel-based event.

EEE E23 is the method of any one of EEE E1 to E22, wherein the multiple seeds includes a quantity of seeds required to determine, for each defined set of metrics, a threshold number of seeds for initializing the deterministic process to achieve a particular outcome corresponding to each defined set of metrics.

EEE E24 is the method of any one of EEE E1 to E22, wherein the multiple seeds includes all possible seeds within a range of seeds defined for the deterministic process.

EEE F1 is a computer-readable memory having stored therein instructions executable by a processor to cause a computing system to perform functions comprising: providing a database within a computer-readable memory, wherein the database includes a set of index values, wherein each index value corresponds to a respective reel stop, and wherein the respective reel stop corresponds to one or more reels displayable on a display during performance of a reel-based event; determining, for each respective seed of multiple seeds, a respective sequence of index values using a deterministic process initialized with the respective seed, wherein each index value of the respective sequence of index values is contained within the set of index values; determining a respective outcome based on arrangements of symbols located on the reels, wherein the arrangements of symbols are ordered according to each respective sequence of index values; determining a seed and a set of metrics corresponding to each respective outcome, wherein the determined seed is the respective seed used by the deterministic process to determine the respective sequence of index values used to determine the respective outcome; augmenting the database to include data indicating the determined seed and the set of metrics corresponding to each respective outcome; and determining, based on content of the database, a subset of the index values for performing at least a portion of a reel-based event to achieve a specific outcome corresponding to the set of metrics indicated within the database.

EEE F2 is the computer-readable memory of EEE F1, wherein the functions further comprise displaying the arrangements of symbols ordered according to the sequence of index values on a display.

EEE F3 is the computer-readable memory of any one of EEE F1 to F2, wherein displaying the arrangements of symbols ordered according to the sequence of index values on a display occurs over multiple spins of the reels.

EEE F4 is the computer-readable memory of any one of EEE F1 to F3, wherein augmenting the database is conditioned on the set of metrics meeting or exceeding a predefined threshold set of metrics.

EEE F5 is the computer-readable memory of any one of EEE F1 to F4, wherein the set of metrics includes one or more from among a total award amount, a quantity of cascading symbols, a quantity of anticipation events, a quantity of re-triggered free spins, or a quantity of free spins.

EEE F6 is the computer-readable memory of any one of EEE F1 to F5, wherein each respective sequence of index values includes an identical quantity of index values.

EEE F7 is the computer-readable memory of any one of EEE F1 to F6, wherein the content of the database includes data that indicates the subset of the set of index values corresponds to the set of metrics corresponding to the specific outcome.

EEE F8 is the computer-readable memory of any one of EEE F1 to F7, wherein determining the subset of index values includes using the deterministic process based on a determined seed and the set of metrics corresponding to the specific outcome.

EEE F9 is the computer-readable memory of any one of EEE F1 to F8, wherein determining the respective outcome is further based on award data and one or more patterns of symbols contained within the arrangements of symbols; and wherein the one or more patterns includes a payline pattern defined for a line-type reel-based event or a payways pattern defined for a ways-type reel-based event.

EEE F10 is the computer-readable memory of any one of EEE F1 to F9, wherein each seed includes a binary value having between four and sixty-four bits inclusive.

EEE F11 is the computer-readable memory of any one of EEE F1 to F9, wherein the specific seed includes a binary value having thirty-two bits.

EEE F12 is the computer-readable memory of any one of EEE F1 to F11, wherein a pseudorandom number generator outputs one or more index values each time the pseudorandom number generator is supplied with a seed; and wherein the deterministic process includes the pseudorandom number generator and/or using the deterministic process includes using the pseudorandom number generator.

EEE F13 is the computer-readable memory of EEE F12, wherein the pseudorandom number generator (PRNG) includes a Permuted Congruential Generator (PCG) Random PRNG, a Minimal C implementation PRNG, a PCG Random, C++ implementation PRNG, or a PCG Random, Minimal C PRNG.

EEE F14 is the computer-readable memory of any one of EEE F12 to 13, wherein supplying the pseudorandom number generator with a predetermined number of seeds starting with an initial seed includes outputting a particular ordered sequence of index values; and wherein the pseudorandom number generator outputs the particular ordered sequence of index values each time the pseudorandom number generator is supplied with the predetermined number of seeds starting with the initial seed.

EEE F15 is the computer-readable memory of any one of EEE F1 to F14, wherein the database includes multiple determined seeds corresponding to the set of metrics; and wherein determining the subset of index values includes randomly selecting a determined seed from among the multiple determined seeds and initiating the deterministic process based on the randomly selected determined seed.

EEE F16 is the computer-readable memory of any one of EEE F1 to F15, wherein the functions further comprise: outputting instructions to spin a plurality of reels on the display and stop each spinning reel at a respective reel stop; wherein each reel of the plurality of reels includes multiple reel stops; wherein each respective arrangement of symbols includes multiple adjacent symbols on a reel of the plurality of reels; and wherein each index value is indicative of a particular reel of the plurality of reels and a particular reel stop on the particular reel.

EEE F17 is the computer-readable memory of any one of EEE F1 to F16, wherein the functions further comprise: outputting instructions to spin a plurality of reels on the display and stop each spinning reel at a respective reel stop; wherein each reel of the plurality of reels includes multiple reel stops; wherein each respective arrangement of symbols includes one or more rows of symbols; wherein each row of symbols includes one symbol from each reel of the plurality of reels; and wherein each index value is mapped to a respective reel stop on each reel of the plurality of reels.

EEE F18 is the computer-readable memory of any one of EEE F1 to F17, wherein each index value further corresponds to a particular reel of the one or more reels.

EEE F19 is the computer-readable memory of any one of EEE F1 to F18, wherein using the deterministic process initialized with the respective seed includes determining via the deterministic process a next seed for supplying to the deterministic process during an iterative use of the deterministic process to determine the respective sequence of index values.

EEE F20 is the computer-readable memory of EEE F19, wherein the iterative use of the deterministic process includes determining a supplemental index value with respect to the respective sequence of index values; and wherein the supplemental index value corresponds to a user interface element configured to be output via a user interface.

EEE F21 is the computer-readable memory of EEE F20, wherein the user interface element comprises at least one of an audio element and a visual element output via the user interface.

EEE F22 is the computer-readable memory of any one of EEE F1 to F21, wherein the portion of the reel-based event comprises a bonus reel-based event following a standard portion of the reel-based event.

EEE F23 is the computer-readable memory of any one of EEE F1 to F22, wherein the multiple seeds includes a quantity of seeds required to determine, for each defined set of metrics, a threshold number of seeds for initializing the deterministic process to achieve a particular outcome corresponding to each defined set of metrics.

EEE F24 is the computer-readable memory of any one of EEE F1 to F22, wherein the multiple seeds includes all possible seeds within a range of seeds defined for the deterministic process.

EEE F25 is the computer-readable memory of any one of EEE F1 to F24, wherein the computer-readable memory includes a non-transitory computer-readable memory.

EEE F26 is the computer-readable memory of EEE F25, wherein the non-transitory computer-readable memory includes distributed non-transitory computer-readable memories.

EEE F27 is the computer-readable memory of any one of EEE F1 to F26, wherein the processor comprises multiple processors.

EEE F28 is the computer-readable memory of any one of EEE F1 to F26, wherein the processor comprises a single processor.

The invention claimed is:

1. A method comprising:

determining occurrence of a particular outcome for a reel-based event;

obtaining, from a database, a specific seed from among a set of seeds corresponding to the particular outcome and a quantity of times to use a computer-implemented deterministic process based on the particular outcome and the specific seed, wherein the set of seeds is determined prior to initiation of the reel-based event and stored in the database, wherein the computer-implemented deterministic process uses a pseudorandom number generator configured to produce a respective, identical sequence of index values each time the pseudorandom number generator is initialized with a respective initial seed;

initializing the deterministic process with the specific seed by supplying the pseudorandom number generator with the specific seed;

after initializing the deterministic process, iteratively using the deterministic process the quantity of times, wherein each iterative use of the deterministic process after a first use is initialized by supplying the pseudorandom number generator with a respective next seed determined during an immediate prior use of the deterministic process, and wherein iteratively using the deterministic process results in determining, for each iterative use, an ordered set of index values corresponding to a respective predetermined set of symbols; and outputting, within a symbol display portion of a display, each respective predetermined set of symbols according to the respective ordered set of index values.

2. The method of claim 1, wherein the particular outcome indicates one or more of the following was earned during performance of the reel-based event:

a free spin session;

a winning outcome value; or a win multiplier.

3. The method of claim 1, wherein:

the set of seeds includes multiple seeds;

determining the specific seed from among the set of seeds is based on a random selection from among the set of seeds; and one or more seeds of the multiple seeds is weighted to affect a probability of the specific seed being selected via the random selection.

4. The method of claim 3, wherein a weight of at least one seed of the multiple seeds includes a weight less than or equal to one.

5. The method of claim 3, wherein a weight of at least one seed of the multiple seeds includes a weight based on a quantity of times the at least one seed was selected during performance of previous reel-based events versus a quantity of times other seeds of the set of seeds were selected during performance of the previous reel-based events.

6. The method of claim 1, wherein:

the set of seeds includes multiple seeds;

the quantity of times equals a number of times to use the deterministic process during the reel-based event to achieve a particular award amount; and a different seed of the multiple seeds, when selected, is arranged for achieving the particular award amount after use of the deterministic process a different quantity of times.

7. The method of claim 1, wherein the specific seed includes a binary value having between four and sixty-four bits, inclusive.

8. The method of claim 1, wherein:

the particular outcome includes a particular award amount selected from a first group of award amounts;

the first group of award amounts includes at least one award amount in addition to the particular award amount;

one or more award amounts within the first group of award amounts is weighted to affect a probability of the particular outcome being determined for the reel-based event;

the set of seeds is a first set of seeds;

the first set of seeds corresponds to the particular award amount;

the method further comprises determining, based on the particular award amount being selected from the first group of award amounts, the first set of seeds from among multiple sets of seeds; and each set of seeds of the multiple sets of seeds corresponds to a different group of award amounts.

9. The method of claim 1, wherein:

the particular outcome includes a particular award amount selected from multiple groups of award amounts each corresponding to a different range of award amounts.

10. The method of claim 1, further comprising:

receiving notification that a payment to allow performance of the reel-based event has been received; and performing the reel-based event after receiving the notification;

wherein outputting each respective predetermined set of symbols according to the ordered set of index values is performed as part of a bonus reel-based event that does not require a further payment to be performed.

11. The method of claim 1, further comprising:

determining an award corresponding to outputting, within the symbol display portion of the display, each respective predetermined set of symbols according to the ordered set of index values; and outputting the award.

12. The method of claim 11, wherein the award is further based on one or more from among:

a payment to allow performance of the reel-based event; or the particular outcome for the reel-based event.

13. The method of claim 1, wherein:

a first predetermined set of symbols includes symbols from a group of reels;

each reel of the group of reels includes multiple reel stops;

each reel stop of the multiple reel stops corresponds to a symbol displayable on the display; and each index value of the ordered set of index values corresponds to a respective reel of the group of reels and a reel stop position on the respective reel.

14. The method of claim 13, wherein the first predetermined set of symbols includes, for each respective reel of the group of reels, a respective symbol corresponding to one or more reel stops adjacent to the reel stop position on the respective reel.

15. The method of claim 1, wherein:

iteratively using the deterministic process further results in determining a supplemental index value with respect to the ordered set of index values;

the supplemental index value corresponds to a user interface element configured to be output via a user interface; and the method further comprises:

outputting, via the user interface, the user interface element based on outputting each respective predetermined set of symbols according to the ordered set of index values.

16. The method of claim 15, wherein the user interface element comprises at least one of an audio element and a visual element output via the user interface.

17. The method of claim 1, wherein:

the index value corresponding to a first predetermined set of symbols includes multiple index values; and the multiple index values are determined during each iterative use of the deterministic process.

18. The method of claim 1, wherein initializing the deterministic process includes initializing a deterministic algorithm.

19. The method of claim 1, further comprising:

determining additional particular outcomes for additional reel-based events, and initializing the pseudorandom number generator with additional specific seeds corresponding to the additional particular outcomes.

20. The method of claim 1, wherein the pseudorandom number generator includes:

a Permuted Congruential Generator Random, Minimal C implementation 0.9 pseudorandom number generator, a Permuted Congruential Generator Random, C++ implementation 0.98 pseudorandom number generator, or a Permuted Congruential Generator Random, Minimal C 0.94 pseudorandom number generator.

21. A computing system comprising:

a processor; and a non-transitory computer-readable memory storing executable instructions, wherein execution of the instructions by the processor causes the computing system to perform the following functions:

determining occurrence of a particular outcome for a reel-based event;

obtaining, from a database, a specific seed from among a set of seeds corresponding to the particular outcome and a quantity of times to use a computer-implemented deterministic process based on the particular outcome and the specific seed, wherein the set of seeds is determined prior to initiation of the reel-based event and stored in the database, wherein the computer-implemented deterministic process uses a pseudorandom number generator configured to produce a respective, identical sequence of index values each time the pseudorandom number generator is initialized with a respective initial seed;

initializing the deterministic process with the specific seed by supplying the pseudorandom number generator with the specific seed;

after initializing the deterministic process, iteratively using the deterministic process the quantity of times, wherein each iterative use of the deterministic process after a first use is initialized by supplying the pseudorandom number generator with a respective next seed determined during an immediate prior use of the deterministic process, and wherein iteratively using the deterministic process results in determining, for each iterative use, an ordered set of index values corresponding to a respective predetermined set of symbols; and outputting, within a symbol display portion of a display, each respective predetermined set of symbols according to the respective ordered set of index values.

22. The computing system of claim 21, further comprising:

the display; and a communication link operatively coupling the processor and the display.

23. A non-transitory computer-readable memory having stored therein instructions executable by a processor to cause a computing system to perform functions comprising:

determining occurrence of a particular outcome for a reel-based event;

obtaining, from a database, a specific seed from among a set of seeds corresponding to the particular outcome and a quantity of times to use a computer-implemented deterministic process based on the particular outcome and the specific seed, wherein the set of seeds is determined prior to initiation of the reel-based event and stored in the database, wherein the computer-implemented deterministic process uses a pseudorandom number generator configured to produce a respective, identical sequence of index values each time the pseudorandom number generator is initialized with a respective initial seed;

initializing the deterministic process with the specific seed by supplying the pseudorandom number generator with the specific seed;

after initializing the deterministic process, iteratively using the deterministic process the quantity of times, wherein each iterative use of the deterministic process after a first use is initialized by supplying the pseudorandom number generator with a respective next seed determined during an immediate prior use of the deterministic process, and wherein iteratively using the deterministic process results in determining, for each iterative use, an ordered set of index values corresponding to a respective predetermined set of symbols; and outputting, within a symbol display portion of a display, each respective predetermined set of symbols according to the respective ordered set of index values.

* * * * *